(12) United States Patent
Waelbroeck et al.

(10) Patent No.: US 8,412,620 B1
(45) Date of Patent: *Apr. 2, 2013

(54) METHODS AND SYSTEMS RELATED TO TRADING ENGINES

(75) Inventors: Henri Waelbroeck, Scarsdale, NY (US); Fred J. Federspiel, Larchmont, NY (US); Stephen Marchini, Larchmont, NY (US)

(73) Assignee: Alpha Vision Services, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,269

(22) Filed: Mar. 15, 2012

Related U.S. Application Data

(63) Continuation of application No. 13/070,852, filed on Mar. 24, 2011, now Pat. No. 8,156,036, which is a continuation-in-part of application No. 12/972,725, filed on Dec. 20, 2010, now Pat. No. 8,095,455, which is a continuation of application No. 11/783,250, filed on Apr. 6, 2007, now Pat. No. 7,908,203.

(60) Provisional application No. 60/795,646, filed on Apr. 28, 2006, provisional application No. 61/317,954, filed on Mar. 26, 2010, provisional application No. 61/317,969, filed on Mar. 26, 2010.

(51) Int. Cl.
*G06Q 40/00* (2006.01)

(52) U.S. Cl. ............................................. 705/37; 705/35
(58) Field of Classification Search ................ 705/35–40
See application file for complete search history.

(56) References Cited

U.S. PATENT DOCUMENTS

2006/0259394 A1* 11/2006 Cushing et al. .................. 705/37
2009/0119224 A1* 5/2009 Petrino ........................ 705/36 R

* cited by examiner

*Primary Examiner* — Thu Thao Havan
(74) *Attorney, Agent, or Firm* — Cowan, Liebowitz & Latman, P.C.; Steven D. Underwood

(57) ABSTRACT

At least one exemplary aspect comprises a method comprising: (a) receiving electronic data describing a trading order; (b) receiving data describing a selection of one or more first trading algorithms from available stored algorithms for execution of the trading order; (c) commencing execution of the trading order via the one or more first trading algorithms; (d) evaluating quality of execution, during the execution, of the trading order via the one or more first trading algorithms; (e) comparing the evaluated quality of execution to a prediction of future performance of execution of the trading order by the one or more first trading algorithms; and (f) if the evaluated quality of execution compares unfavorably to the prediction of future performance, switching the execution of the trading order to one or more second trading algorithms. Other exemplary aspects comprise related computer systems and software.

20 Claims, 52 Drawing Sheets

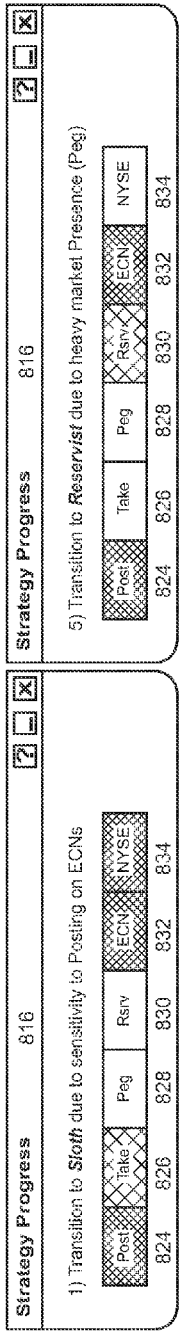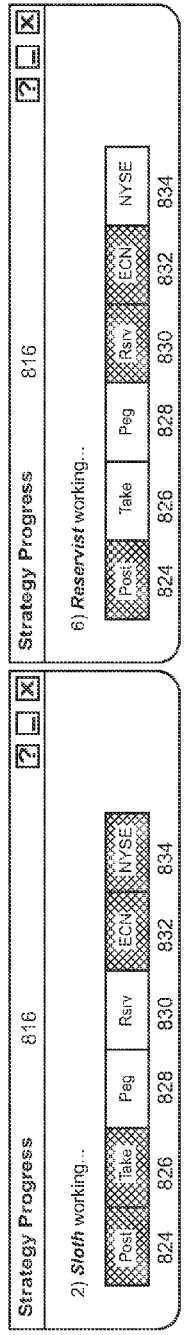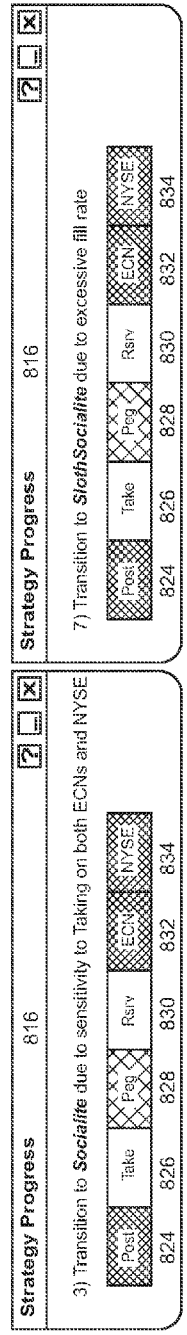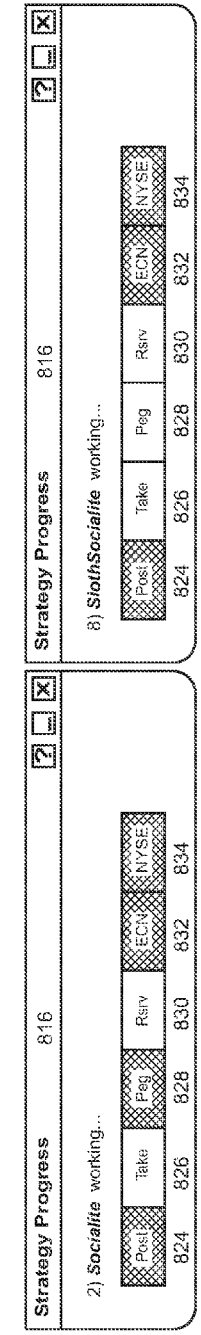

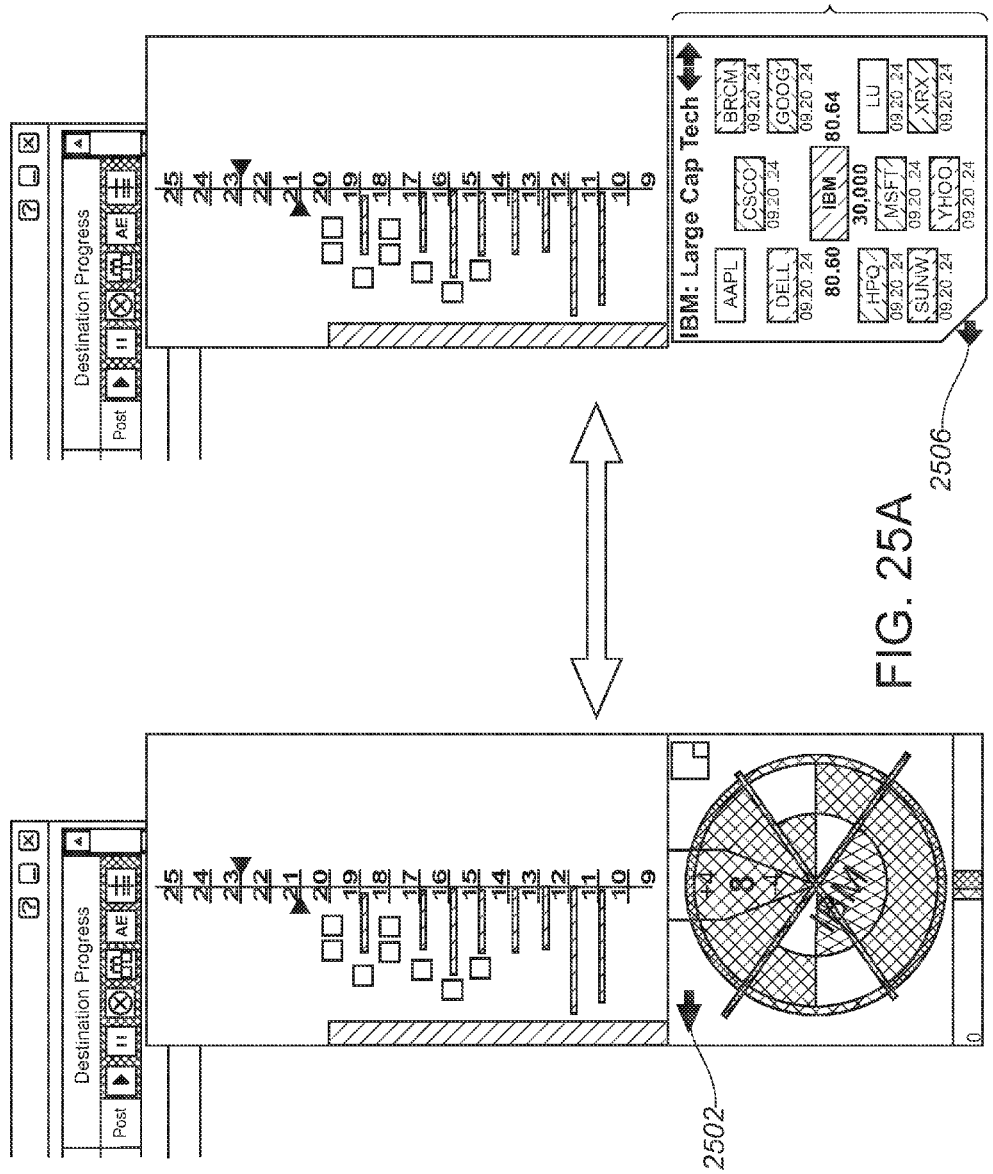

Target Brokers

Manage

Broker ID
Broker Description

Save

Broker ID
Status

Create / Edit

Update

View

*Filter By*

Broker Description
Status

| Broker Code | Broker Description | Status | Created | Modified |
|---|---|---|---|---|
| BrokerA | BROKA | Active | 1-Apr | 20-May |
| BrokerB | BROKB | Active | 18-May | 21-May |
| | | | | |
| | | | | |

FIG. 34

Firms

Manage

Firm ID
Firm Description

Create / Edit

Save

View

Filter By
Firm ID
Firm Description

| Firm IDs | Firm Description |
|---|---|
| FirmA | A Asset Management |
| FirmB | B Pension Fund |
| FirmC | C Hedge Fund |

View

Filter By
User Name [ ] Firm ID [ ]
First Name [ ] Last Name [ ]
Email [ ] Role [ ]
In Active Directory [ ]

| UserName | Firm ID | Firm Description | First Name | Last Name | Role | Email | In Active Directory | Created | Modified |
|---|---|---|---|---|---|---|---|---|---|
| User1@FirmA | FirmA | A Asset Managemen | Jane | Smith | User | Jsmith@firma.com | FALSE | 5/21/2010 15:45 | 5/23/2010 10:51 |
| User2@FirmA | FirmA | A Asset Managemen | Benjamin | Little | Super User | Blittle@firma.com | FALSE | 5/22/2010 15:45 | 5/24/2010 10:01 |
| User3@FirmA | FirmA | A Asset Managemen | Homer | Simpson | User | Hsimpson@firma.com | FALSE | 5/23/2010 15:45 | 5/25/2010 10:51 |
| slamontagne@pipe | PIPELINE | Pipeline Trading | Scott | LaMontagne | Administrator | slamont@pipelinetrading.com | TRUE | 5/24/2010 13:45 | 5/26/2010 8:30 |

FIG. 36B

Broker-Firm Assignment

Manage

Broker Code [Select]
Firm ID [Select]
Status [Select]

Save    Edit

View

*Filter By*
Broker Code
Firm ID          Status

| Broker Code | Firm ID | Status   | Created    |
|-------------|---------|----------|------------|
| BrokerA     | FirmA   | Active   | 4/1/2010   |
| BrokerB     | FirmA   | Active   | 5/18/2010  |
| BrokerC     | FirmB   | Inactive | 5/1/2010   |

FIG. 37

Target Allocations

| Broker | Target Allocation % | Current Trade Day Volume | % | Week-to-Date Volume | % | Month-to-Date Volume | % | Qtr-to-Date Volume | % | Year-to-Date Volume | % |
|---|---|---|---|---|---|---|---|---|---|---|---|
| Broker A | 10 | 0 | 0% | 50 | 13% | 200 | 13% | 2,000 | 13% | 20,000 | 13% |
| Broker B | 15 | 30 | 33% | 75 | 20% | 300 | 20% | 3,000 | 20% | 30,000 | 20% |
| Broker C | 20 | 40 | 44% | 100 | 27% | 400 | 27% | 4,000 | 27% | 40,000 | 27% |
| Broker D | 20 | 0 | 0% | 100 | 27% | 400 | 27% | 4,000 | 27% | 40,000 | 27% |
| Broker E | 35 | 20 | 22% | 50 | 13% | 200 | 13% | 2,000 | 13% | 20,000 | 13% |
| Total | 100 | 90 | 100% | 375 | 100% | 1,500 | 100% | 15,000 | 100% | 150,000 | 100% |

Edit/Update

Non Service Bureau

| Broker | Current Day | Week-to-Date | Month-to-Date | Qtr-to-Date | Year-to-Date |
|---|---|---|---|---|---|
| Pipeline | 150 | 500 | 900 | 9,000 | 75,000 |

FIG. 38

Trade Volume

View
*Filter By*
Start Dt     [ ]    End Dt [ ]
Broker     [ ]
View By   Daily / Weekly / Monthly / Qtrly / Yrly / YTD

| Date | Broker A | Broker B | Broker C | Broker D | Broker E | Total |
|---|---|---|---|---|---|---|
| 5/18 | 18,000 | 8,000 | 17,000 | 2,000 | 0 | 45,000 |
| 5/19 | 140,000 | 30,000 | 2,000 | 4,000 | 1,200 | 177,200 |
| 5/20 | 400 | 0 | 500 | 2,000 | 10,000 | 12,900 |
| Total | 158,400 | 38,000 | 19,500 | 8,000 | 11,200 | 235,100 |
| % | 67% | 16% | 8% | 3% | 5% | 100% |

Export

FIG. 39

Roles

Manage

| Role | [ ] | Create/Edit | | Save | Delete |
| --- | --- | --- | --- | --- | --- |
| Entitlement | [ ] | Assign | | Remove | |

View

Role [Select]
Entitlement [Select]

| Users | 3 |
| --- | --- |
| Role | Super User |
| Entitlements | EditTargetAllocation |
| | Login |
| | TargetAllocation |
| | TradeVolume |
| | SingleFirm |

FIG. 40

Access

Manage

IP Address
Subnet Mask Length               Save

IP Address/Subnet Mask Length   [Select]
User Group                      [Select]
                                Save    Delete         Assign    Remove

View

IP Address/subnet     [Select]
User Group            [Select]

| IP Address/Subnet | User Group |
|---|---|
| 1234.1234.79.8/55.555.55.55 | Admin |
| 1234.1234.0.0/255.255.255.0 | Admin |

FIG. 41

| | |
|---|---|
| reversion | float8 |
| reversion_holdback | float8 |
| Status | int4 |
| CreateTime | timestamp |
| ModifyTime | timestamp |
| CreatedBy | varchar(255) |
| ModifiedBy | varchar(255) | uc_stage_name

| | |
|---|---|
| market_cap | int4 |
| max_block_share | float8 |
| max_iday_abs_momentum | float8 |
| max_iday_rel_momentum | float8 |
| max_pal_on_replace | float8 |
| momentum_max | int4 |
| momentum_min | int4 |
| pal_max | float8 |
| pal_min | float8 |
| pm_name | varchar(512) |
| rel_momentum_max | int4 |
| rel_momentum_min | int4 |
| rel_volatility_max | float8 |
| rel_volatility_min | float8 |
| sfail_anomaly_max | float8 |
| sfail_anomaly_min | float8 |
| side | int4 |
| sperad_max | int4 |
| sperad_min | int4 |
| startup_mask | int4 |
| tactical_pullback | int4 |
| volatility_max | float8 |
| volatility_min | float8 |
| Status | int4 |
| CreateTime | timestamp |
| ModifyTime | timestamp |
| CreatedBy | varchar(255) |
| ModifiedBy | varchar(255) | uc_filter_name

FIG. 46B

METHODS AND SYSTEMS RELATED TO TRADING ENGINES

CROSS-REFERENCE TO RELATED APPLICATIONS

The present application is a continuation of U.S. patent application Ser. No. 13/070,852, filed Mar. 24, 2011 now U.S. Pat. No. 8,156,036, which claims the benefit of U.S. Provisional Patent Applications No. 61/317,954 and No. 61/317,969, both filed Mar. 26, 2010, and is a continuation-in-part of U.S. patent application Ser. No. 12/972,725, filed Dec. 20, 2010 now U.S. Pat. No. 8,095,455, which is a continuation of U.S. patent application Ser. No. 11/783,250 (now U.S. Pat. No. 7,908,203), filed Apr. 6, 2007, which claims the benefit of U.S. Provisional Patent Application No. 60/795,646, filed Apr. 28, 2006. The entire contents of each of the above-listed applications are incorporated by reference in their entirety into the present disclosure.

INTRODUCTION

In recent years, the combination of decimalization and market fragmentation has triggered a significant rise in algorithmic trading within the financial industry. TowerGroup defines algorithmic trading as, "placing a buy or sell order of a defined quantity into a quantitative model that automatically generates the timing of orders and the size of orders based on goals specified by the parameters and constraints of the model's logic." An increasing number of traders are turning to algorithms as a lower-cost and theoretically more efficient way to cope with the proliferation of liquidity pools, ever-shrinking order sizes, and "penny-jumping." Celent consulting predicts that the overall trade volume attributed to algorithmic trading will increase from 14% in 2005 to 25% in 2008. Not surprisingly, the increased interest in algorithmic trading has also been accompanied by a dramatic surge in the number of financial firms and third party vendors offering algorithmic trading products. Yet despite this proliferation of algorithmic trading, there are still many traders who are not comfortable with the process of selecting, managing, and evaluating algorithms. This discomfort with algorithmic trading can be attributed to a number of factors. For one, traders have not been given the level of training or technological support required to maximize the benefits of algorithmic trading. Firms have been selling their algorithms as stand-alone products without providing interactive electronic tools to help traders select, manage, and evaluate the algorithms they have at their disposal. As a result, they often find themselves selecting the wrong algorithm, or if they select the right one, failing to manage it properly once it is active. In fact, traders often claim that the algorithms they use under perform their benchmarks. While it is unclear whether this inadequate performance should be attributed to the algorithms themselves or the traders' inability to use them properly, it is clear that many traders are skeptical about the ability of algorithms to match the execution quality that can be achieved with more conventional methods.

Second, the use of the complex algorithms which require less input and management from users has necessarily entailed a loss of control for the trader. In using these complex algorithms, traders have been forced to hand their orders to a "black box," an opaque system that takes inputs and gives outputs without revealing the logic of how it works. While the lack of transparency helps prevent the information leakage that can happen when an algorithm's logic is known or too obvious, it also disintermediates the trader, denying him crucial information about the nature and quality of his executions. As a result, many traders who use these more complex algorithms lose the ability to observe how their orders impact the market. Without these observations, a trader is distanced from "market feel," the very value that he adds as a human trader.

What has been missing from the algorithmic landscape is a system that uses a simple, intuitive interface to enable the automation of complex trading strategies and to provide users with real-time feedback regarding changing market dynamics, market impact and order executions. Existing prior art has attempted to address this need, but has failed; providing only text-heavy user interfaces with information that is hard to understand and even harder to navigate.

In one or more aspects, the subject system provides a combination of simplified initiation and real-time feedback that offers traders a "user-centric" approach to the automation of complex trading strategies. As such, the subject system enhances rather than supplants the value a human brings to the trading process; expanding rather than limiting his perspective on the market and how his orders impact the market through real-time visual indications of changing market conditions, the tactics his algorithms are using and the level of market impact caused by these tactics.

One or more embodiments comprise a method for improving the process of algorithmic trading by simplifying the tasks of initiating and managing algorithms while providing the user with real-time feedback regarding his automated trade executions. Exemplary embodiments overcome the limitations of known algorithmic trading products by (1) enabling market participants to use a simple, intuitive graphical interface to initiate complex, multi-algorithm trading strategies through drag and drop motions, (2) enabling users to monitor informational market impact costs in real time, (3) automating the selection, management, and cancellation of algorithms according to user inputs, real-time analysis of an algorithm's performance and predictive insights as to an algorithm's future performance, (4) enabling the use of broker-specific algorithms within the automated selection, management, and cancellation of algorithms, (5) adding automated strategy selection to the automation of algorithm selection, management and cancellation, (6) providing market participants with visual indications that display algorithmic order activity, the type of execution tactics used by the subject system's active algorithms, and the maximum rate of execution that can be safely achieved without triggering additional market impact costs through information leakage, (7) enabling users to monitor both their trading positions and the market's position against a benchmark in real time, and/or (8) providing users with a perspective on where a particular stock fits within the larger context of the market.

One important definition of market impact is offered by Doyne Farmer and Neda Zamani in their paper entitled, "Mechanical vs. informational components of price impact," http://www.santafe.edu/research/publications/working/papers/06-09-034.pdf) But while the inventors have selected this definition of market impact for use in describing certain exemplary embodiments, there are many other functional definitions of market impact which may be substituted for this definition and are thereby encompassed by the present invention.

In their paper Farmer and Zamani note that, "it is well known that trading impacts prices—orders to buy drive the price up, and orders to sell drive the price down." However they then go on to decompose the concept of "market impact" into two distinct components: mechanical and informational impact. Mechanical impact is defined "in terms of the change in the mid-point price when an event is removed, but all other events are held constant;" meaning that mechanical impact is the inevitable change in price due purely to the presence of the event. On the other hand, informational impact is defined as the portion of total impact that cannot be explained by mechanical impact, the component of market impact that is most sensitive to changes in trading tactics.

Herein, when the term "market impact" is used, it refers to informational market impact. However, while Farmer and Zamani only quantify market impact as an "after the fact" average based on a large number of experiments, informational market impact also can be measured in real time through other means, including tracking the execution rate anomaly of an algorithm, or the difference between the algorithm's expected rate of execution and its actual rate of execution.

This observation supports the conjecture that execution rate anomaly can be used as a proxy for informational market impact. This is a valid correlation because unexpectedly low execution rates are usually the clearest sign available that other market participants are changing their perception of fair price due to the algorithm's order placement activity. Abnormal execution rates can logically be attributed to exogenous factors influencing the price of a stock, the most common of which are information leaks about pending or potential trades in the market. These information leaks are the most common drivers of trading anomalies, because when the leaks occur it becomes more difficult to fill orders as the leaks simultaneously discourage potential counterparties who fear being on the wrong side of potential price moments, and encourage potential competitors who hope to profit from these same potential price moments. As a result, information leaks often cause a reduction or increase in the rate of execution to a level below or above what would have been otherwise expected. On the other hand if the execution rate is normal, it is logical to assume that information is not being leaked or if it is, the leaks are not significant enough to have the effect of discouraging potential trade counterparties or encouraging potential competitors.

Because of this tight correlation between execution rate anomaly and information leakage, certain exemplary embodiments of the subject system rely on a real-time measurement of the difference between the expected and the actual rates of execution of its algorithms as real-time indication of market impact. More specifically, an exemplary embodiment of the subject system may deem an algorithm to be "successful"—defined as not leaking enough trade information so as to cause any significant market impact, if its actual rate of execution is no more than one standard deviation below the expected rate given the current state of the market. On the other hand, if the difference between the expected and actual rates of an algorithm's execution is greater than one standard deviation, then an embodiment of the subject system may deem that algorithm to be "failing"— defined as causing enough information leakage so as to drive noticeable market impact. As a result, this measurement serves as an indication as to whether a tactic is successful and should be left in operation, or if it is failing and needs updating. To minimize the need for such updates, one or more embodiments of the subject system utilize a predictive model to pre-empt tactical failure based on real-time market information including the market response to the algorithm's orders, and whenever possible, updates the tactic before it is found to fail.

The rate of execution of a tactic is defined as the number of shares executed by the tactic during the time interval for which it was in operation, divided by the total shares printed to the tape during the same time interval. To determine the expected rate of execution for each of the tactics employed by its algorithms, one embodiment of the subject system first determines the current value of a technical price momentum indicator using technical analysis algorithms well known to those skilled in the art. It then looks up in a table stored in a database the historical average participation rate achieved when the momentum was within 5% of the current value. This database table is populated with records of past trades, storing in each case the achieved participation rate and the momentum at the start of the trade. In other embodiments, other prediction models including multivariate models such as Neural Networks, Linear Regression models or other predictive models known in the art may be used to map a quantitative representation of the current state of the market to an expected execution rate for the given tactic.

Once the tactical algorithm is operating, its actual rate of execution may be determined by calculating the shares executed by an algorithm divided by the total shares printed to the tape. In one or more embodiments of the subject system, the expected rate of execution is compared with the actual rate of execution at the end of intervals comprising the greater of one minute or 5 prints on the tape; if the difference between the two numbers is greater than one standard deviation then the subject system either adjusts the tactic or cancels it and selects a new tactic accordingly. Alternate exemplary embodiments employ an exponentially-decayed moving average of this execution rate measure. Importantly, in these embodiments the subject system also anticipates tactical failure by monitoring market response to the algorithm's orders, and predicting the likelihood of low execution rates based upon this conditioning information; if the likelihood of a low rate is above a pre-configured threshold value then the subject system preemptively adjusts the tactic or cancels it and selects a new tactic accordingly. Indicators of market response include orders placed by third parties immediately following the algorithm's orders, the cancellation or execution of orders on the contra side, or adverse price movements. Those skilled in the art will easily envision other methods of hypothesis validation for detecting when the actual observations invalidate expectations based upon which the tactic was selected.

In addition, it is important to note that while the exemplary embodiments of the subject system described herein reference primary usage in the financial, and in particular the equities market, embodiments of this invention also may be used in a range of industries beyond the financial markets, including but not limited to financial derivatives such as futures and options, commodities, airline tickets, manufacturing parts, or any other fungible items traded on an electronic marketplace, where a large order can be broken down into a plurality of smaller orders.

At least one aspect comprises a method comprising: (a) receiving electronic data describing a trading order from a market participant; (b) associating the trading order with one or more target brokers, (c) selecting with a processing system one or more first trading algorithms from a plurality of available stored algorithms for execution of the trading order; (d) commencing with the processing system execution of the trading order via the one or more first trading algorithms; (e) evaluating with the processing system quality of execution, during the execution, of the trading order via the one or more first trading algorithms; and (f) if the evaluated quality of execution compares unfavorably to a threshold of acceptability, switching with the processing system the execution of the trading order to one or more second trading algorithms, wherein the processing system comprises one or more processors.

In various embodiments: (1) the one or more first trading algorithms selected from a plurality of available stored algorithms for execution of the trading order consists are associated with the one or more target brokers; (2) the step of associating the trading order with the one or more target brokers is the result of a default configuration; (3) the step of associating the one or more target brokers is the result of an active selection made by the processing system from a list of one or more target brokers; (4) step of selecting an algorithm is based on one or more filters applied by the processing system to the trading order; (5) the step of selecting an algorithm is based on one or more filters applied by the processing system to the trading order; (6) the step of selecting an algorithm is based on classification parameters applied by the processing system; (7) the step of selecting an algorithm is based on classification parameters applied by the processing system; (8) the step of selecting an algorithm associated with one or more of the one or more of the target brokers is limited to a subset of algorithms which also meets parameters applied by the one or more filters; (9) the step of selecting an algorithm associated with one or more of the one or more of the target brokers is limited to a subset of algorithms which also meets the additional classification parameters applied by the processing system; (10) if there is no algorithm associated with one or more of the one or more brokers that also meets the parameters applied by the processing system, the processing system selects one or more trading algorithms from a plurality of available stored algorithms that is not associated with one or more of the one or more target brokers; (11) if there is no algorithm associated with one or more of the one or more brokers that also meets parameters applied by the filter, the processing system selects one or more trading algorithms from a plurality of available stored algorithms that is not associated with one or more of the one or more target brokers; (12) if the one or more first trading algorithms selected for execution of the trading order from a plurality of available stored algorithms is also an algorithm associated with the one or more target brokers, the processing system sends an identifier to the one or more target brokers allowing the one or more target brokers to recognize the order as coming from the market participant rather than the processing system; (13) the processing system sends execution reports regarding the trading orders executed by the algorithm associated with the one or more target brokers to the market participant identifying the one or more target brokers associated with the algorithm; (14) if the one or more first trading algorithms selected for execution of the trading order from a plurality of available stored algorithms is also an algorithm associated with the one or more target brokers, once one or more order executions is associated with the one or more target brokers for a given symbol and side, subsequent orders in that symbol and side automatically flow back to the same one or more target brokers; (15) the step of associating the trading order with one or more target brokers is based on targets specified by the market participant for directing order flow to one or more the target brokers; (16) the market participant is able to manage the targets for directing order flow via a graphical user interface; (17) the step of selecting an algorithm associated with one or more of the one or more of the target brokers is based on targets specified by the market participant for directing order flow to one or more target brokers; (18) the market participant is enabled to manage the targets for directing order flow via a graphical user interface; (19) the second trading algorithm is associated with the one or more target brokers selected in step (c); (20) the second trading algorithm is associated with another one of the one or more target brokers; (21) the threshold of acceptability is based on a prediction of future performance of execution of the trading order by the one or more first trading algorithms; (22) the method further comprises overriding the associated target broker based on one or more filters applied to the trading order; and/or (23) the method further comprises overriding the associated target broker based on a remaining quantity of the trading order.

At least one other exemplary aspect comprises a method comprising: (a) receiving electronic data describing a trading order; (b) receiving data describing a selection of one or more first trading algorithms from a plurality of available stored algorithms for execution of the trading order; (c) commencing with a processor unit execution of the trading order via the one or more first trading algorithms; (d) evaluating with the processor unit quality of execution, during the execution, of the trading order via the one or more first trading algorithms; (e) comparing with the processor unit the evaluated quality of execution to a prediction of future performance of execution of the trading order by the one or more first trading algorithms; and (f) if the evaluated quality of execution compares unfavorably to the prediction of future performance, switching with the processor unit the execution of the trading order to one or more second trading algorithms, wherein the processor unit comprises one or more processors.

Related systems and software are comprised in other aspects.

BRIEF DESCRIPTION OF THE DRAWINGS

FIG. 1 shows a watch list having symbols representing securities;

FIG. 2 shows the watch list of FIG. 1, except with an enlarged symbol;

FIGS. 11A-11H show examples of tactic update messages in the strategy-progress area;

FIG. 12 shows the positions window with active orders in multiple symbols;

FIG. 13 shows the positions window for a symbol with multiple active algorithms;

FIG. 14 shows the positions-window toolbar;

FIG. 15 shows the positions-window toolbar in a pipeline embodiment;

FIGS. 25A and 25B show the use of the "rotate" arrow to flip from the benchmark dial to the market context;

FIGS. 29-33 are screen shots showing a variation of an exemplary embodiment in which the trader can control the speed of an algorithm.

FIG. 34 depicts an exemplary Target Brokers display.

FIG. 35 depicts an exemplary Firms display.

FIG. 36 depicts an exemplary Users display.

FIG. 37 depicts an exemplary Broker-Firm Assignment display.

FIG. 38 depicts an exemplary Target Allocations display.

FIG. 39 depicts an exemplary Trade Volume display.

FIG. 40 depicts an exemplary Roles display.

FIG. 41 depicts an exemplary Access display.

DETAILED DESCRIPTION OF CERTAIN EXEMPLARY EMBODIMENTS

Figure 3:
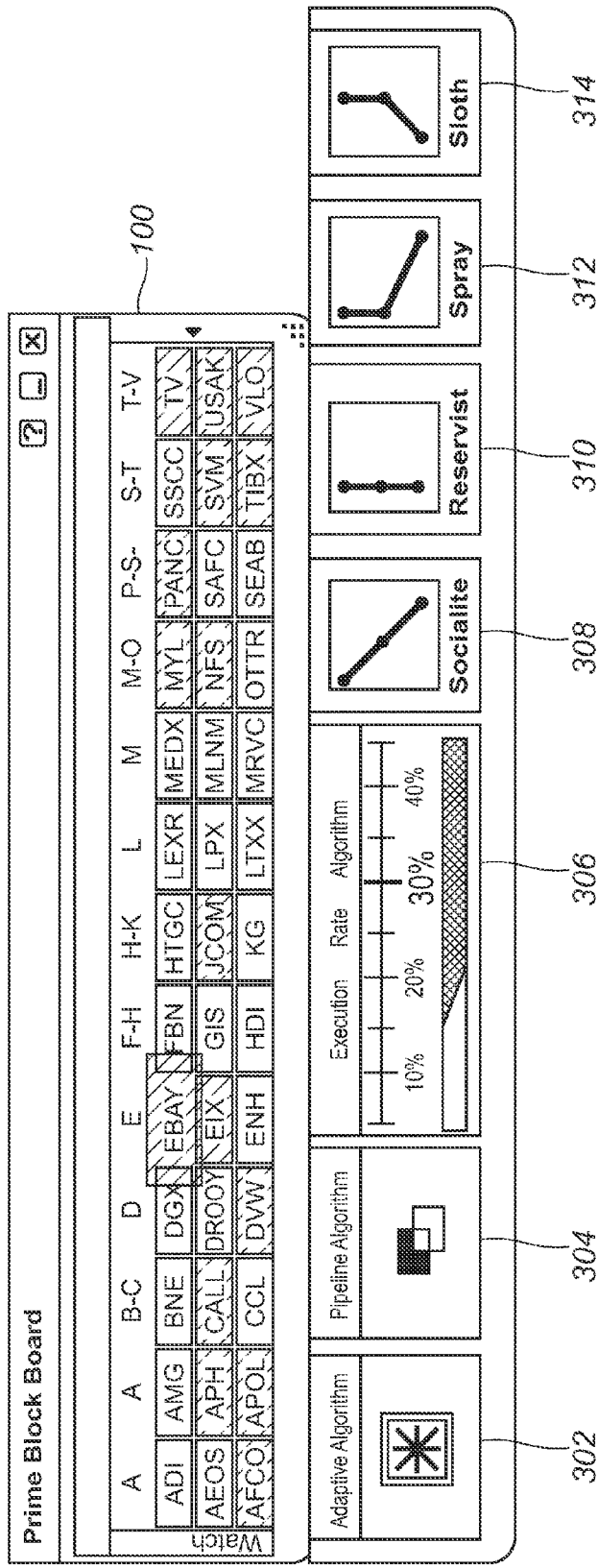
FIG. 3 shows a dashboard.

Certain exemplary embodiments of the present invention will be set forth in detail with reference to the drawings, in which like reference numerals refer to like elements or steps throughout.

A "tactical" algorithm is a computerized process to execute a large order by repeatedly placing smaller buy or sell orders until the total quantity is completed, wherein the algorithm is optimized to be most effective in specific market conditions, without regard to the possibility that it may not function properly in other market conditions. As such, a tactical algorithm is invoked to execute part but possibly not all of an order, with the limited tactical objective such as minimizing informational market impact in the current market environment. A "strategic" algorithm is a computerized process to execute a large order by invoking one or more tactical algorithms, depending on the market conditions, to ensure that the process functions optimally at any time. A strategic algorithm is invoked to execute an entire order, and maintain a strategic objective such as minimizing overall market impact costs for the entire order.

In one or more exemplary embodiments, a user can choose between a selection of "strategic" algorithms and a selection of "tactical" algorithms when deciding on which algorithm to use for his trading strategy. For the purposes of this description, a "strategic" algorithm is defined an algorithm capable of automatically selecting, initiating, and then managing a group of tactical algorithms according to pre-programmed logic that dictates which algorithms are best suited to respond to specific market conditions or specific changes in market conditions. In at least one embodiment, the subject system offers three strategic algorithms: the "Adaptive" algorithm, the "Execution Rate" algorithm, and the "Pipeline" algorithm.

In this exemplary embodiment, all three strategic algorithms use expected rate of execution to select and initiate the algorithm best suited to fill a user's order given existing market conditions. Then, all three of these strategic algorithms use a measure of market impact—the difference between expected and actual rates of execution—as an indication of whether or not the selected tactical algorithm is succeeding and should be left "on," or if it is failing and must be turned "off." However, while this embodiment employs strategic algorithms that use execution rate and execution rate anomaly to drive the selection and management of tactical algorithms, one skilled in the art will easily envision embodiments wherein the strategic algorithms employ other logic and feedback mechanisms to drive the process of selecting and managing their available universe of tactical algorithms.

While a strategic algorithm is an algorithm capable of initiating and then managing a complete trading strategy in the face of changing market conditions, a tactical algorithm can only place and manage a series of discreet orders according to pre-programmed instructions. A specific example of a tactical algorithm is an algorithm that posts 100 shares on the bid, cancels if unfilled after 2 minutes, posts again on the new bid, and so on until the total desired quantity has been purchased. Therefore a tactical algorithm is a relatively simple algorithm that follows a single behavior which is characterized in how it reacts to events and data from the market.

It is important to note the distinction between strategic algorithms and tactical algorithms. When a user selects a strategic algorithm, he does not have to decide which tactical algorithms are best suited for the existing market conditions, nor does he have to manage the level of the tactical algorithm's aggression as the market moves. The only pieces of information the trader needs to provide when he uses a strategic algorithm are his trading parameters, for example (but not limited to): size and price. On the other hand, when a trader uses a tactical algorithm he must both select the algorithms and set the parameters for the algorithm's operation. In addition, he must manually change these operating parameters to maintain his strategy as market conditions change.

In this description, a system using one or more strategic algorithms to coordinate and potentially switch between a plurality of tactical algorithms may be referred to as an "algorithm switching engine" or simply "switching engine."

As noted above, one or more exemplary embodiments of the subject system offers users three strategic algorithms: the Adaptive algorithm, the Execution Rate algorithm and the Pipeline algorithm. As a strategic algorithm, the Adaptive algorithm is an algorithm that uses a measurement of market impact as defined in the summary section to automate the selection and management of a set of tactical algorithms in keeping with a strategy that can be summarized in two goals:

ensuring that an order is completed and minimizing market impact while the order is being worked.

To translate these high-level goals into order executions, the Adaptive algorithm uses a calculation of expected execution rate to determine which tactical algorithm is best suited for the current market and to define a set of operating parameters for that tactical algorithm. These operating parameters include but are not limited to limit price and aggression level. Then once the selected tactical algorithm begins to work the order: the subject system monitors both changes in market conditions and the algorithm's actual rate of execution, and adjusts its operational parameters or selects a new tactical algorithm to ensure that the rate of order executions stays inline with the Adaptive algorithm's two primary goals. More specifically, the Adaptive algorithm may select and then manage its tactical algorithms such that the actual rate of execution does not fall more than one standard deviation below or two standard deviations above the expected rate of execution, based upon the assumption that a strong mismatch between expected and actual rate of execution is a reflection of informational leakage. Furthermore it may always terminate any tactical algorithms that result in actual execution rates below 5%.

To calculate the expected rate of execution within existing market conditions for each of the tactical algorithm within its universe of control, the Adaptive algorithm uses the current value of a technical price momentum indicator which the subject system pulls from a table stored in the computer's memory. To populate this table, a historical database of past trades is used to calculate the historical average rate of each tactic for various ranges of values of price momentum. Then once the Adaptive Algorithm accesses this table containing the expected rate of execution calculated for each of its tactical algorithms within the existing market conditions; it compares such expected rates to the overall average rate of execution of the tactical algorithms, in order to determine the marginal effect of the momentum on the expected execution rate. This difference between the expected rate given the current market conditions and the overall average rate for this tactic is called the "rate anomaly" below. The Adaptive algorithm selects the tactical algorithm with the lowest rate anomaly—and by correlation the lowest rate of market impact. Tactical agents are classified as "slow", "normal" and "aggressive" according to their designed speed of execution; the expected rate of the "normal" rate tactic with the lowest rate anomaly will be referred to below as "red-line" rate: it is a proxy for the highest rate one would expect to accomplish without making the algorithmic trading activity easily detectable by other market participants.

Once the tactical algorithm is operating, its actual rate of execution is then compared with the expected rate of execution at the end of every minute interval. The actual rate of execution is determined by the shares executed by the tactical algorithm divided by the total shares printed to the tape; usually provided as a percentage. If the actual execution rate falls more than one standard deviation or rises more than two standard deviations from expectations, that particular tactical algorithm is disabled and replaced by a new tactical algorithm selected via the same mechanism as described above. To prevent itself from selecting the same tactical algorithm twice in a row, the Adaptive algorithm remembers the three most recently disabled tactics and will not select them as long as they are on the list of the last three tactical algorithms selected. While this embodiment of the Adaptive algorithm employs this measurement of execution rate anomaly as a mechanism for driving the selection and management of tactical algorithms, other mechanisms for selecting tactical algorithms envisioned by those skilled in the art also apply.

The "Execution Rate" algorithm also is a strategic algorithm. However, while the purpose of the Adaptive algorithm is to automate a trading strategy based on minimal market impact (measured as the difference between actual execution rate and the expected rate for that tactic given the current market conditions), the purpose of the Execution Rate algorithm is to give the user the flexibility to automate a trading strategy according to the specific level of market impact with which he is comfortable. For instance, the Execution Rate algorithm would be ideal for a trader who has more time to complete his order and wants to use an execution rate that is lower than the Adaptive algorithm's stated participation rate target (for example, 20% execution rate), or for a trader who has less time, is not worried about market impact, and is willing to accept a more aggressive execution rate in order to get more done in a shorter timeframe.

Just like the Adaptive Algorithm, the Execution Rate algorithm uses a measurement of market impact to select and then manage the universe of tactical algorithms at its disposal. However, when a user initiates the Execution Rate algorithm, the system does not assume that the user's preferred execution rate is the posted value (20% in the above example) for the Adaptive algorithm. Instead, when the user initiates the Execution rate algorithm, he must select his preference for expected execution rate; anywhere from 5% up to 40%. Then once the user indicates his preferred execution rate, the system selects the tactical algorithm and associated operating parameters that will best meet the user's input given the existing market conditions. Again, the system uses the same methods for calculating the expected rate of execution for each of the available tactical algorithms described above.

Then, as the tactical algorithm begins to work the order, the subject system monitors the actual rate of execution, determined by the number of shares executed by an algorithm divided by the total shares printed to the tape, at the end of each minute interval. It then compares the expected execution rate selected by the user and the actual execution rate, and if the difference between the two numbers is greater than one standard deviation, it makes adjustments to the operating parameters and/or the tactical algorithm in use to ensure that the Execution Rate algorithm maintains the rate selected by the user.

The Pipeline Algorithm is the subject system's third strategic algorithm, but is only available in embodiments associated with the Pipeline alternative trading system. While there are many FIGS., examples and elements in this application that reference an embodiment of the subject system adapted for use with the Pipeline Trading system, the subject system is designed to work as an adjunct to any proprietary trading system or trading platform, and the use of examples from the embodiments developed for Pipeline in no way limits the scope of the invention.

The purpose of the Pipeline algorithm is to allow users to initiate a strategy which will place block orders on the Pipeline trading system when certain conditions are met. For example, a user can indicate specific prices or price ranges when he would want to place or cancel a block order on Pipeline. A user can also specify the size of the blocks that are placed, as well as the frequency with which blocks are replenished after fills. In addition, the Pipeline Algorithm allows the user to coordinate the entry and cancellation of blocks on Pipeline with the user's other algorithmic activity conducted via the subject system in the same symbol.

Finally, to further reduce the number of times a trader must respond to the Pipeline system, a trader can use the Pipeline algorithm to set a price limit for automatically accepting passive counter-offers that fail to execute at the reference price but fall within the NBBO, and/or to designate the specific circumstances when he would be willing to accept a trade outside of the midpoint—for example where the current offered price is below the 10-minute trailing average price, or other price validation methods that can be imagined to those skilled in the art.

In addition, those skilled in the art will envision other order entry elements related to trading on the Pipeline System that are not described herein but are included within the scope of the invention. When used in conjunction with either the Adaptive algorithm, the Participation rate algorithm or any of the tactical algorithms, the Pipeline algorithm ensures that a user will not miss the opportunity for a block cross while he works his order in smaller increments through the subject system's other algorithmic offerings.

Finally, while some exemplary embodiments only incorporate these three strategic algorithms, other embodiments which include other algorithms, either those associated with the subject system or offered by third parties (e.g. brokers and independent vendors), will easily be envisioned by those skilled in the art and are included in the scope of the invention.

While some of the embodiments discussed above allow a user to select from a set of strategic algorithms, one or more alternate exemplary embodiments automate the step of strategy selection by employing a complex set of filters referred to colloquially herein as "Filter B." The purpose of these Filter B embodiments is to add an additional layer of automation and "intelligence" to the system that is capable of assigning a strategy type to an order based on the system's knowledge of the submitting trader's trading patterns, information about the order, and current market conditions. Then after Filter B has determined the best strategy for a given order, it is capable of making the necessary communications to initiate the process described above wherein a strategic algorithm selects and switches among a particular universe of tactical algorithms. In an exemplary embodiment, a Filter B component operates as a "frontal cortex" to an algorithm switching engine, but this description of a Filter B component's ability to initiate the appropriate strategic algorithm is not limited to a particular algorithm switching engine or the three specific strategic algorithms described above. Rather it is a reference to a Filter B component's ability to communicate with, interact with, and initiate a system capable of automatically selecting, initiating, and then managing a group of strategic and/or tactical algorithms according to an analysis or evaluation of which algorithms are best suited to handle the market conditions or the changes in market conditions over a given period of time.

For example, after reviewing an order and the related trader and market information, a Filter B component may determine that a "reservist" strategy is the best strategy for that order given the system's knowledge about the initiating trader and the market conditions at that moment in time. After making that determination, the Filter B component would then tell the switching engine that it selected the reservist strategy, and the switching engine would know that it needed to narrow its universe of available algorithms to the subset of algorithms tagged as acceptable for an order designated a "reservist" strategy.

Then once the algorithm switching engine begins to execute the order, any one of a number of triggers can initiate a "hypothesis validation" check whereby the Filter B component reviews and either confirms or rejects the strategy previously assigned to the original order. These triggers can include but are not limited to: decisions made by the Algorithm Switching Engine, movements in the market, actions taken by the trader, or the passage of a certain amount of time. If the hypothesis validation check determines that the previously assigned strategy is either no longer valid or is no longer the best strategy for the remainder of the order given existing market conditions, Filter B has the ability to cancel the active strategy, assign a new strategy, and communicate the change and all associated requirements to the algorithm switching engine.

These Filter B embodiments seek to maximize efficiency of storage and re-use of data to the largest extent possible. This may be accomplished, for example, by breaking the data out into three primary entities:

Stage—A collection of settings that direct the trading of an order at a given point along its overall execution plan.

Filter—A collection of attributes that define the types of orders that fall under the filter, along with an associated collection of Stages that direct the trading of the order.

Filter Set—A logical collection of 1 to N Filters.

A Stage may be used in one or more Filters. A Filter may belong to one or more Filter Sets. Filter Sets may be accessed by one or more Firms/Traders in the trading system.

This may be implemented via a secondary set of relational entities

Filter Stage—Maps a Stage to a particular Filter, along with a rank against other Stages for that Filter.

Filter Set Member—Maps a Filter to a Filter Set, along with a rank against other Filters in that Set.

Filter Set Access—Associates a Filter Set to a Firm, Trader, or a Firm's Order Route (FIX Session).

Trading Server

Figure 46A:
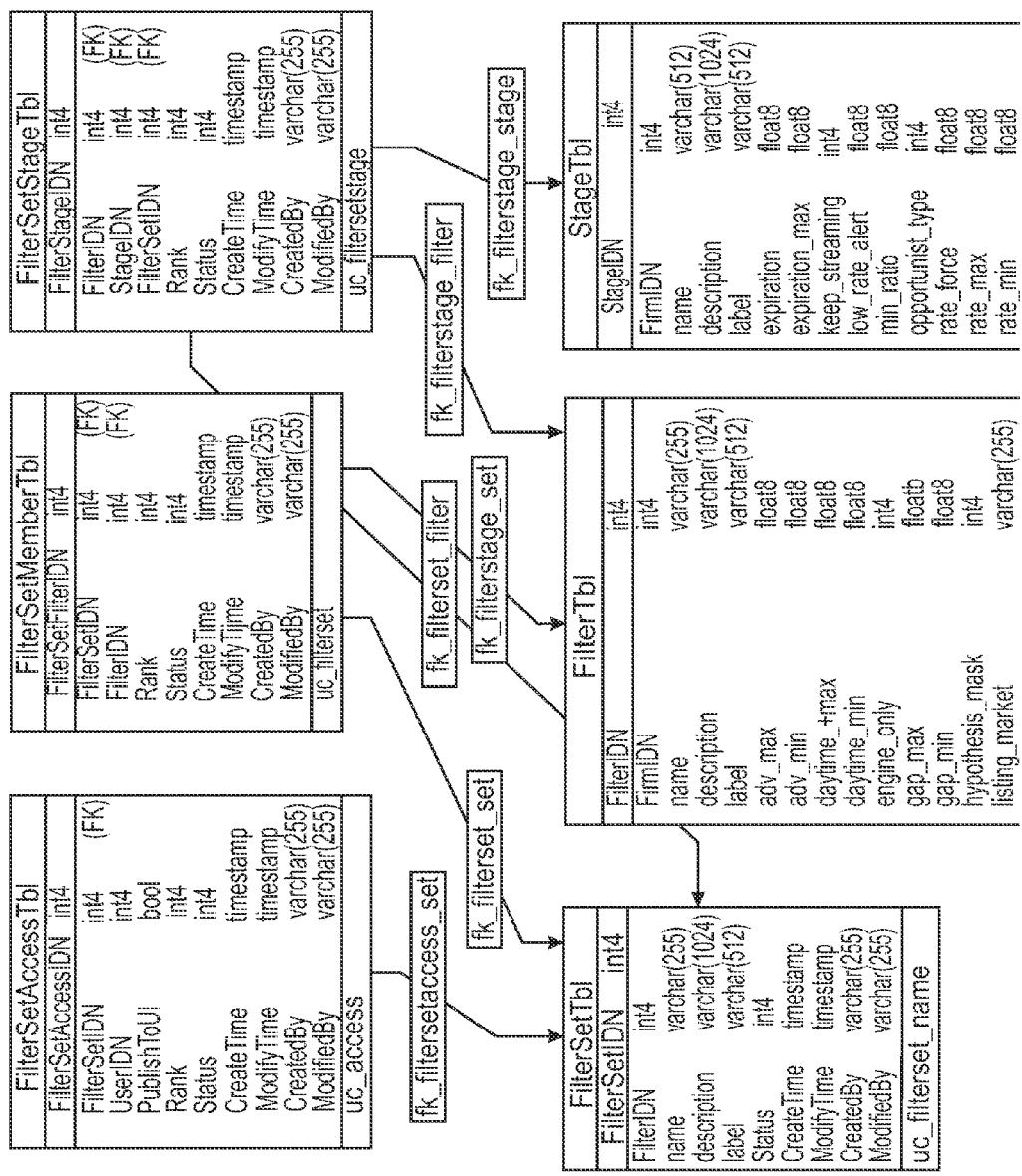
FIG. 46 depicts an exemplary Trading Server filter table relational diagram.

An exemplary Trading Server filter table relational diagram is depicted in FIG. 46.

Primary Entity Tables

FilterTbl

The FilterTbl holds data to a uniquely defined Filter. The design allows for a Filter to be used by a single Filter Set, or to be reused by multiple Filters Sets. See Tables 1 and 2.

TABLE 1

| Columns | Data Type | Comment |
| --- | --- | --- |
| FilterIDN | int4 | Unique identifier for this Filter. |
| FirmIDN | int4 | Optional to restrict ownership of the Filter to a single Firm. If > 0, the stage will only be available for Filter Sets created for the specified Firm. |
| Name | varchar(255) | Name of the Filter. Used as a unique human readible identifer. |
| description | varchar(1024) | Description of the Filter. |
| Label | varchar(512) | Optional label for the Filter to be used in UI elements (GUI/Reports/CIS). If not set, will default to Name. |
| adv_max | float8 | |
| adv_min | float8 | |
| daytime_max | float8 | |
| daytime_min | float8 | |
| engine_only | int4 | |
| gap_max | float8 | |
| gap_min | float8 | |
| hypothesis_mask | int4 | |
| listing_market | varchar(255) | |
| market_cap | int4 | |
| max_block_share | float8 | |
| max_iday_abs_momentum | float8 | |
| max_iday_rel_momentum | float8 | |

TABLE 1-continued

| Columns | Data Type | Comment |
|---|---|---|
| max_pal_on_replace | float8 | |
| momentum_max | int4 | |
| momentum_min | int4 | |
| pal_max | float8 | |
| pal_min | float8 | |
| pm_name | varchar(512) | |
| rel_momentum_max | int4 | |
| rel_momentum_min | int4 | |
| rel_volatility_max | float8 | |
| rel_volatility_min | float8 | |
| sfall_anomaly_max | float8 | |
| sfall_anomaly_min | float8 | |
| Side | int4 | |
| spread_max | int4 | |
| spread_min | int4 | |
| startup_mask | int4 | |
| tactical_pullback | int4 | |
| volatility_max | float8 | |
| volatility_min | float8 | |
| Status | int4 | Status of the Record (Active | DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 2

| Constraints | Kind | Columns | Comment |
|---|---|---|---|
| uc_name | PRIMARY KEY UNIQUE | FilterIDN name, FirmIDN | Each Filter must have a unique name within a given firm. |

StageTbl

The StageTbl holds data to a uniquely defined Filter Stage. The design allows for a Stage to be used by a single Filter, or to be reused by multiple Filters. See Tables 3 and 4.

TABLE 3

| Columns | Data Type | Comment |
|---|---|---|
| StageIDN | int4 | Unique identifier for this Filter Stage. |
| FirmIDN | int4 | Optional to restrict ownership of the Stage to a single Firm. If > 0, the stage will only be available for Filters created for the specified Firm. |
| Name | varchar(512) | Name of the Stage. Used as a unique human readible identifer, |
| description | varchar(1024) | Description of the stage. |
| Label | varchar(512) | Optional label for the Stage to be used in UI elements (GUI/Reports/CIS). If not set, will default to Name. |
| expiration | float8 | |
| expiration_max | float8 | |
| keep_streaming | int4 | |
| low_rate_alert | float8 | |
| min_ratio | float8 | |
| opportunist_type | int4 | |
| rate_force | float8 | |
| rate_max | float8 | |
| rate_min | float8 | |
| reversion | float8 | |
| reversion_holdback | float8 | |
| Status | int4 | Status of the Record (Active | DELETE). |

TABLE 3-continued

| Columns | Data Type | Comment |
|---|---|---|
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 4

| Constraints | Kind | Columns | Comment |
|---|---|---|---|
| uc_name | PRIMARY KEY UNIQUE | StageIDN name, FirmIDN | Each Stage must have a unique name within a given Firm. |

FilterSetTbl

The Filter SetTbl holds data to a uniquely defined Filter Set, comprised of one or more Filters. The design allows for a Filter Set to be used by a single Firm/Trader, or to be reused by multiple Firm/Traders. See Tables 5 and 6.

TABLE 5

| Columns | Data Type | Comment |
|---|---|---|
| FilterSetIDN | int4 | Unique identifier for this Filter Set. |
| FirmIDN | int4 | Optional to restrict ownership of the Filter Set to a single Firm. If > 0, the Filter Set will only be available for the specified Firm. |
| Name | varchar(255) | Name of the Filter Set. Used as a unique human readible identifer. |
| description | varchar(1024) | Description of the Filter Set. |
| Label | varchar(512) | Optional label for the Filter Set to be used in UI elements (GUI/Reports/CIS). If not set, will default to Name. |
| Status | int4 | Status of the Record (Active|DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 6

| Constraints | Kind | Columns | Comment |
|---|---|---|---|
| uc_name | PRIMARY KEY UNIQUE | FilterSetIDN name, FirmIDN | Each Filter Set must have a unique name within a given firm. |

Relational Tables

FilterStageTbl

The FilterStageTbl holds the mappings of unique Stages to Filters. See Table 7 and 8.

TABLE 7

| Columns | Data Type | Comment |
|---|---|---|
| FilterStageIDN | int4 | Unique identifier of the Stage to Filter mapping. |
| FilterIDN | int4 | Unique identifier of the related Filter. |
| StageIDN | int4 | Unique identifier of the related Stage. |
| FilterSetIDN | int4 | FilterSet that this Filter/Stage ranking is associated. |

TABLE 7-continued

| Columns | Data Type | Comment |
| --- | --- | --- |
| Rank | int4 | Optional rank within the Filter Stages. NOTE: Rank is not enforced to be unique within a set of Filter Stages. |
| Status | int4 | Status of the Record (Active\|DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 8

| Constraints | Kind | Columns | Comment |
| --- | --- | --- | --- |
| | PRIMARY KEY | FilterStageIDN | |
| uc_filterstage | UNIQUE | FilterIDN, StageIDN, FilterSetIDN | Unique mapping of a Stage to a Filter within a FilterSet. NOTE: Rank is not enforced to be unique within that Filter's Stages. This means all of the Stages within a set can have the same Rank, but a Stage can only be included in a set once. It is up to the application to enforce rules for Rank. |

FilterSetMemberTbl

The FilterSetMemberTbl holds the mappings of one or more Filters to a given Filter Set. It also provides a mechanism for Ranking a Filter within a given Filter Set. See Tables 9 and 10.

TABLE 9

| Columns | Data Type | Comment |
| --- | --- | --- |
| FilterSetFilterIDN | int4 | Unique identifier of Filter to Set mapping. |
| FilterSetIDN | int4 | Unique Id of related Filter Set. |
| FilterIDN | int4 | Unique Id of related Filter. |
| Rank | int4 | Numeric rank within the set. NOTE: Uniqueness of the rank within the set is NOT enforced. |
| Status | int4 | Status of the Record (Active\|DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 10

| Constraints | Kind | Columns | Comment |
| --- | --- | --- | --- |
| | PRIMARY KEY | FilterSetFilterIDN | |
| uc_filterset | UNIQUE | FilterSetIDN, FilterIDN | Unique mapping of a Filter to a Set. NOTE: Rank is not enforced to be unique within that set. This means all of the Filters within a set can have the same Rank, but a Filter can only be included in a set once. It is up to the application to enforce rules for Rank. |

FilterSetAccessTbl

The FilterSetAccessTbl maps a Filter Set to a given Firm (required) and optionally Trader or Order Route (FIX Session). See Tables 11 and 12.

TABLE 11

| Columns | Data Type | Comment |
| --- | --- | --- |
| FilterSetAccessIDN | int4 | Unique identifier of the Filter Set Access record. |
| FilterSetIDN | int4 | Foreign Key to unique identifier of the Filter Set. |
| UserIDN | int4 | Optional. If set, a specific trader assignment (as opposed to a firm level default). |
| PublishToUI | bool | If true, the Filter Set will be available to the Trader's GUI. |
| Rank | int4 | Ordering of this FilterSet for the Firm/User/Route. |
| Status | int4 | Status of the Record (Active\|DELETE). |
| CreateTime | timestamp | Time the record was created. |
| ModifyTime | timestamp | Time the record was modified. |
| CreatedBy | varchar(255) | Operator who created the record. |
| ModifiedBy | varchar(255) | Operator who last modified the record. |

TABLE 12

| Constraints | Kind | Columns | Comment |
| --- | --- | --- | --- |
| | PRIMARY KEY | FilterSetAccessIDN | |
| uc_access | UNIQUE | FilterSetIDN, UserIDN | The access association is unique to a combination of Filterset and User values. |

Other Exemplary Tables

Order Summary (routed) and Fill Summary records should store the applicable FilterStageIDN.

Exemplary Data Structures

At StartOfDay sortd loads three hashes with the primary filter data.
  Hash of FilterSets with key=FilterSetIDN
  Hash of Filters with key=FilterIDN
  Hash of Stages with key=StageIDN
Each FilterSet preferably has a:
  Vector of pointers to Filter Wrapper Objects, ordered using the FilterSetMemberTbl.
Filter Wrapper Object has 4 members
  FilterSetMemberIDN—used for processing updates from the Help Desk.
  Status—used for handling intraday deletes.
  Pointer to a Filter Object.
  A vector of Stage Wrapper Objects
    A Stage Wrapper Object has 3 members
      FilterStageIDN (this will be needed for Order Summary records)
      Status—used for handling intraday deletes.
      Pointer to a Stage Object.
Each User has a:
  Vector of FilterSet Wrapper Objects ordered by Rank using the FilterSetAccessTbl.
  A FilterSet Wrapper Object has 3 members:
    A FilterSetAccessIDN—used for processing updates from the Help Desk.
    Status—used for handling intraday deletes.
    Pointer to a FilterSet Object.
Intraday Updates
  When Filters and Stages are removed from FilterSets or FilterSets are removed from Stages sortd will receive FilterStage, FilterSetMember, or FilterSetAccess updates from CIS.
  These updates will be compared against the IDN's in the Wrapper Objects.

FilterSets, Filters, and Stages can be set to a "DELETE" status during the day based on Live Updates from CIS. Nothing is actually deleted until the end of the day.

Exemplary Help Desk Embodiments

In CIS, Stages, Filters, and FilterSets will be treated similarly to FIX Sessions.

FilterSets can only be Added/Deleted/Copied/Modified from a Filter Management Screen.

FilterSets will be referenced and assigned to Firm/Users in Firm/User screens, but not modified.

Permissions

Filters, Stages, and FilterSets all have an optional FirmIDN field.

If the FirmIDN is "0", the Filter, Stage, or Set can be accessed by any firm/user.

If the FirmIDN is >0, the Filter, Stage, or Set can only be referenced by members of that firm.

FilterSet References

Determining the affected Filters/Sets/Users/Films can be accomplished via the following queries.

If there is a modification requested, the system must verify if that change should be applied to all Users that are referencing the Stage/Filter/FilterSet or whether these changes are for an individual.

Query1—Stage References

List Firms, FilterSets, and Filters that are referencing a specific Stage. SELECT f.description as firm, ft.name as filterset, fr.name as filter FROM filterstagetbl fs
    INNER JOIN stagetbl s ON fs.stageidn=s.stageidn
    INNER JOIN filtertbl fr ON fs.filteridn=fr.filteridn
    INNER JOIN filtersettbl ft ON fs.filtersetidn=ft.filtersetidn
    INNER JOIN filtersetaccesstbl fa ON fs.filtersetidn=fa.filtersetidn
    INNER JOIN usertbl u ON u.useridn=fa.useridn
    INNER JOIN firmtbl f ON f.firmidn=u.firmidn
WHERE
    s.name='Tactical 01'
GROUP BY ft.name, fr.name, f.description
ORDER BY f.description, ft.name, fr.name Query2—Filter References List Firms, FilterSets, that are referencing a specific Filter.
SELECT f.description as firm, ft.name as filterset
FROM filtersetmembertbl fm
    INNER JOIN filtertbl fr ON fm.filteridn=fr.filteridn
    INNER JOIN filtersettbl ft ON fm.filtersetidn=ft.filtersetidn
    INNER JOIN filtersetaccesstbl fa ON fm.filtersetidn=fa.filtersetidn
    INNER JOIN usertbl u ON u.useridn=fa.useridn
    INNER JOIN firmtbl f ON f.firmidn=u.firmidn
WHERE
    fr.name='MunitMgr 01'
GROUP BY ft.name, f.description
ORDER BY f.description, ft.name Query3—FilterSet References List Firms, Users, that are referencing a specific FilterSet.
SELECT f.description as firm, u.logonid as logon
FROM filtersettbl ft
    INNER JOIN filtersetaccesstbl fa ON ft.filtersetidn=fa.filtersetidn
    INNER JOIN usertbl u ON u.useridn=fa.useridn
    INNER JOIN firmtbl f ON f.firmidn=u.firmidn
WHERE
    ft.name='JPMIM—Auto'
ORDER BY f.description, u.logonid FilterSet Copy If the change to the Filter/Stage setting is global, the workflow is simple. Modify the setting and send the appropriate updates to the system.

If the modification is not global then affected FilterSet must be copied before the change can be made.

Copying a FilterSet can be broken down into three basic steps.

Step 1—Duplicate the FilterSet record.

This example creates a copy of "CEF—Auto", renaming it "CEF—Trader X".

The description and label values are kept from the original.
INSERT INTO filtersettbl(name,description,label,firmidn,status,createtime,createdby)
    VALUES('CEF—Trader X',
    (SELECT description FROM filtersettbl WHERE name='CEF—Auto'),
    (SELECT label FROM filtersettbl WHERE name='CEF—Auto'),
    (SELECT firmidn FROM filtersettbl WHERE name='CEF—Auto'),
    1, timezone('UTC'::text, now( )), 'scottl')
);

Live Update

1. CIS sends new FilterSet record to sortd, Action=ADD.
2. Sortd Creates new FilterSet Object.
3. Sortd stores new FilterSet Object in FilterSet Hash.

Step 2—Duplicate FilterSet Members

This step will copy references of all "CEF—Auto" Filters to "CEF—Trader X", preserving their rank.
INSERT INTO filtersetmembertbl(filtersetidn,filteridn,rank,status,createtime,createdby)
SELECT (SELECT filtersetidn FROM filtersettbl WHERE name='CEF—Trader X') as filtersetidn,fm.filteridn,fm.rank
,1, timezone('UTC'::text, now( )), 'scottl'
FROM filtersetmembertbl fm
    INNER JOIN filtersettbl ft ON fm.filtersetidn=ft.filtersetidn
    WHERE ft.name='CEF—Auto';

Live Update

1. CIS sends a list of FilterSetMember records to sortd, action=ADD.
2. Sortd gets FilterSet Object based on FilterSetIDN in FilterSetMember list.
3. Create vector of Filter Wrapper Objects for FilterSet based on FilterSetMember list.

Step 3—Duplicate Filter Stages

This step will copy references of all "CEF—Auto" Stages to "CEF—Trader X", preserving their rank within each filter.
INSERT INTO filterstagetbl(filtersetidn,filteridn,stageidn,rank,status,createtime,createdby)
SELECT (SELECT filtersetidn FROM filtersettbl WHERE name='CEF—Trader X') as filtersetidn,fs.filteridn,fs.stageidn,fs.rank
,1, timezone('UTC'::text, now( )), 'scottl'
FROM filterstagetbl fs
    INNER JOIN filtersettbl ft ON fs.filtersetidn=ft.filtersetidn
    WHERE ft.name='CEF—Auto';

Live Update

1. CIS sends a list of FilterStage records to sortd, action=ADD.

2. Sortd gets FilterSet Object based on FilterSetIDN in FilterStage list.

3. Create hash of vectors of Stage Wrapper Objects for FilterSet based on FilterStage list.

Working with FilterSets

FilterSet assigned to/removed from a User.

These two examples (A and B) show how FilterSets can be assigned/removed to/from a trader. These specific examples illustrate how following a FilterSet Copy, the original FilterSet may be removed.

(A) Assigning a FilterSet to a User.

This query adds the CEF Trader X FilterSet to the logon autoclient@citadel, ranking it behind existing FilterSets assigned to the logon.

INSERT INTO filtersetaccesstbl (filtersetidn,useridn,rank, publishtoui,status,createtime,createdby)

VALUES
(
(SELECT filtersetidn FROM filtersettbl WHERE name='CEF—Trader X'),
(SELECT useridn FROM usertbl WHERE logonid='autoclient@citadel'),
(SELECT max(rank)+1 FROM filtersetaccesstbl WHERE useridn=(SELECT useridn FROM usertbl WHERE logonid='autoclient@citadel')),
't'::bool,1, timezone('UTC'::text, now( )), 'scottl'
);

Live Update

1. CIS sends FilterSetAccess record to sortd, action=ADD.

2. Sortd gets user based on FilterSetAccess record.

3. Sortd creates a FilterSet Wrapper Object and inserts into the users's Filter vector, based on rank in FilterSetAccess record.

(B) Removing a FilterSet from a User.

First, set the status of the 'CEF—Auto' FilterSet to DELETE (2).

UPDATE filtersetaccesstbl
set status=2, modifytime=timezone('UTC'::text, now( )), modifiedby='scottl'
WHERE filtersetaccessidn=
(
SELECT fa.filtersetaccessidn
FROM filtersetaccesstbl fa
INNER JOIN filtersettbl ft ON fa.filtersetidn=ft.filtersetidn
INNER JOIN usertbl u ON fa.useridn=u.useridn
AND ft.name='CEF—Auto' AND u.logonid='autoclient@citadel'
);

Then, update the rank of the user's other FilterSets.

UPDATE filtersetaccesstbl
SET rank=rank-1, modifytime=timezone('UTC'::text, now( )), modifiedby='scottl'
WHERE useridn=(SELECT useridn from USERTBL where logonid='autoclient@citadel')
AND rank>
(
SELECT fa.rank
FROM filtersetaccesstbl fa
INNER JOIN filtersettbl ft ON fa.filtersetidn=ft.filtersetidn
INNER JOIN usertbl u ON fa.useridn=u.useridn
AND ft.name='CEF—Auto' AND u.logonid='autoclient@citadel'
);

Live Update

1. CIS sends FilterSetAccess record to sortd, action=DELETE.

2. Sortd gets user based on FilterSetAccess record.

3. Sortd finds the FilterSet Wrapper object in its vector based on FilterSetAccessIDN and sets status to DELETE.

Filter added to/removed from a FilterSet.

This example will replace the Filter 'CT 8 pct' with 'SmlCap Md 02' in the CEF—Trader X FilterSet.

Adding a Filter to a FilterSet.

First add the new Filter to the set.

INSERT INTO filtersetmembertbl(filtersetidn,filteridn, rank,status,createtime,createdby)
VALUES(
(SELECT filtersetidn from filtersettbl where name='CEF—Trader X'),
(SELECT filteridn from filtertbl where name='SmlCap Md 02'),
(
SELECT fm.rank
FROM filtersetmembertbl fm
INNER JOIN filtersettbl ft ON fm.filtersetidn=ft.filtersetidn
INNER JOIN filtertbl fr ON fm.filteridn=fr.filteridn
WHERE ft.name='CEF—Trader X' AND fr.name='CT 8 pct')
),
1, timezone('UTC'::text, now( )),'scottl'
);

Live Update

1. CIS sends FilterSetMember record to sortd, action=ADD.

2. Sortd gets FilterSet based on FilterSetIDN from FilterSetMember record.

3. Sortd creates a Filter Wrapper Object and adds to vector for FilterSet.

Removing the Filter from the FilterSet.

Next, remove the unwanted filter, by setting its status to 2 (DELETE).

UPDATE filtersetmembertbl
SET status=2, modifytime=timezone('UTC'::text, now( )), modifiedby='scottl'
WHERE filtersetfilteridn=
(
SELECT fm.filtersetfilteridn
FROM filtersetmembertbl fm
INNER JOIN filtersettbl ft ON fm.filtersetidn=ft.filtersetidn
INNER JOIN filtertbl fr ON fm.filteridn=fr.filteridn
WHERE ft.name='CEF—Trader X' AND fr.name='CT 8 pct')
);

Live Update

1. CIS sends FilterSetMember record to sortd, action=DELETE.

2. Sortd gets FilterSet based on FilterSetIDN from FilterSetMember record.

3. Sortd finds the FilterSet Wrapper object in its vector based on FilterSetMemberIDN and sets status to DELETE.

Stage added to/removed from a FilterSet Filter.

This example adds two stages to CEF—Trader X's SmlCap Md 02 filter. It then removes the first stage and fixes the ranking of the second.

Adding a Stage to a Filter in a FilterSet.

This adds the Tactical 01 Stage to the SmlCap Md02 Filter for CEF—Trader X.

```
INSERT INTO filterstagetbl (filteridn,stageidn,filtersetid-
n,rank,status,createtime,createdby)
    VALUES
    (
    (SELECT  filteridn  FROM  filtertbl  WHERE
name='SmlCap Md 02'),
    (SELECT  filtersetidn  FROM  filtersettbl  WHERE
name='CEF—Trader X'),
    (SELECT  stageidn  FROM  stagetbl  WHERE
name='Tactical 01'),
    1,
    1,
    timezone('UTC'::text, now( )),
    'scottl'
    );
```

This adds the Trickle 03 Stage to the SmlCap Md02 Filter and ranks it behind Tactical 01.

```
INSERT INTO filterstagetbl (filteridn,stageidn,filtersetid-
n,rank,status,createtime,createdby)
    VALUES
    (
    (SELECT  filteridn  FROM  filtertbl  WHERE
name='SmlCap Md 02'),
    (SELECT  stageidn  FROM  stagetbl  WHERE
name='Trickle 03'),
    (SELECT  filtersetidn  FROM  filtersettbl  WHERE
name='CEF—Trader X'),
    2,
    1,
    timezone('UTC'::text, now( )),
    'scottl'
    );
```

Live Update

1. CIS sends FilterStage record to sortd, action=ADD.
2. Sortd gets FilterSet based on FilterSetIDN from FilterStage record.
3. Sortd finds the Filter Wrapper Object in the FilterSet based on FilterIDN from FilterStage record.
4. Sortd creates a Stage Wrapper Object and adds to Stage Wrapper vector for Filter Wrapper.

Removing a Stage from a Filter in the FilterSet.

First set the status of the Filter Stage to 2 (DELETE).

```
UPDATE filterstagetbl
    SET status=2 modifytime=timezone('UTC'::text, now( )),
modifiedby='scottl'
    WHERE filterstageidn=
    (
    SELECT fs.filterstageidn
    FROM filterstagetbl fs
    INNER    JOIN    filtersettbl    ft    ON
        fs.filtersetidn=ft.filtersetidn
    INNER JOIN filtertbl fr ON fs.filteridn=fr.filteridn
    INNER JOIN stagetbl s ON fs.stageidn=s.stageidn
    WHERE
    s.name='Tactical 01'
    AND fr.name='SmlCap Md 02'
    AND ft.name='CEF—Trader X'
    );
```

Next update the ranks for all of the Filter Stages that come after it.

```
UPDATE filterstagetbl
    SET  rank=rank−1,  modifytime=timezone('UTC'::text,
now( )), modifiedby='scottl'
    WHERE
    filtersetidn=(SELECT  filtersetidn  FROM  filtersettbl
WHERE name='CEF—Trader X')
    AND  filteridn=(SELECT  filteridn  FROM  filtertbl
WHERE name='SmlCap Md 02')
    AND rank>
    (
    SELECT fs.rank
    FROM filterstagetbl fs
    INNER    JOIN    filtersettbl    ft    ON
        fs.filtersetidn=ft.filtersetidn
    INNER JOIN filtertbl fr ON fs.filteridn=fr.filteridn
    INNER JOIN stagetbl s ON fs.stageidn=s.stageidn
    WHERE
    s.name='Tactical 01'
    AND fr.name='SmlCap Md 02'
    AND ft.name='CEF—Trader X'
    );
```

Live Update

1. CIS sends FilterStage record to sortd, action=DELETE.
2. Sortd gets FilterSet based on FilterSetIDN from FilterStage record.
3. Sortd finds the Filter Wrapper Object in the FilterSet based on FilterIDN from FilterStage record.
4. Sortd finds the Stage Wrapper Object based on FilterStageIDN.
5. Sortd sets the Stage Wrapper Object status to DELETE.

Order/Trade Activity

Display Filter and Stage Labels on Order Views.
Display Filter and Stage Labels on Fill Views.

Further Exemplary Filter B Requirements

FIX Workflow

Support FIX tag to identify aggression/speed. For "optimize for tif", standard use of VWAP instruction should be supported. Support FIX expiration time. If the FIX tag is not provided, assume market close.

GUI Workflow

User configuration to map optimize for TIF to the VWAP strategy. Expiration time provided per order from the GUI.

Filter B Configuration

For GUI users, filterB order handling can apply to all GUI orders from a user, to GUI orders from a user entered as Optimize for TIF. For FIX users (no GUI), Filter-B order handling can apply to all orders or to orders identified as "optimize for TIF".

Cancel/Replace

If PAL rises above ReplaceMaxPAL % [filter condition] following a cancel/replace, 1. Check new order to see if it matches a different filter; if so, initiate trading per the new filter stage 1 instructions.
2. If the new order fails to pass any filter, reject replace and cancel unfilled shares back to the client.

Cancel/replace to a different price or to a different speed is handled as a cancel and new order. The new share quantity may be used in switch events, in deciding whether to start a new stage and in initializing a new stage. These include the logic that calculates stage expiration time based on the new number of shares and target PAL calculations. On cancel/replace to a different number of shares, re-trigger only a subset of the stage initialization variables to preserve duration/minratio continuity. The variables to be re-initialized are those depending on Q:

1. Stage PAL
2. Min PAL
3. Max Route Quantity
4. Stage Expiration
5. Qtgt

Manual Speed Control and Filter-B Recovery Filters

This item concerns the cases when an order is initially engaged in FilterB then paused or changed to a manually-selected speed 1, 2 or 3 (not a complete cancellation) and then restarted in FilterB. When filter-B logic is resumed the order will be assigned to a strategy that has the filter condition WasFilterB=True. This strategy will be initiated as though it were a new order for the remaining shares, without remembering any attributes of the prior order such as the original order quantity.

Fast Forward

Fast forward actions return to the original strategy. If the shares acquired through FF take one into the next stage, initialize next-stage trading normally. In other cases, on the subsequent switch event the stage parameters must be recalculated as follows to initiate trading.

1) Set StagePAL to FilterB_SystemStagePALFactor*CurrentPAL, where SystemStagePALFactor=0.99 is a global parameter.
2) If this violates MinRate or MaxRate instructions, adjust stage expiration accordingly (as specified below); if the trade extends through the close due to MaxRate then calculate the number of shares we expect to fill today.
3) Set MinPAL=Min(Prior MinPAL, FilterB_SystemMinPALFactor*StagePAL), where SystemMinPALFactor=0.9 is a global parameter
4) Show new stage completion estimate/shares expected to fill today on the GUI (as specified below).

The Arrival Price is not reset on a FF strike, opportunistic thresholds relevant to the Engine and block market exposures remain as before.

CIS Sorting of Filters

The filters in CIS may be sorted in ascending numerical order. Also, for the hypothesis validation logic to work, the user needs the ability to insert ahead of and after the current set of filters on CIS. An example of this logic would be as follows:

Suppose the original set of filters have the following format:
Filter 1
Filter 2
Filter 3
Filter 4
Now we make the following set of inserts:
Filter 1
Insert
Filter 2
Filter 3
Insert
Filter 4
The new numbering on the filters becomes:
Filter 1
Insert→Filter 2
Filter 2→Filter 3
Filter 3→Filter 4
Insert→Filter 5
Filter 4→Filter 6

Thus, the filters get re-ordered on rank, where the rank is determined by the order in which it is entered on CIS.

Stage Trailing Rate

Stage trailing rate becomes defined at the beginning of the fourth switch event of a given stage. This ensures that participation rate alerts are submitted at different intervals based on the stock's liquidity.

Global Parameters Associated with Filter-B Logic
TacticalPullbackMinutes=1
MaxFilters=10
InitialTacticalAdjustment=1
TacticalLearning=0.1
Filter B A user can have zero or n<=MaxFilters ranked filters, ordered from 1 to n. A filter comprises a set of conditions on an incoming order and trading instructions; if all conditions are true then the filter is activated and the corresponding trading instructions will apply.

The user also has a default instruction, which is to apply when all filters fail. The default instruction can be (a) execute according to normal sortd logic, or (b) reject the order. The default instruction will be (a) for zero filters, (b) for n>0.

An incoming order may be checked against filters in order. The first activated filter defines the trading instructions. Hypothesis validation conditions specific to each filter may cause a filter to kick back on a switch event or cancel/replace event. The default hypothesis validation check looks at execution instructions (currently ReplaceMaxPAL); custom hypothesis validation checks are hard-coded and available through an enumeration. Should a filter kick back, the residual will be checked against filters in order and re-assigned to a new filter or rejected back to the user if no filter passes.

Some filters invoke intra-trade conditions and are intended to pick up trades that have been kicked back. Research will assign these filters a higher priority in the ordered list of filters so they are checked before the order entry filters. Orders picked up by a secondary filter after a kick-back will be re-tagged with a new arrival price for purposes of price opportunist functionality etc.

Upon initiating execution with a given filter, an event will be displayed on the GUI showing the filter name and description. If no filter passed, retain the first failing condition from the first filter that had the correct MinPAL/MaxPAL range, and report an event to the GUI giving the name of the condition that failed (as listed below) concatenated with the value and threshold. If no filter has the right MinPAL/MaxPAL range, report an event reporting the reject due to PAL and mentioning the bound that was violated, for example, "Order Rejected: PAL was 42%>30%"

For example if it is a range failure,
"Order Rejected: Relative Momentum was −235<−150"
or if it is a value check,
"Order Rejected: Market Cap is not Small"

Execution proceeds in stages with instructions specific to each stage. If the trailing rate in any stage is below the stage LowRateAlert threshold, alert customer service. The alert email will contain the alert threshold and stage trailing rate.

1) Filter Name
2) Filter descriptive string (60 characters)
3) Filter Conditions
   a. MinPAL
   b. MaxPAL
   c. MinMomentum (open to arrival in basis points *)
   d. MaxMomentum *
   e. MinRelativeMomentum (open to arrival in basis points, relative to SPY)*
   f. MaxRelativeMomentum *
   g. MinDayTime (x∈[0,1] argument of SVD smile curve)
   h. MaxDayTime
   i. MinADV (minimum ADV value allowed for the symbol; values are in millions i.e. 1 implies 1 million)
   j. MaxADV (same as above, but refers to the max value)

k. *MinSpread* $\left(\text{relative spread} = 10000 * \ln\left(\frac{Spread}{LastSale}\right)\right)*$ l. MaxSpread *
   m. Side (Buy, Sell, Short, BuyLong, BuyCover, *; wildcard "*" is default) Note: Buy will activate on both B and BC as today, BuyLong will activate on B only, Buy Cover will activate only on BC trades
n. MarketCap (Large, Mid, Small, Micro, *)
o. Portfolio Manager Name
p. MinGap (min return from prior close to open, signed by the trade)
q. MaxGap (max of same)
r. MaxIntradayAbsoluteMomentum (arrival to current price, signed)**
s. MaxIntradayRelativeMomentum (same relative to SPY) **
t. MinShortfallAnomaly (ShortfallAnomaly=Shortfall−Abs(g(x)) where g(x) is the expected impact), (Shortfall=sign(trade)*10000*Ln(AvgPrice/ArrivalPrice) where ArrivalPrice is measured from the beginning of the order arrival ignoring all C/R events)**
u. MaxShortfallAnomaly (ShortfallAnomaly=Shortfall−Abs(g(x)) where g(x) is the expected impact), (Shortfall= sign(trade)*10000*Ln(AvgPrice/ArrivalPrice) where ArrivalPrice is measured from the beginning of the order arrival ignoring all C/R events)**
v. MinVolatility (Min AV value from analyticstbl that will be allowed in the Filter)
w. MaxVolatility (Max AV value from analyticstbl that will be allowed in the Filter)
x. MinRelativeVolatility***
y. MaxRelativeVolatility
z. Listing Market (Can take on the values NASDAQ, NYSE)
aa. Sector (can take on any sector name as value; accept specified sector or all sectors by default)
bb. Other derived drivers
(Min/Max) Trade_Value=shares*midpoint
(Min/Max) Size=shares/ADV
(Min/Max) Price_To_Close=Gap+Momentum
(Min/Max) ETF_Gap=Sign*10000*ln(ETF_Open/ETF_Close)
(Min/Max) ETF_Momentum=Sign*10000*ln(ETF_Mid/ETF_Open)
(Min/Max) ETF_To_Close=ETF_Gap+ETF_Momentum
(Min/Max) SPY_Gap=Sign*10000*ln(SPY_Mid/SPY_Open)
(Min/Max) SPY_Momentum=Sign*10000*ln(SPY_Mid/SPY_Open)
(Min/Max) SPY_To_Close=SPY_Gap+SPY_Momentum
(Min/Max) Sector_Relative_Momentum=Momentum−ETF_Momentum
(Min/Max) Sector_Relative_Gap=Gap−ETF_Gap
(Min/Max) Sector_Relative_To_Close=Price_To_Close-ETF_To_Close
(Min/Max) Beta
cc. GUI Filter-ID. Value of code sent in from the GUI; this will be used when the GUI wants to point to a particular filter, usually with all other conditions defaulted to accepting all values [this may only be needed when one deploys GUIs that offer a menu of customized strategies]
dd. Have block fills been received (Y, N or "*")**
ee. WasFilterB (True, False). True if the order was already in Pipeline (in either a paused state or a manual speed state) and is now being activated into the automated strategy.
ff. WasReplaced (True/False). True if the order was rejected following a size increase that tripped Max-PALonReplace.
gg. PriorFilter [Enum] if set to a HV rule, the filter will activate only if we are recovering from precisely this HV rule.
hh. RecoveringFrom[FilterName] In analogy to the Prior Filter Hypothesis type these would be used to catch kick-backs from primary filters based on the prior filters name. For example if RecoveringFrom=AlphaT 12 is set, this filter would catch kick backs from the filter with the unique name AlphaT 12 If condition in gg is also set, both the conditions in gg and hh need to be true.
ii. Was_traded_yesterday (Boolean): the same firm had an order yesterday in the same symbol and side. The following filter conditions will be used only when Was_traded_yesterday=True
Momentum_since_original_arrival: return from original arrival to today's arrival price [bps].
Relative_momentum_since_original_arrival: return from original arrival to today's arrival price [bps].
Sector_relative_momentum_since_original_arrival: return from original arrival to today's arrival price [bps].
All_filled_quantity [relative to ADV, in %]
Yesterday_filled_quantity [relative to ADV, in %]
SVD_delay: 1+SVD(new arrival)−SVD(last fill time), measures the delay since we stopped trading, in units of ADV
All_incurred_shortfall: shortfall on shares filled so far relative to the original arrival price [bps]
Yesterday_shortfall: shortfall on shares filled so far [bps]
Yesterday_impact: estimated impact of shares filled yesterday, based on yesterday's average participation
All_incurred_impact: estimated impact on whole order so far [See Overnight Storage and end of document for more information]
jj. Same_Symbol_Side. Boolean. If set to true and we are already working the symbol and side for another PM, same firm, then activate the filter. False activates only when we are not already working the symbol and side and symbol side. When set to wildcard this condition can be ignored.
kk. Special_Instructions. Boolean, optional. If set to true and the "special instructions" field in the oms scan was not empty, then activate the filter. If set to false then activate only if the special instructions field WAS empty. When set to wildcard this condition can be ignored.
ll. News Today. Three options: "Yes" if there were news today, "No" jf there were no news today, and "WildCard" meaning we don't care if there is news or not so we can ignore this filter condition
mm. Recent News. Three options as in ll: "Yes", "No" and "WildCard" Recent News is "Yes" if there were relevant news received within the last Actionable_News_Timeout seconds where Actionable_News_Timeout is a server configurable quantity.

* Condition only checked if order entered when market is open
** On initial order arrival, these variables are set to null values and will not cause rejects; "normal" filters will have Min/Max ranges such that 0 fails.
*** Relative Volatility is the relative difference between a stock's theoretical volatility and its actual volatility, RV=(AV−TV)/TV where AV is the Average Volatility in the instrument table, TV is the theoretical volatility calculated as follows:

$$TV=7.5+3500000*Power(TotalDollarQuantity,-0.85)$$

4) Trading Instructions
   a. Number of stages
   b. Reject ("None", "Alert", "Reject"). If "Reject", the order will be rejected to the user with an error message pop-up giving the first reject reason. If "Alert", the GUI will display an error message popup "No optimized strategy configured for this order". Note for research: filters with reject="Alert" will be configured with rate force=9 (see below) to switch off the Engine. The default for all filters is "None"
   c. Tactical Pullback [bps from last sale price]
   c. ReplaceMaxPAL (PAL cap on cancel/replace)
   d. Hypothesis Validation Type (Enum). This could be none, 1 condition, or a list of conditions. Individual conditions are listed below.
   d. [for each stage]
      i. Rate Force (sets the Engine speed to a specific value, e.g. 0.1, translates to a trading speed to be used instead of PAL) Use 9 for a block only stage. 0 means no rate force.
      ii. Expiration [minutes]
      Min Ratio [fraction of total initial entered shares]
      iv. Low Rate Alert
      v. KeepStreaming [Boolean] (See keep streaming and AIM streaming section for implementation)
      vi. AIMStreaming[Boolean] (See keep streaming and AIM streaming section for implementation)
      vii. EnforceMinPAL [Boolean]
      viii. ReversionHoldBack [Float, in [0,1] interval]
      ix. Stage Name
      x. Opportunist Type (AR=Arrival, R=relative, A=absolute, B=both, N=none)
      xi. MaxBlockShare
      xii. Stage Descriptive String
      xiii. MaxExpirationTime: This is the expiration time for the stage that overrides the max rate changes. It is specified in terms of normalized time such as 0.85 to correspond to 3:00 pm. Daytime max config variable should be less than or equal to this value.
      xiv. Reversion (set to 0 for the first stage if filter has multiple stages)
      xv. Initialization: PAL Factor (defaulted to 0.99)
      xvi. Initialization: MinPAL Factor (defaulted to 0.9)
      xvii. ScheduleAdvanceFactor (default 1.5)
      xviii. ScheduleLagFactor (default 0)
      xix. Strategy Matrix: When set the wildcard, the value will be ignored. When set to a numerical value, sortd will only route to the subset of algos with strategy matrices set in the routing table that match exactly the strategy matrix set here. In this enforced routing, full remaining customer order size will be used on the outbound order and the limit price will either be set to the customer limit price or 500 bps away from the current mid-quote if the order is a market order. Further notes: Whenever the superfast DNA bit is set in a stage, we will no longer apply the timeout override logic that kicks in for the 3:55 and 3:59 completion snipes. This will allow the order to remain in the Must Complete algo without cancellations.

Sortd 1.1 Engine Requirements Changes (Applicable Only to Filter-B Handling)
Opportunist Cap
The system will set a cap on the number of shares that can be filled opportunistically in the block market or using the price and liquidity opportunists. Initially the block market shares will be capped at MaxBlockShare * Q, where Q is the number of shares initially ordered. This cap is later decremented by block market fills and by opportunistic strikes; it is acceptable to estimate the opportunistic fills as the NBBO available shares at the time of a strike, if helpful.

Filter Switching Logic
On Stage Initiation
On order arrival or start of a new stage i, calculate and store the stage target rate as follows.

1. Calculate
Desired stage i expiration time Expiration_i=earlier of Now+Stage.Expiration, 4 PM or Stage.MaxExpirationTime.
Define:

$$\text{PAL\_init} = \frac{MinRatio_i * Q - q_{i-1}}{AL(t_{i-1}) - AL(t_{i-1} + \text{Expiration}_i)}$$

2. Prior to the iterative adjustment in step #3 analytically estimate Stage Expiration as follows.
If PAL_init>MaxRate_i
{
Calculate:

$$\chi = \text{Min}\left( \frac{MinRatio_i * Q * (1 - SVD(t_{i-1}))}{MaxRate_i * RADV(t_{i-1})} + SVD(t_{i-1}), 1 \right)$$

The inverse of SVD in the US is defined as:

$DVS(X) = 7.2585X^6 - 17.2066X^5 + 11.7617X^4 - 1.4485X^3 + 0.0637X^2 + 0.5712X$

Figure 47:
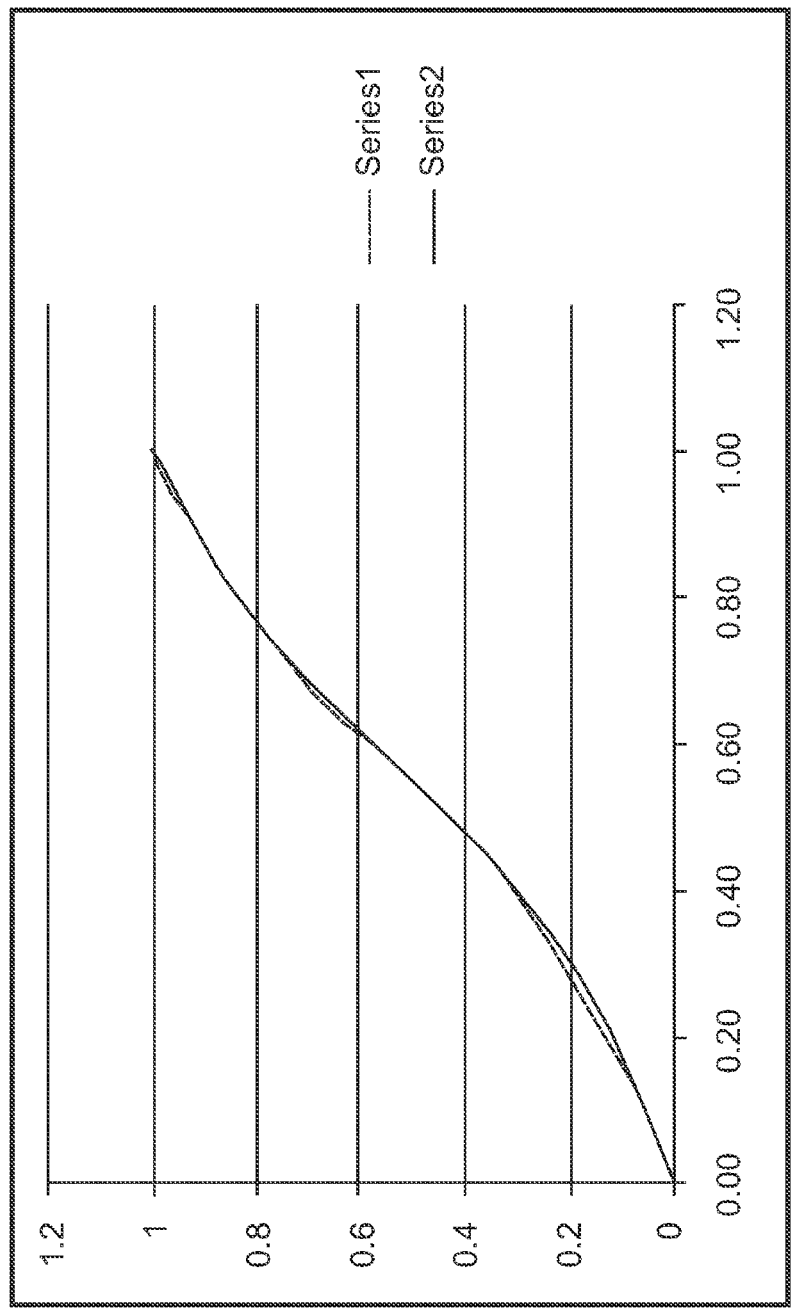
FIG. 47 depicts an exemplary inverse SVD graph.

FIG. 47 depicts an Inverse SVD graph.
Finally, re-initialize stage expiration in minutes as:

$\text{Expiration}_i = \text{int}(DVS(\chi)*390)+1$

}
Else If PAL_init<MinRate_i
{
Calculate:

$$\chi = \text{Min}\left( \frac{MinRatio_i * Q * (1 - SVD(t_{i-1}))}{MinRate_i * RADV(t_{i-1})} + SVD(t_{i-1}), 1 \right)$$

and set $\text{Expiration}_i = \text{int}(DVS(\chi)*390)-1$

}
Else
{
No changes to Expiration_i.
}
Exception: EU
Initially the European server will not pre-estimate stage expiration; proceed to next step (iterative adjustments). One may make use of an alternate formula for DVS(X) in EU to account for the European market volume profiles.

3. Iteratively adjust Stage Expiration to implement Min/Max rate (Step#2 should largely reduce the number of iterations needed here; in the US, a cap on the number of iterations will be set to 10 instead of current 1000; cap will remain at 1000 in Europe. An alert will be generated if the cap is hit).
If ForceRate is non-zero
Let
MinRate2=MinRate/(1−MinRate)
MaxRate2=min(ForceRate, MaxRate/(1−MaxRate))

Else
MinRate2=MinRate/(1−MinRate)
MaxRate2=MaxRate/(1−MaxRate)

If PAL_init<MinRate2, then try reducing stage Expiration by 1 minute increments until the re-calculated PAL_init exceeds MinRate or Expiration is less than 5 minutes from current time.

If PAL_init>MaxRate2, try increasing Expiration by 1 minute increments until the re-calculated PAL_init falls below MaxRate or the recalculated expiration is beyond 3:55 PM.

If MaxRate="*" then eliminate the Min( ) condition above; if MinRate="*" then eliminate the Max( ) condition above.

From here forward, use the corrected Expiration_i for the remainder of this stage.

If Expiration for the current stage is 4:00 PM after the iterative adjustment above and PAL_init>=MaxRate
{
Set PAL_init=MaxRate;
Calculate $$Q_{tgt} = \operatorname{Min}\left(Q, \frac{PAL\_init * Al(t_{i-1}) + q_{i-1}}{MinRatio_i * FilterB\_SystemTargetqtyAlFactor}\right)$$

where FilterB_SystemTartgetQtyAlFactor is a system configurable parameter defaulted to 0.99. Set Q=$Q_{tgt}$ and use this corrected value of Q in the remainder of the calculations below.
}

In cases in which Qtgt is calculated at stage initialization but filled before the close, one may re-run the above calculation to avoid negative values of PAL and obtain a new Qtgt (which may equal Q). One may use this corrected value in the remainder of the calculation. One may also set
PAL_i=Initialization_PALFactor*PAL
to phase PALi and PAL and secondary or higher iteration of the Qtgt logic.

4. Calculate the stage PAL tracking bounds $PAL_i$=PAL_init*stage.Initialization:$PAL$ Factor Min$PAL_i$=PAL_$i$*stage.Initialization:MinPALFactor where AL(t) is the Pipeline Available Liquidity projection from time t to the expiration time specified on the order (end of day by default), $t_0$ is the initial order arrival time, $t_i$ is the time where we calculated $PAL_i$, $q_0$=0, $q_i$ is the number of shares filled at the time we calculated $PAL_i$.

5. Initialize stage variable FirstRecoveryPrice to be equal to the average of arrival price and the current midpoint.

The stage start event may be communicated on the GUI with target rate=CurrentPAL for the stage concatenated in the message as well as the stage completion time or shares expected to be filled. There are 3 cases
(a) Final stage, all shares expected to fill today. The event name will show the expected completion time, example: "Compl 2:15 PM". The description will show the stage name, the stage PAL, and the stage expiration time, for example, "Tactical price selection for alpha capture. Estimated completion 2:15 PM at rate=4.7%.
(b) Final stage, target shares<Q. The event name will show the target shares in thousands, the description will show the stage name, stage PAL, target shares and Q. for example "230 k/500K to 4 PM", where 230K=Qtgt and 500K=Q. Event log will display: "Tactical price selection for alpha capture. Expected to complete 230,000/500000 shares today at rate=8%"
(c) Not final stage. If stage expiration is earlier than the market close then the event name will show the stage name and the description will show the expected stage completion time. For example, "Jump Start", "Jump Start. Rate=30%; transition to Tactical at 11:45 AM". Else the event name will show the target shares calculated as MinRatio_i*$Q_{tgt}$, and will display the number of shares we expect to fill to the close. For example "230 k/500K to 4 PM", where 230K=MinRatio_i*Qtgt and 500K=MinRatio_i*Q. Event log will display: "Moderate mode to minimize opportunity cost. Expected to complete 230,000/500000 shares today at rate=20%"
NOTE: In cases (b) and (c) above, for Hv recovery filters the expected fill shares and ordered shares will be those of the parent. For example, if one had an order for 570,000 shares, after 70,000 shares it kicked out due to hypothesis validation and in the new filter one may estimate that one will complete 230,000 shares today, the message will say "300 k/570 k to 4 PM" and " . . . expected to complete 300,000 of 570,000 shares today")
(d) If the activated filter is of type "Reject" or "Alert" the description will show the order state as inactive by concatenating stage name+description of first stage. For example, if Reject then "Blocks", "Blocks. Optimizer disengaged, order only activate in the block market". If Alert, then "Alert", "Alert. Order inactive in both the optimizer and the block market".
(e) If WasHV (i.e. we kicked back from a prior filter), then GUI text will indicate the hypothesis validation by concatenating, the stage name with "HV Recovery Mode:" For example name="JumpStart", description="HV Recovery Mode: Jump Start. Rate=30%; transition to Tactical at 11:45 AM"

In addition to getting recorded in the event log, the texts in (a)-(e) may remain visible on the GUI throughout a stage as mouse-over texts over the stage name. For example, if the action of placing the mouse over the text "JumpStart" will show the text ""HV Recovery Mode: Jump Start. Rate=30%; transition to Tactical at 11:45 AM". To achieve this, the server will send a strategy message with the completion time estimate concatenated in the filter descriptive string. For example, for "TL AlphaT" the descriptive string might be "High alpha with trend continuation bias"; when the second stage initiates (a completion time is available) the string will become "High alpha with trend continuation bias; Estimated completion 2:15 PM at rate=4.7%".

If the stage MaxExpirationTime is prior to the stage expiration calculated here, show the time corresponding to MaxExpirationTime on the GUI. If the rate calculated above is greater than 35%, show 35% on the GUI.

On Switch Event

Check hypothesis validation criteria. If validation fails, check filters to see if the order can be assigned to a different filter, otherwise reject it back to the user. Each validation reason comes with a descriptive string. Multiple hypothesis validation criterions can be applied to the same order as a list of conditions.

Update FirstRecoveryPrice to be the higher (lower) for a buy (sell) of FirstRecoveryPrice or the average between the arrival price and the current midpoint.

Exemplary Hypothesis Validation Rules
1. Excessive impact: if all the below conditions are true, the average price so far in the trade is more than twice the expected impact of the shares filled so far in the trade (known as g(X) in the safe mode logic)
current price is more than 30 bps away from arrival we are in stage 2, then kick out of filter. Descriptive string="Excessive price move, manage munitions"

2. Excessive First/Second-stage impact: if all the below conditions are true,
   the average price so far in the trade is more than twice the expected impact of the shares filled so far in the trade (known as g(X) in the safe mode logic)
   current price is more than 40 bps away from arrival
   current filled shares exceed MinRatio times ordered shares
   we are in stage 1/stage 2, then
   kick out of filter. Descriptive string="Adverse price move in first stage, avoid excessive impact"

3. Adverse selection: if all the below conditions are true,
   the participation rate so far in the trade is >30%
   we are in stage 2
   current price relative to arrival is less than half the expected impact of the shares filled so far in the trade
   kick out of filter. Descriptive string="Alpha capture more likely than trend"

4. Sector Divergence: if the below condition is true,
   the difference between the symbol return and the corresponding ETF return signed by the trade sign is greater than x bps,
   then kick out of filter. Descriptive string="Symbol diverging from sector, changing strategy"

5. Sector Convergence: if the below condition is true,
   the difference between the symbol return and the corresponding ETF return signed by the trade sign is less than x bps (x will be a negative number)
   then kick out of filter. Descriptive string="Symbol recovered relative to sector, changing strategy"

6 News today: If there was news today kick-out of the filter after the first switch event.

7. Recent News: If there was news within Actionable_News_Timeout seconds kick out of the filter.

8. Block HV Reject: On switch event, if there was a block fill since the last route, kick back from the filter that will be captured by WasFilterB.

9. Relative impact anomaly: if the signed return so far in the trade relative to SPY is more than the greater of
   a) twice the expected impact of the shares filled so far in the trade (known as g(X) in the safe mode logic)
   b) 30 bps
   then kick out of filter. Descriptive string="Unexpected price move relative to S&P500 index"

Exemplary Tactical Trading Logic

PAL and Pushing Back Completion Time

Define PAL for this exemplary section as the ratio between the number of shares yet to be filled in this stage and the amount of liquidity available until the close of the stage (same formula as for stage MinPAL_i above).

$$PAL = (MinRatio_i * Q - q_i) / (AL(t) - AL(t_{i-1} + Expiration_i))$$

If (the number of shares filled since initial order arrival, q, is greater than the minimum shares required to transition into the next stage $q_t > MinRatio_i * Q$ or the stage speed is zero) and the time consumed since initial order arrival (in minutes) is greater than the minimum stage expiration time, $t - t_0 >$ Expiration, or current PAL is negative (i.e. we have exhausted the shares we intended to trade in the first stage) then we begin the next stage and calculate PAL as above.

If RateForce is nonzero
If Expiration_i<3:55 PM and PAL (as calculated above) is greater than Min(RateForce, MaxRate)+0.1 or the current time already exceeds Expiration_i, then we will adjust Expiration_i as above in step 2 of the stage initiation process, but for PAL instead of StagePAL.

Else
If Expiration_i<3:55 PM and PAL (as calculated above) is greater than MaxRate+0.1 or the current time already exceeds Expiration_i, then one may adjust Expiration_i as above in step 2 of the stage initiation process, but for PAL instead of StagePAL.

This logic is repeated here for completeness:
If ForceRate is non-zero
Let
MaxRate2=min(ForceRate,MaxRate/(1−MaxRate))
Else
MaxRate2=MaxRate/(1−MaxRate)
If PAL>MaxRate2, try increasing Expiration by 1 minute increments until the re-calculated PAL falls below MaxRate2 or the recalculated expiration is beyond 3:55 PM.

This new expiration time will be stored and used in the remainder of this stage. If Stage.MinRatio=1 then post an event to the GUI, Event Name="Compl 3:47 PM"
Description="Order completion re-estimated to 3:47 PM based on current progress".

and send a strategy message with the filter name and filter descriptive string with the completion data concatenated in. For example, Filter name="TL AlphaT"
Description="High alpha with trend continuation bias; Estimated completion 2:35 PM at rate=3.9%"

If the corrected expiration hit the 3:55 limit then post the event:
Event Name="Compl 4 PM"
Description="Order expected to complete in the last 5 minutes of the trading day; use Fast Forward if needed to complete the trade"

Advancing Completion Time

If current PAL falls below MinRate2=MinRate/(1−MinRate), then re-initialize the stage and publish the new completion time to the GUI. This will lock in the schedule advance and reset the stage start price for purposes of the schedule advance logic. Example of GUI message:

Event Name="Compl 3:17 PM"
Description="Order completion re-estimated to 3:17 PM based on current progress"

Adjusting Stage PAL

If not in safe mode, PAL_i will be ratcheted down when liquidity is unexpectedly large, to take advantage of the liquidity opportunity, as follows. Let $t_{i-1}$, $q_{i-1}$ be the time and filled shares at the stage initialization, and tape the actual tape volume since the stage was initialized (same as is used also in the stage trailing rate calculation). The current estimate of available liquidity since stage start is tape($t_{i-1} \rightarrow t$)+AL(t), therefore if we were to calculate PAL_i at time t we would find $$PAL_i(t) = (MinRatio_i * Q - q_{i-1}) / (AL(t) + tape(t_{i-1} \rightarrow t) - AL(t_{i-1} + Expiration_i)) * stage\_initialization:PALFactor$$

If not in safe mode and $PAL_i > 1.01 * PAL_i(t)$, let $PAL_i \rightarrow PAL_i(t)$, and similarly adjust MinPAL_i, using the same expression as above but with stage_initialization:Min- PALFactor. If PAL_i falls below MinRate2, advance stage expiration as indicated above in "advancing completion time".

Choosing the Trading Speed

Speed-up logic: If (current PAL>1.1* PAL_i AND current PAL>0.1 AND current price is better than average fill price) OR (price is an opportunity) then set the trading speed to Min(0.3, max(rateForce, current PAL)+0.1)

If t>Expiration_i, use high speed (this may happen after 3:55 PM).

Else, select the speed as the user speed or (if Optimize for TIF is used) calculate the speed using the rules for "Optimize for TIF" based on PAL, i.e. the current PAL for the stage as opposed to the stage PAL. If rate_force is specified, then it will set the speed if rate_force>PAL or if price is not an opportunity. For opportunistic prices we allow PAL to override rate_force . . . the effect is that very large orders with rate force 0.2 or 0.1 may trade in higher speeds to complete today but only at opportunistic prices.

Keep Streaming and AIM Streaming Logic

If the last route was a tactical pull back event and (that route has been active for more than Reversion minutes or PAL_i is larger than 0.30 for the current stage, or (current PAL<stage PAL_i and trailing rate<MinPal_i)), and KeepStreaming=TRUE then set the value of stage PAL_i PAL_i=FilterB_SystemPALFactor*PAL and MinPAL_i to the lesser of MinPAL_i or FilterB_SystemMinPALFactor*PAL_i where FilterB_SystemPALFactor and FilterB_SystemMinPALFactor are system configurable parameters set to 0.99 and 0.9 respectively.

note: with this change, tactical limit will be removed . . . reversion sets an upper bound on the delay before we resume trading as well as a max allowed value of max_speed for stagePAL, which corresponds to the current maximum engine speed. max_speed will be a server configurable parameter with a default of 0.30.

Addendum: The timer that measures of the active time duration of a tactical sequence will reset to zero if any tactically limited route receives fills while within the tactical sequence.

Else If
{
The current route has been active for more than Stage.MAXTIME minutes
And
The participation rate for this route is <PAL_i
And
Current MidQuote is better then the incremental trailing price x as calculated in the tactical limits section below
And
AIM streaming is set to true
Then
Set the value of stage PAL_i PAL_i=FilterB_SystemPALFactor*PAL and MinPAL_i to the lesser of MinPAL_i or FilterB_SystemMinPALFactor*PAL_i
}

Trailing Rate Correction

1) If trailing rate_i<MinPAL_i/2 and at least two minutes have elapsed since the start of stage_i, use LSLV
2) If trailing rate_i<MinPAL_i/4 and at least two minutes have elapsed since the start of stage_i:
   a. If speed=1 or 2, use LSLV one speed higher
   b. If speed=3 and the previous route was not IOC, snipe the inside quote+1 cent for the shares required until trailing_rate_i>=2*MinRate/3
   c. If speed=3 and the previous route was IOC, use speed 3 LSLV Tactical Limits We will impose a tactical limit unless
  Fewer than 2 minutes have elapsed in the current stage and order is not "small" as defined by the FTS logic time is >=3:55 PM, or
  we have too much ammo [May 6 opportunist rules follow]. This condition will be determined from the outcome of the following set of calculations:
For buys, define $\Delta S = 10000 * Ln(Current\_MidPoint/StageStartPrice)$ and for sells:

$\Delta S = -10000 * Ln(Current\_MidPoint/StageStartPrice)$

Where StageStartPrice is the midpoint price at the last time the stage parameters were calculated (start of the stage; after the user clicked on FF; etc).

Define T=total minutes in from now to estimated trade completion

If the price change since arrival $\Delta S<0$ for a buy, or $\Delta S>0$ for a sell, we will calculate the desired schedule advance as follows $$\tau = FilterB\_ScheduleAdvanceFactor \times Max\left(0, \frac{|\Delta S|}{AV\sqrt{\frac{T-t}{60 \min}}}\right)$$

where FilterB_ScheduleAdvanceFactor is a stage execution instruction. For example, a value of 1.5 means we will advance the schedule by 15 minutes when the stock improves by 10 AV basis points.

If the price change since arrival $\Delta S>0$ for a buy or $\Delta S<0$ for a sell, we will calculate the desired schedule lag as follows $$\tau = -FilterB\_ScheduleLagFactor \times Max\left(0, \frac{|\Delta S|}{AV\sqrt{\frac{T-t}{60 \min}}}\right)$$

One may further define:

$$PAL'\_i = PAL\_i * \left(\frac{T-\tau}{T}\right)$$

We have too much ammo if
currentPAL>PAL'_i
or
price is an opportunity and we are in the US. An opportunity is
  If Absolute, better than the first non-SPY-adjusted opportunistic level S_
  If Relative, better than the first SPY-adjusted opportunistic level,
  If Both, better than both of these two levels
  In Null, there are no opportunities and this condition does not apply, or
  If Arrival then the current price is better than arrival
the lagging rate in the current stage is behind target [note change in formula to use MinRate]

$$\frac{q_t - q_{i-1}}{tape(t_{i-1} \to t)} < MinRate \text{ and } Stage.EnforceMinPAL = True$$

price is better than FirstRecoveryPrice and PAL is greater than ReversionHoldBack*PAL_i and opportunist type is "absolute" or "arrival"

The target PAL from now to the end of day is higher than min(max speed,stage.rateforce) and max speed is defaulted to 30%. Here we define target PAL as:

$$PAL_{tgt} = \frac{\hat{Q} - \text{Overall\_Filled}}{AL(t)}$$

where Overall_Filled is the number of shares filled in the overall order so far and $\hat{Q}$=MinRatio$_i$*$Q_{tgt}$ if there exists $Q_{tgt}$ =$Q$ else Furthermore if the above condition for skipping a pullback applies an alert will be generated to the helpdesk indicating that PAL is growing beyond the max engine threshold. This will have the format:

"Alert PAL 32.5%>30%"

If a tactical limit applies, select a non-IOC algorithm according to the default continuation rules appropriate to the working speed level and set a passive tactical limit as specified below The tactical limit price logic will come right after the 3:55 PM check (see Appendix), ahead of the liquidity opportunist and everything else. The tactical limit conditions must also be checked on IOC expirations, but without the expiration time extension.

On switch event that meets conditions for imposing a tactical limit,
    If prior route was not tactical,
        Determine tactical limit based on one unit of volatility as today
        Set x=tactical limit
    If prior route was already tactical,
        Update x using a weighted average $x \rightarrow (1-\epsilon)x + \epsilon P_t$ $\epsilon$=LastRouteDuration/reversion[stage]

Where P_t is the current midpoint price, LastRouteDuration is the time elapsed since the last non-IOC order was routed out in minutes.

Calculate Delta based on PAL_i, user_speed, stock's trailing average minute volatility (from InstrumentTbl) and Filter-B tactical gap adjustment parameter λ (globally-defined across all filters, initialized at λ=InitialTacticalAdjustment at start of day)

$$\hat{\sigma} = \sigma\lambda(1 + (\text{Expected\_Rate[speed]} - \text{current\_PAL})/\text{Expected\_Rate[speed]}$$

$$\Delta = S_{mid}\frac{\hat{\sigma}\sqrt{TacticalPullbackMinutes}}{10^4}$$

If PAL>=MinPAL_i, calculate tactical limit to be Delta more passive than the trailing average: for a buy, $$P_{limit} = x\left(1 + \frac{\sigma\sqrt{TacticalPullbackMinutes}}{10^4}\right) - \Delta.$$

For a sell, $P_{limit} = x\left(1 - \frac{\sigma\sqrt{TacticalPullbackMinutes}}{10^4}\right) + \Delta$ If this results in a more aggressive (strictly higher for buys, lower for sells) tactical limit, or it results in a more passive limit (strictly lower for buys, higher for sells) and the participation rate so far with this tactical limit is greater than PAL_i, replace the outbound order accordingly.

If PAL<MinPAL_i and the previous route resulted in fills,
    The tactical limit will be the less aggressive of the above and the tactical limit calculated as follow
[More Exemplary Opportunist Rules]
Step 1: calculate Adjusted_MinPAL
Normally Adjusted_MinPAL=MinPAL_i, however,
if price is better than FirstRecoveryPrice and opportunist type is "absolute" or "arrival" then Adjusted_MinPAL=ReversionHoldBack*PAL_i
if the price change since arrival ΔS<0 for a buy, or ΔS>0 for a sell and FilterB.ScheduleAdvanceFactor>0 then Adjusted_MinPAL=PAL'_i (note: there is no similar logic for schedule lag ... in that case MinPAL_i remains the low bound we simply widen the sweet zone between MinPAL_i and PAL_i where tactical limits can be used.)
Step 2:
Calculate $$\text{Pullback} = \text{Min}\left(0.005, \frac{\hat{\sigma}\sqrt{TacticalPullbackMinutes}}{10^4}\right)$$

$$\hat{\sigma} = \left(1 + 10 * \frac{AdjustedMinPAL - PAL}{AdjustedMinPAL}\right)\sigma$$

For buys, $S_{pullback} = S_{mid}(1 - \text{Pullback})$.

For sells, $S_{pullback} = S_{mid}(1 + \text{Pullback})$

If this results in a different tactical limit, replace the outbound order accordingly.
If $$0.005 < \frac{\hat{\sigma}\sqrt{TacticalPullbackMinutes}}{10^4},$$

the outbound routed size will be reduced by a factor $$x = 0.005 \Big/ \left(\frac{\hat{\sigma}\sqrt{TacticalPullbackMinutes}}{10^4}\right).$$

Thus, for example, if the calculation based on TacticalPullbackMinutes were to give a 200 bps pullback we will instead use 50 bps and route 50/200=1/4 as many shares. This logic will provide a controlled schedule advance in cases like the May 6 technical "flash crash".

Increment λ→λ+TacticalLearning
If PAL>ReversionHoldBack*PAL_i and opportunist type is either "Absolute" or "Arrival", then adjust the above limit price to be no lower (higher) than FirstRecoveryPrice for a buy (sell)

Cancel/replace outbound order to set the new tactical limit, and make sure the new limit is displayed on the GUI If PAL>PAL_i and last route was tactical,
Of course don't use a tactical limit (per prior requirements)
Decrement λ→λ—TacticalLearning Block Exposure/Liquidity Opportunities On switch event: adjustment to block/liquidity opportunist exposure If price is an opportunity and we are in the US [as defined in tactical limit section above], then all shares not routed out to an algorithm are eligible to execute in the block market.

If price is better than first reversion price and opportunist type is either "Absolute" or "Arrival", then the number of shares available to the block market will be the lesser of the non-routed shares or the following number of shares:

$$-x = \frac{current\_PAL - stage\_PAL \times RevisionHoldBack}{current\_PAL} Leaves$$

If price is not a first reversion opportunity (i.e., if price is worse than the first reversion price or the opportunist type is neither "Absolute" nor "Arrival"), then the block market shares will be set by the Opportunistic Cap rules but in no event be allowed to be greater than MaxBlockShare*Leaves.

Rounding of the Block Market Shares

After the block shares are calculated, if they are below 1 LBQ we will round up if 1 LBQ is less than MaxAfterRounding=BlockShares+Min(BlockShares, (½)*(Leaves−BlockShares))

Routed Shares

This logic may apply to all filter-B routed orders with the exceptions of the 3:55 and 3:59 m-snipes and client FFs.

For completeness, the current set of events where the below filterB order size will be used for a filterB enabled order are as follows:
Default
Dark IOC
Tactical
Safemode
Liquidity Opportunist Strike
Price Opportunistic Strike
Final Trading Segment Strike The locations of these events where filterB order size will be used are marked in the UML diagram below with the text "Fbo."

In all situations except 3:55, 3:59 and manual FF requests, the routed quantity of a filter-B managed order should not exceed MaxRouteQty=$Q$*Stage.MinRatio/NBINS, where MaxRouteQty is rounded up to the nearest whole lot and NBINS=Max(26(SVD(Expiration$_i$)−SVD($t_{i-1}$)), FilterB_MinNBINS).

NBINS measures the number of intervals available to complete the trade, where an interval is the tape equivalent of 15 minutes and MaxExpirationTime is the stage instruction variable and FilterB_MinNBINS is a server configurable parameter defaulted to 4.

Exemplary GUI Requirements

The GUI will show the strategy and relevant events. Clicking on the strategy/event will pop up a rolling messages window showing relevant messages. Relevant messages are order received and assigned to a given filter. Give filter descriptive string order rejected—failed to pass any filter on arrival filter kick-back: On filter kick-back we will show the text "Strategy Validation" as opposed to "Strategy Reject". Descriptive string will be the reason the filter kicked back start of new stage. Descriptive string for the stage; if final stage the expected expiration time will be appended trailing rate is more than 25% below the min rate for the given stage: SLOW The detailed description of the event will give the target and realized rates and the time period over which the rate was evaluated, e.g.

"Slow participation rate: 4.6% from 11:10 to 11:25, versus target=30%" Here, the displayed target rate (30% in the example) will be the Min Rate.If the min-rate is zero the very slow participation rate message can be suppressed.

If we displayed a "SLOW" text on the last switch event and the trailing rate is recovered in the current switch event then:
(A) If the current stage extends to the close we display "xK to 4:00 PM" where x is the number of shares we expect to complete today.
(B) If we are in the final stage but we expect to complete before the close, we display Compl: xPM where x is the time the trade is expected to finish.
(C) If we are not in the final stage and the current stage doesn't extend to the close then we display the stage name like "Cruise"

The text "Compl: xK to 4 PM" gets displayed under the event column on the switchboard and in the event log we display (as an example).

"Participation tate has recovered. Current rate: % num", where % num is the current trailing rate for the stage (B) safe mode operation switched ON or OFF. Display reason why it is being switched ON or OFF. Reasons will be [please see update to these requirements in point 21 above]
a. Small trade: "Small trade: use low variance algos to avoid adverse selection"
b. Final trading segment "End of trade: use low variance algos to avoid adverse selection"
c. Excessive price move: "Unusual price move: use low variance trading to manage munitions in high volatiltiy"
d. Trailing rate to fast "High participation rate; avoid posting to allow price to move freely"

When safe mode is "ON" display "Rate Control" when operating under filter-B, display "Safe Mode" when operating under the plain-vanilla engine.

(C) The tactical limit price will be shown on the GUI. When using tactical pull-backs, the GUI will not show the strategy. The strategy will be shown again when we receive a fill; at that point it will be shown continuously regardless of prices until we pull back again on a subsequent switch event. All "tactical" indicator messages from the server after switch events in tactical pullbacks, which get displayed on the switchboard and the event log, will be suppressed.

Example . . . showing 3 rows in the switchboard

| Strategy | Events | | Tactic |
| --- | --- | --- | --- |
| Luddy-15 | JumpStart | passive | ($20.35) |
| Blasdell-1 | Tactical | — | ($31.45) |
| Luddy-5 | SLOW | stealth | ($51.22) |

Scroll over Tactical shows text message "Tactical price selection for alpha capture. Estimated completion 2:15 PM at rate=4.7%"

Events Priority and Display

Event messages will have a given priority level and a "minimum lifespan". We will cache the "best event" based on priority then time (most recent is better, higher priority wins).

Lower priority messages will overwrite for a specified lifespan; the best event will then be resent on the first switch event after the weaker event's lifespan is exhausted.

TABLE 13

| Event | Priority | Lifespan [min] |
|---|---|---|
| Stage start | 3 | 3 |
| Rebalancing | 2 | 2 |
| Completion time | 1 | 999 |
| Shares to be filled today | 5 | 999 |
| Safe mode | 1 | 2 |
| Rate control | 1 | 2 |
| Slow | 1 | 2 |
| End of Slow - show completion time | 1 | 999 |
| End of Slow - show shares fill today | 5 | 999 |
| Strategy validation | 2 | 2 |
| News | 4 | 5 |
| Paused, etc (order status) | 1 | 999 |

Story Line

Initial strategy selection . . . user sees "Rebalancing", then after 2 minutes sees "Cruise"

Safe mode; rate control; SLOW events show up for 2 minutes, then fall back to "Cruise"

Normal rate recovered . . . user sees completion time

News . . . user sees "News", that sticks until a new event comes along unless there was previously a Shares today Final stage transition . . . user sees "Compl. 2:15 PM"

Re-estimate completion . . . user sees "Compl 4 PM"

HV reject/recover→user sees "Validation"; after 2 minutes user will see "Cruise"

go to Initial Strategy Selection above . . .

Overnight Storage and Recovery of Trading Information

Filter Condition was_traded_yesterday (Boolean): the same firm had an order yesterday in the same symbol and side.

When a trade is continuing from a prior day, some variables pertinent to the original arrival may factor into the strategy decisions.

One may have the following filter conditions:

Momentum_since_original_arrival: return from original arrival to today's arrival price [bps].

Relative_momentum_since_original_arrival: return from original arrival to today's arrival price [bps].

Sector_relative_momentum_since_original_arrival: return from original arrival to today's arrival price [bps].

All_filled_quantity [relative to ADV, in %]

Yesterday_filled_quantity [relative to ADV, in %]

SVD_delay: 1+SVD(new arrival)-SVD(last fill time), measures the delay since we stopped trading, in units of ADV All_incurred_shortfall: shortfall on shares filled so far relative to the original arrival price [bps]

Yesterday_shortfall: shortfall on shares filled so far [bps]

Yesterday_impact: estimated impact of shares filled yesterday, based on yesterday's average participation All_incurred_impact: estimated impact on whole order so far Overnight Storage Per Multi-Day Block-ID Every symbol/side/firm with activity in the trading day will create or update an entry for overnight storage in a multiday trade information table with an associated multi-day block-ID. Prior entries that did not have new activity will be deleted. The overnight data will be recovered on the next system startup; if there is further activity on the same symbol/side/firm the entry will be updated based on the day's activity; entries with no new activity will be deleted.

Original arrival price
Original SPY midpoint
Original ETF midpoint
Original arrival date/time
Shares filled in the day
Average price on the day's fills
Shares tilled so far in the trade since the original arrival
Average price so far since original arrival
Time of last fill
Tape volume in the day
Tape volume since original arrival
Priority Filter condition was_traded_yesterday is an urgent priority to support TBC and Cap Re. The remaining requirements will enable more refined strategy design but are not urgent and can be scheduled after LNET integration.

Data Warehousing
  Orders handled per special trading instructions will be identified as such in the orders table
  The multi-day trade information table history will be data-warehoused.
End of Day Reporting
  Option to add AVWAP and VWAP benchmark comparisons to the daily reports for users who request these
Help Desk
  FilterName column to be available in order scan
  If we are in the last stage, trading at trickle speed and PAL>15% a major alert should be sent to Customer Service making it clear they are to notify the account rep that the client should use speed controls to click into a higher speed if desired.
Logging
Show on route events
  Tactical pullback price if used
  In stage 1 routes, show PAL0
  In stage 2 routes, show lagging rate, MinPAL1 and PAL1, in percent as integers
Testing
Defaultconfiguration will be tested, as well as every single-parameter modification thereto.
Test behavior in last 15 minutes of trading day. Test behavior with odd lot orders; with orders in extremely thin names where 20-40% LBQ can be greater than the order size; and small orders in extremely liquid names.
  Updated Ordering of Sortd Checks (see FIGS. 47-51).
  Startup and Default Routing
Fill rate below refers to the filled quantity/tape for the most recent non-IOC route, or if this is the first continuation route, the fill rate for the initial route.
  Basic switching logic: pull routing table entries using TOD, LiqRisk and Speed. Select amongst these as follows:
    a) draw quantity from Min Max % LBQ and set price using customer limit and safety
    b) exclude inactive vendors c) if last route was IOC, exclude IOCs
d) exclude the algorithm that was most recently employed
e) if result set is empty, skip to step (g)
f) exclude in accordance with the flow charts given herein
   a. if result set is not empty then adjust price and quantity if required
   b. if the result set is empty, undo exclusions (c)
g) if there are multiple entries in the result set, apply score-weighted roulette selection

TABLE 14

| Speed Setting | Startup | Continuation |
|---|---|---|
| Low | Dark IOC Or LV that is not LSLV if Cancel-Replace from a higher speed | If r = 0, if was HV algo, switch to LV Algo that is not LSLVIOC else, modify low speed to medium and use LSLV that is not LSLVIOC Else HV |
| Medium | Live Start that is not LSLVIOC, Or LV that is not LSLV if cancel-replaced from a higher speed | If r < 5%, it the offer price is less than the midpoint at the time of the last route, route to LSLVIOC algo limited to offer + $0.01 else switch to LV or IOC algo that is not LSLVIOC. Else HV |
| High | Live Start that is not LSLVIOC | If r < 10%, If offer < midpoint at the time of the last route, then use LSLVIOC limited to offer + $0.02 else switch to LV algo that is not LSLVIOC Else exclude only LSLVIOC |

Figures 1, 2:
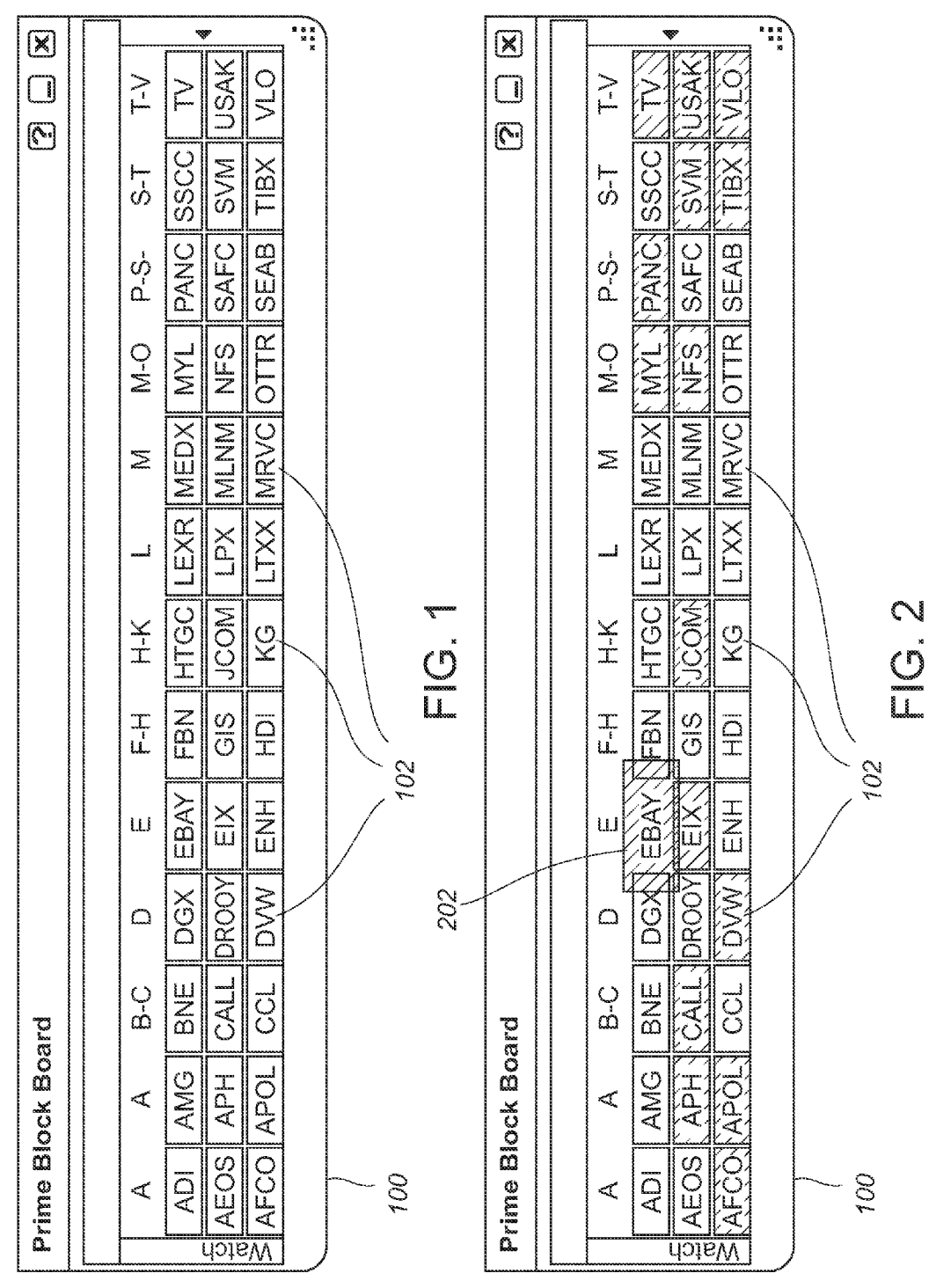
Figure 5:
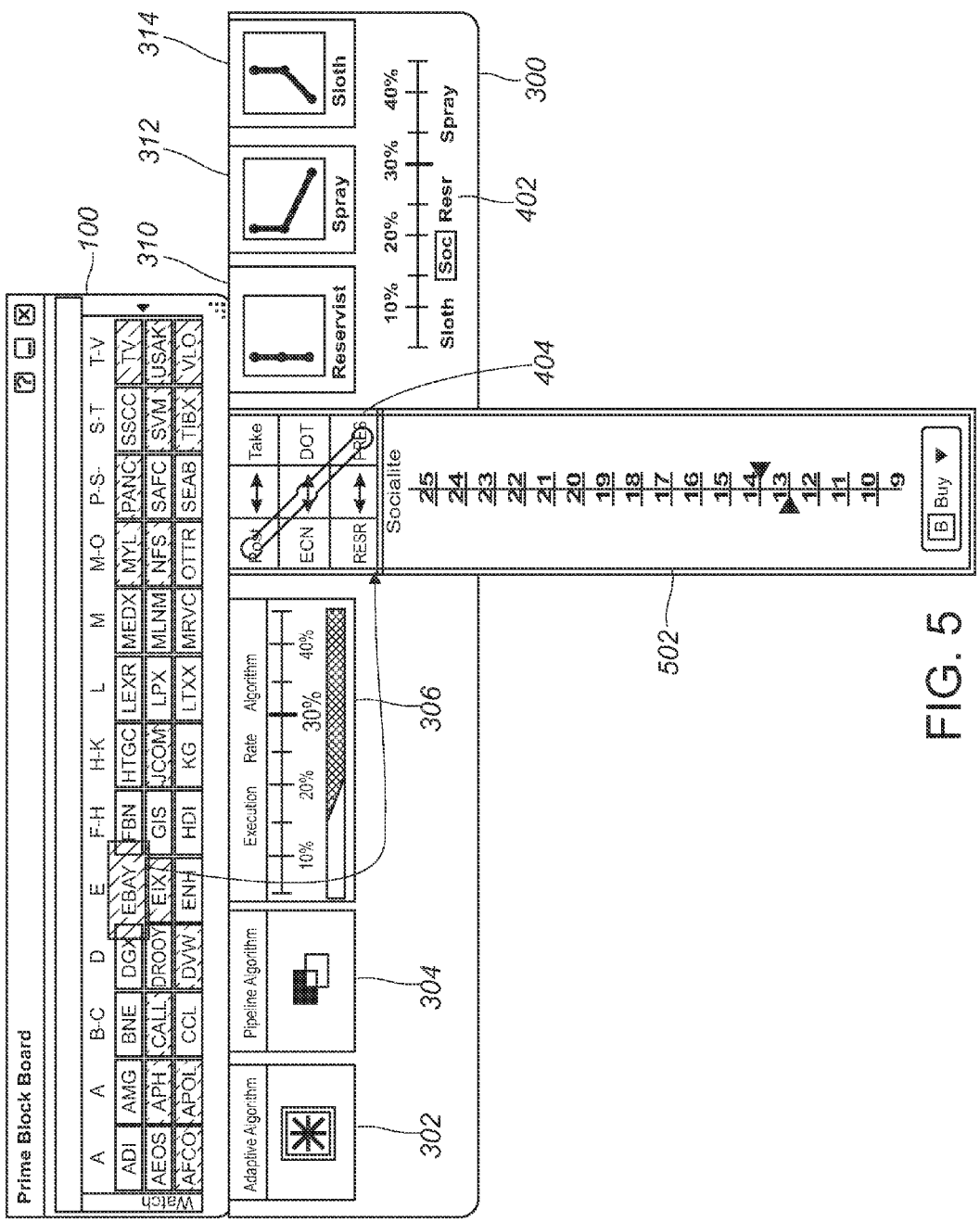
FIG. 5 shows the dashboard with a fishbone (i.e., a dynamic, vertical price scale)
Figure 10:
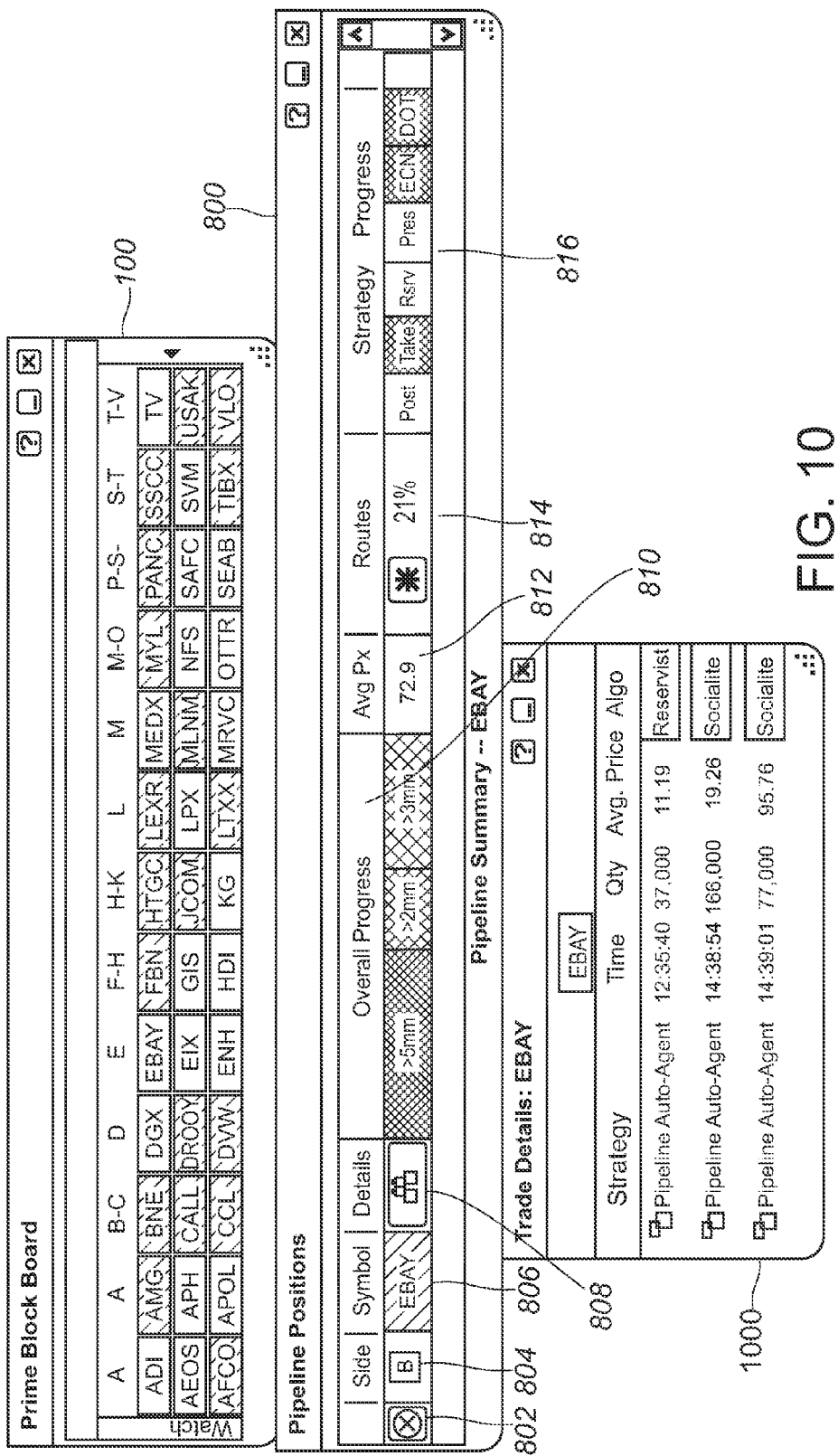
FIG. 10 shows the positions window with a trade-details information box.
Figure 48:
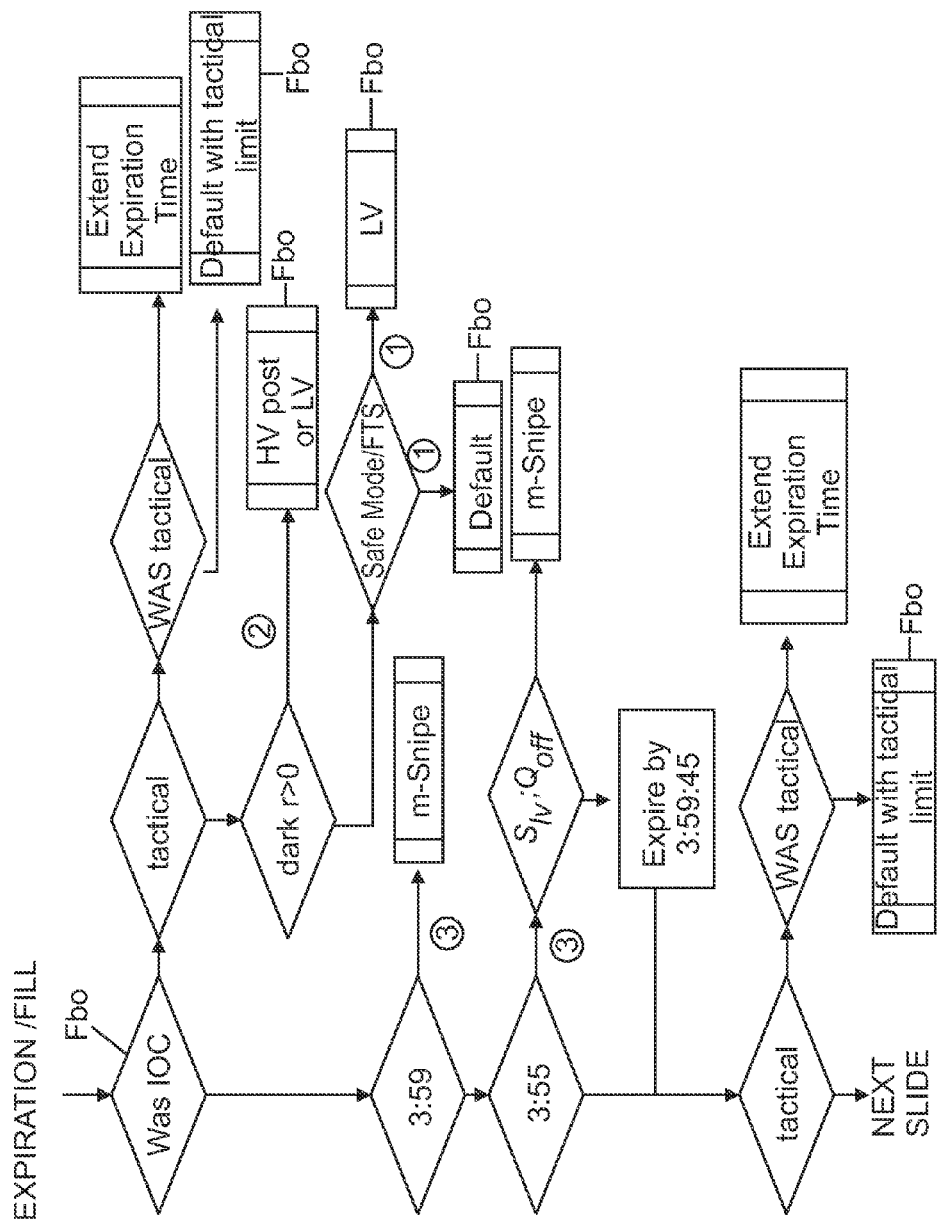
FIGS. 48-51 depict exemplary steps regarding updated ordering of sortd checks.
Figure 49:
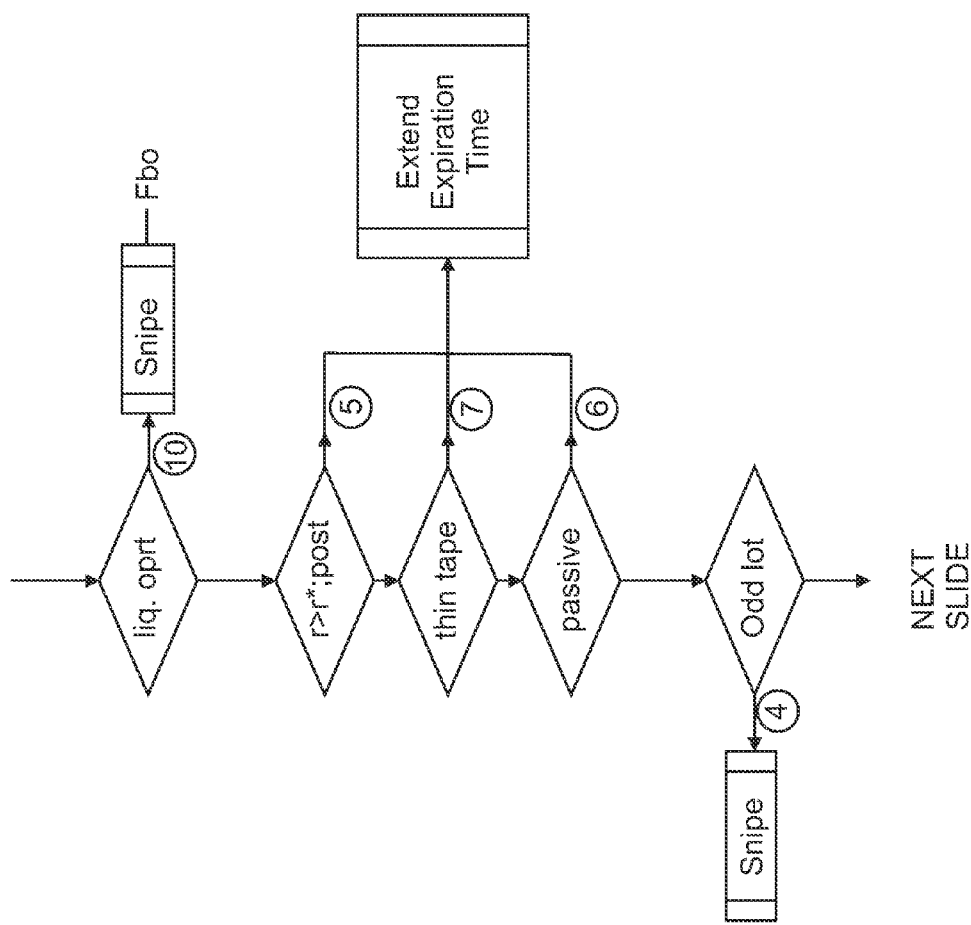
Figure 50:
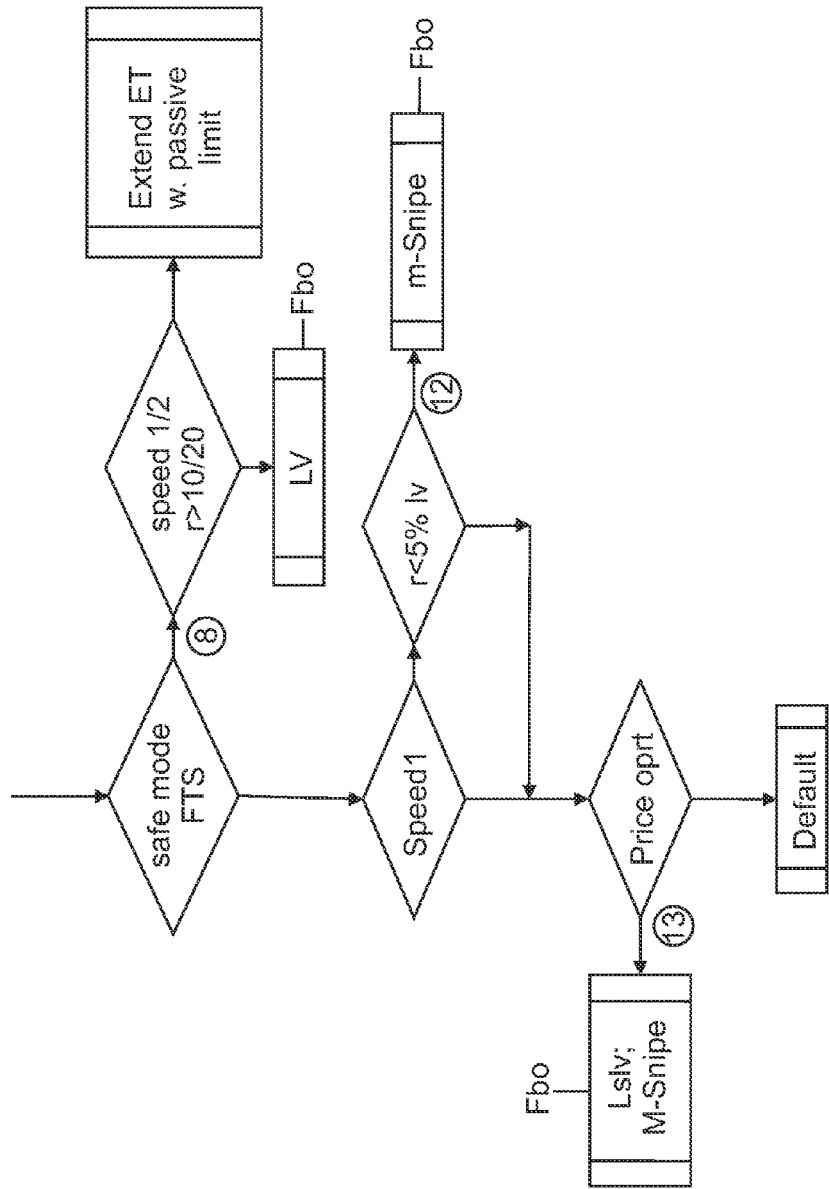
Figure 51:
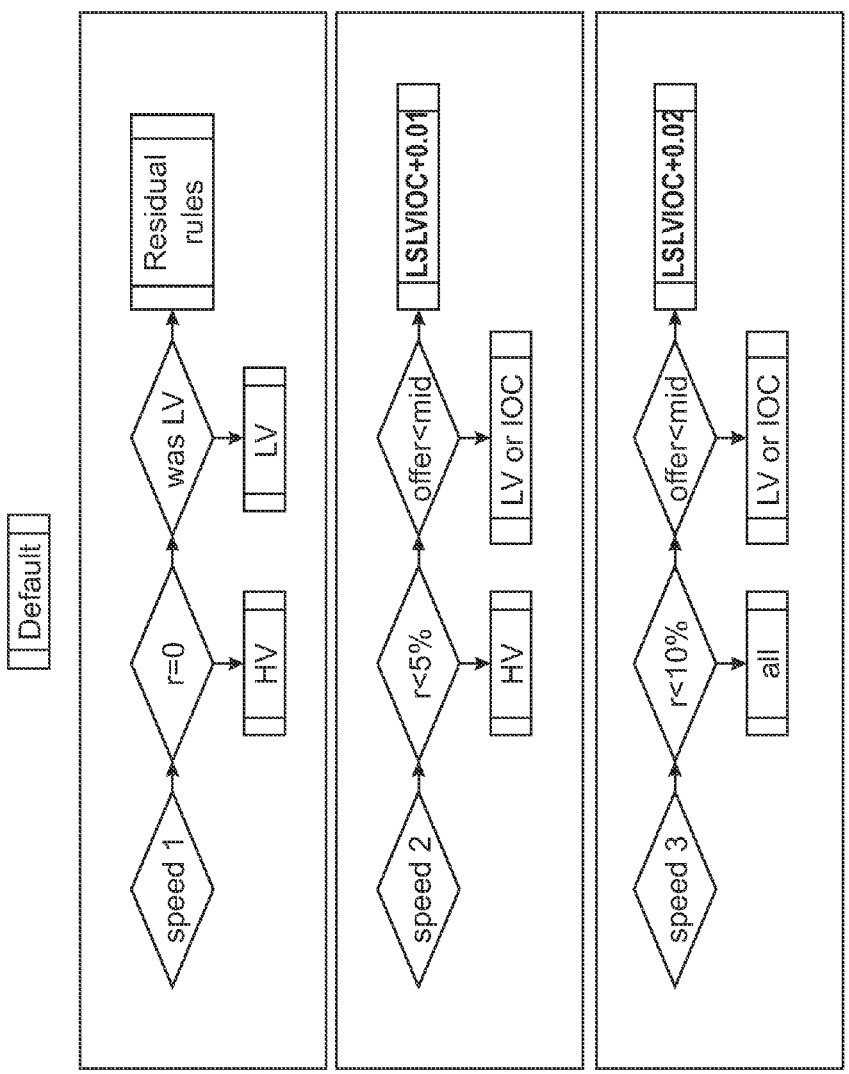

FIG. 48
1. Safe mode for fast-moving stocks (low rate variance for adverse selection control): If price exceeds Max($S_f^+$, $S_{70}$) where $S_{70}=S_0+0.7*(S_{max}-S_0)$ and $S_{max}$ the max price since arrival (vice versa for sells, using Min( ), and $S_{min}$ in the equation above), we will
   a. Use only low variance algorithms that are not live start.
   b. If on expiration of a non-IOC route, if speed=1 or 2 and we find that it filled more than the expected fill quantity $Q_{EFQ}$, then replenish TIF to the same algorithm but with a limit price set to $S_f^+$ (cancel and new order to same algorithm with this limit price).
   c. This "safe mode" behavior will persist as long as the stock does not revert back to a "normal" price.
2. Adverse selection in dark pools. If dark IOC returned one or more fills, route to strategy with Take=0 or low variance that is not live start.
3. Trade Completion. On non-IOC switch event after 3:55 PM and residual<10% of OrderQty and Offer Qty>residual (for a buy) and offer price is lower than Low Variance Enforcement limit, then snipe offer. Else id 3:55 PM or later, let the TIF be the lesser of that given by the routing table or the number of seconds from the present time to 3:59:45, rounded down to the nearest multiple of 10 seconds. On non-IOC switch event after 3:59 PM, if Offer Qty>residual (for a buy) then snipe offer. Here and elsewhere in this document, the term "snipe" means route to an algorithm with Speed=4. The time parameters (3:55 PM and 3:59 PM) and the 10% parameter for residual versus order quantity are config-urable; the residual % may be increased to 100% and times set to 3:30 PM and 3:45 PM to facilitate testing.
4. Odd lots. On non-IOC switch event, if aggregate Filled Qty is odd lot then route lot completion to Very Fast algorithm.
FIG. 49
5. Continue successful post. If rate>5%, 10% or 20% for Low Medium or High speed and take=0, extend expiration time
6. Extend TIF if passive. If limit price is below the bid for a buy, or above the offer for a sell, reset expiration time
7. Extend expiration time for slow stocks. On expiration, if aggregate tape volume has not changed by more than 100/x shares where x is our target speed, reset expiration time. Target speed is 0.08/0.15/0.22 for low/med/high.
8. Max rate for safe mode. If in safe mode, speed=1 or 2 and last route filled more than 10% or 20% of the ETQ, respectively, repeat same route with limit price set to threshold for safe mode operation
9. Limit price and mean reversion. While *not* in safe mode, limit price will not be more aggressive than $S_m$.
FIG. 50
10. Liquidity opportunist. On every non-IOC route expiration event. If the current offer price for a buyer is no higher than $S_{lo}$, Liquidity<=3 (configurable Max Liquidity Class), and the offered size is at least equal to $Q_{LOT}$, then route to speed 4 IOC algorithm limited to the current offer price. Likewise for sell orders when a large size is displayed on the bid and the bid is at least as high as fair price, apply Very Fast algo limited to the bid
11. 11. Price opportunist for speed 1. On non-IOC expiration event. If speed is "Low", offer price (for buy) is lower than $S_{lpo}$, use Very Fast IOC algorithm with limited to the current displayed offer and price limited to the current offer price.
12. Staying in the game for speed 1. On non-IOC expiration of a Low Variance algorithm. If speed is "Low", the last route returned r<5% and the current offer is no greater than $S_{lv}$, then route to speed 4 algo locked to the offer price with a quantity limited not to exceed $Q_{iv}$.
13. AIM trading for speed 2, 3. On non-IOC expiration event. If speed=2 or 3, offer price (for buy) is lower than $S_f^-$), whenever prior requirements called for low variance algos use live start low variance algos instead (lslv).

In addition to the above-described embodiments, one skilled in the art also may envision an embodiment wherein the subject system includes a strategic algorithm which employs the same mechanisms used by the Adaptive and Execution Rate algorithms to select, manage and switch between the subject system's universe of proprietary tactical algorithms to select, manage and switch between a set of third party algorithms. Such a strategic algorithm would eliminate the need for a user to have to choose which of the (potentially hundreds of) broker-sponsored/third party algorithms are best suited to work an order under existing market conditions. Rather, he could rely on the subject system's real time selection and management mechanisms to choose and then switch between a set of third party algorithms as the order parameters and market conditions evolve over time.

More specifically, one or more exemplary embodiments which incorporate the use of broker-sponsored algorithms also enables traders to incorporate Broker preferences into the subject system's automated selection, management and cancellation of algorithms. Certain of these exemplary embodiments are referenced colloquially herein as "Service Bureau." In one or more of these Service Bureau embodiments, the subject system is able to incorporate consideration of the Broker preferences driven by issues such as research votes, broker restrictions and settlement restrictions into both its decisions related "Filter B" strategy and filter selection as well as the automated selection and management of algorithms via strategic algorithms. As a result this exemplary embodiment gives traders the benefits of the subject system's automated strategy and algorithm selection and management without forcing a trader to use the subject trading system as an intermediating Broker/Dealer. Traders can exploit the predictive switching offered by the subject system while still directing trades to a specific Broker or set of Brokers, thereby enabling clearing and settlement directly with the Broker of choice.

To accomplish one or more of these goals, exemplary embodiments of the subject system support a configuration of a strategic algorithm that allows orders that are routed by the subject trading system using the subject system's automated process for algorithm selection and management, to be routed and executed in such a manner that for the purposes of settlement and clearing they appear to be sent directly from the initiating trader. Executions returned from these Service Bureau orders may also be passed back to the customer as coming from the executing broker/dealer. Therefore, from a clearing and compliance perspective the subject trading system in this Service Bureau embodiment is acting as a technology provider only, not as a broker/dealer.

Furthermore, in an exemplary embodiment the subject system may combine a Service Bureau configuration with a mechanism for tracking the trading obligations of the buy-side customer. Then the subject system can use this information when selecting broker algorithms to guide a customer's order flow toward satisfying its trading obligations.

In exemplary embodiments, a Service Bureau configuration may work in two modes:

Manual—The system may support receiving target broker information on a customer order, initially as a default configuration based on order route. This target broker will be the primary algorithm vendor when selecting algorithms to work the customer order. When the system is unable to find a valid algorithm from the target broker it may fall back to using non Service Bureau logic for selecting the algorithm. Orders routed to the target broker are "service bureau" orders. Orders routed to other vendors are "normal routed" orders. A customer sending an order with a Manual target broker may not be guaranteed to receive all of their executions from that broker. For the perspective of clearing and settlement, executions that are not from the target broker will appear as trades from the subject system.

Automated—This expands upon the Manual logic to enable the subject system to automate the application of the target broker to the order. The system may receive a list of target brokers at the start of day and manage the ratio of order flow to the brokers on the list.

The Service Bureau may, in one or more exemplary embodiments, be implemented via the following exemplary enhancements to the implementations described above.

1. A trading system FIX engine may enable all orders received over a given FIX session to be mapped to a target broker.

2. The system is configuredto implement Automated target broker instructions. If no target broker is mapped to an order entry channel, this logic may initially set the target broker to "trading system." Alternatively, more complex mapping algorithms may be used, as will be clear to those skilled in the art.

3. Extensions to the system route selection logic to constrain choices to the algorithms provided by a specific target broker when that target broker has a live algorithm of the classification (Stealth, Hidden, Participate, . . . ) selected by the system. When the system chooses a style for which there is no active algorithm provided by the target broker, it may route to the best algorithm in that class, regardless of broker.

4. The system may send a customer identifier to the algorithm broker/dealer on child (routed) orders sent to the target broker specified on the parent order. This identifier allows the target broker to recognize the order as coming from the buy-side customer (not the trading system).

5. Updating execution reports sent back to a customer to identify a chosen algorithm broker/dealer on the execution reports of the subset of fills that come back from the target broker specified.

Note that 4 and 5 may not apply to a child order that has a target broker specified, but is filled by a different broker than the one specified as target broker.

6. Updates to the trading system web help-desk, clearing systems, data warehouse, business intelligence, and compliance reporting to properly recognize that some child orders and fills will be processed as service bureau child orders and fills. Such updates are relatively routine to those skilled in the art.

Trading Server

Configuration

Exemplary configuration settings listed below preferably are "live updatable."

Enable Automated Service Bureau—A firm/trader level configuration that may allow the trader's order activity to be "managed" based on a configured list of target broker commitments.

Enable Manual Service Bureau—A firm/trader level configuration that may allow the target broker to be accepted on individual orders.

Enable Manual Service Bureau Grouping—A firm/trader level configuration that may allow FIX Orders submitted with a target broker to be grouped by that target broker in a switch board.

Broker Customer ID—A Firm Destination Channel level setting that may allow a trading system to identify a customer when sending an order on their behalf to a specific Algo (algorithm) Broker.

Customer Broker ID—A Firm Destination Channel level setting that may allow a trading system to report an Algo Broker when sending an execution from that Broker back to the Customer.

Customer ID Tag—A FIX Session Setting that identifies which tag to use to specify the Customer ID on Service Bureau orders.

Exec Broker ID Tag—A FIX Session Setting that identifies which tag to use to specify the executing Broker on Service Bureau executions back to the customer.

Target broker ID Tag—A FIX Session Setting that identifies which tag to use to specify the target broker on customer orders that may manually specify a target broker for Service Bureau orders. The target broker ID Tag value may match a preconfigured-Customer Broker ID.

Default target broker—A Firm order route setting that enables a target broker to be assigned to all orders sent via a Firm Order Route, if otherwise unspecified.

Target Broker

A target broker can be assigned to an order manually by the Trader or automatically by the trading system. A trading system order in one or more embodiments may only have one target broker (but certain other embodiments allow for more than one). The trading system database may capture the target broker ID, and how the target broker was assigned (manual or automatic).

If an order has a target broker, the subject system implementation may attempt to use algorithms associated with that broker first, when generating a routed order.

If the system is able to use the target broker, the routed order will be flagged as a Service Bureau Order in the system. If the system is unable to use the target broker, the routed order will be sent as a standard trading-system-to-broker routed order.

Manual Target Broker Assignment

If the customer has been configured with a default target broker, that broker may be used for all orders over the configuredOrder Route.

Moreover, in an exemplary embodiment, the trading system may use a "sticky broker" feature for the Service Bureau. This enables the system to ensure that once a Target Broker executes for a customer on a given Symbol/Side, subsequent orders in that Symbol/Side will flow back to that broker. This reduces the possibility of split tickets for a customer between multiple service bureau brokers.

In this embodiment:

(a) The Target Broker of the first Service Bureau execution for that Firm/Symbol/Side may receive all subsequent Service Bureau flow from that Firm/Symbol/Side for the remainder of the day.

(b) When assigning a Target Broker the server may check whether a Target Broker has already executed a Service Bureau order for that Firm/Symbol/Side.

(c) If there is an existing Target Broker for the Order's Firm/Symbol/Side, the server may apply the same Target Broker.

(d) The Sticky Broker logic may override all other system Target Broker Assignment logic.

(e) If the currently "sticky" Target Broker for the Firm/Symbol/Side has been removed/deactivated for the Firm:

(i) The previous Sticky Broker for the Firm/Symbol/Side will be removed and a new Target Broker will be assigned.

(ii) The system will Log an Alert. For example:

LOGMINOR(funcname,"[Firm:%] [Trader:% s] [Symbol:% s] [OrderId:% s]—Sticky Target Broker [BrokerId: % s] is no longer available as a Service Bureau Broker. New Sticky Target Broker is [BrokerId % s].");

If the customer does not have a default target broker con FIG. d, the following requirements may apply.

To specify target brokers on FIX orders, a trader may be configured to have the following: (a) the trader must have the Enable Manual Service Bureau entitlement to access the Service Bureau functionality; (b) the trader must have a FIX Session configured with a target broker Tag; and (c) the trader must be configured with the correct target broker ID mappings.

If the Trader's FIX Session has been configured to receive target broker information, but the system cannot identify the target broker, the order may be rejected. If the Trader's FIX Session has been configured to receive target broker information, but the trader is not entitled to specify target brokers, the order may be rejected.

Service Bureau Orders

The system may add a new Order Option Flag: ServiceBureauOrder. Subject system orders sent to a target broker for a parent order using the Manual or Automated Service Bureau may be marked as ServiceBureauOrders. Service Bureau Orders may be ignored by OATs reporting logic and by compliance related audits.

Executions against ServiceBureauOrders may be ignored by compliance audits and may not be reported to ACT, specifically in end of day aggregate reports (by firm or destination).

ServiceBureauOrder Executions may be reported to ARS, with a flag identifying them as such.

When sending a ServiceBureauOrder out to an Algo Broker, the trading server may include the applicable Broker Customer ID to the order. When sending an Execution from a ServiceBureauOrder back to the Customer, the executing Algo Broker may be identified on the FIX Execution Report. When sending a Service Bureau Execution report to the GUI, the target broker may be identified as the Execution Source (rather than the subject trading system).

Order Grouping By Target Broker

If Enable Manual Service Bureau Grouping is turned on, when FIX Orders are received with a target broker, the server may pre-fix the target broker ID into the Sender Sub ID sent down to the GUI. If the Trader is already using List Grouping, the target broker ID may be attached as a Prefix after the List Group ID has been applied. The result is that a List Trader would see MLCO-B/MLCO-S as their groups, assuming that MLCO is the target broker ID.

Subject System and the Block Market

Block Market fills preferably are reported as subject trading system fills, not fills by the target broker.

In an embodiment, the system may recognize the target broker Order Identifier. If the system is able to find an algorithm from the target broker it may flag the routed child order as a Service Bureau Order. This will allow the trading system to properly apply the correct identifiers and handling for compliance and clearing.

If the system is unable to find an algorithm from the target broker, the order may be treated as a normal trading system Routed Order to a Broker algorithm.

Target Broker Handling

In an embodiment, the system may recognize the target broker Order Identifier and the route selection logic will not be modified to prioritize the target broker in the algorithm selection. If the system picks an algorithm with a broker that matches the target broker, it will flag the Order as a ServiceBureauOrder.

Target Broker Overrides

A Target Broker assigned to orders may be overridden based on the trading filter applied to an Order.

Target Broker Filter Settings (a) Blank/Missing—There is no Target Broker override. The system may use the Default Target Broker assigned to the order. This may be the default for all Filters.

(b) BROKERID—The order may use the configured BROKERID for the Target Broker.

(c) "#SBOFF"—This special command may designate the order to have no Target Broker. The Default Target Broker may be removed, and the order may trade as a normal host trading systemOrder.

Assigning the Filter Target Broker to an Order (a) If/when the first filter has been applied to a New Order, the server will check for an existing Sticky Target Broker. If one exists, that Target Broker will be used for the order and the Filter Target Broker will be ignored.

(b) If there is no Sticky Target Broker, the system will check the Target Broker Filter Setting and determine whether the Target Broker assigned to the order needs to be adjusted.

(c) If the Target Broker Filter Setting is Blank, there will be no changes to the order.

(d) If the Target Broker Filter Setting is #SBOFF, the Target Broker will be stripped off the order and it will trade outside the Service Bureau as a normal host trading system order.

(e) If the Target Broker Filter Setting has a Broker ID, the server will check the Firm's Service Bureau Broker configuration to find a Target Broker that matches that ID.

(i) If a match is found, the server will apply the Filter's Target Broker ID to the order.

(ii) If a match is NOT found the server will: (1) leave the Order's existing Target Broker in place; and (2) log an alert (e.g.:

LOGMINOR(funcname,"[Firm:%] [Trader:% s] [Symbol:% s] [OrderId:% s] —Filter Target Broker [BrokerId:% s] is not a Service Bureau Broker. Using existing Target Broker [BrokerId]:% s.").

Multiple Target Brokers

As discussed above, in one or more embodiments the system supports the configuration of multiple Target Brokers for a firm, but the customer is limited to trading with only one of these Brokers at a time. In an exemplary embodiment described below, the system may allocate orders to multiple Target Brokers based on targets established to direct the trading of a certain percentage of parent Orders to each Broker.

Trading Server Configuration

Target Broker Set: a collection of settings for configuring Target Broker allocations.

Target Broker Set Repeating Settings:

Target Broker Id—The identifier of a Broker configured as a Service Bureau Target Broker.

Target Broker Alloc %—Percentage of order-flow that should be allocated to the Target Broker.

(b) Target Broker Assignments

Target Broker assignments may be made at the time a New Order is received.

Once an Order has been assigned a Target Broker, that Target Broker may remain for the lifetime of the order.

Target Broker may be maintained across Cancel/Replaces in Quantity for that Order.

(c) Target Broker Assignment Logic

This section describes the calculations for ensuring Orders are distributed across Target Broker based on the ratios configured in the Target Broker Set.

Scope

The Terms described below may be unique to each Customer Firm using multiple Target Brokers.

Terms for Distribution Calculation.

The Distribution Logic will work with the following terms.

[N]=Index of Broker within a Target Broker Set. N can be 0 to (Number_of_Target_Brokers−1).

[!N]=Index of each Broker within a Target Broker Set that is NOT the current [N].

tbAlloc[N]=Percentage of Order Flow configured for Target Broker [N].

tbqtyAlloc[N]=Sum shares Assigned to Target Broker [N].

qtyTotalAlloc=Sum of all shares Assigned to all Target Brokers.

qtyOrder=Shares to allocate on New Order.

Standard Deviation Squared Calculation

For each Target Broker, calculate the following. Note the SUM is for all Target Brokers that are not the current N.

$$tbStdev[N]=(((qtyOrder+tbqtyAlloc[N])/qtyTotalAlloc)-tbAlloc[N])2+SUM[!N]( ((tbqtyAlloc[!N]/qtyTotalAlloc)-tbAlloc[!N])2)$$

Select the Target Broker based on lowest tbStdev[N].

Target Broker=MIN(tbStdev[N]).

Increment tbqtyAlloc[N], qtyTotalAlloc by qtyOrder.

(d) Recovery

In the event of a system failure, the following may need to be recovered for each Customer Firm:

tbqtyAlloc[N] —The sum of shares allocated to each Target Broker. The sum of shares executed by the customer with each Target Broker.

qtyTotalAlloc—Total shares allocated across all Target Brokers. Sum of shares executed by the customer across all Target Brokers.

Error Trades

Error Trades are primarily generated when the subject system employs Optimistic Cancel Logic (routes Cancel of old and sends New order simultaneously).

In an embodiment, the subject system preferably will not use Optimistic Cancel if: either the Currently Routed Order or the Pending New Order would be flagged as Service Bureau Orders, and the Currently Routed Full Quantity (regardless of Remaining shares left on the order)+Pending New Order Quantity are Greater Than the Leaves of the Parent Order.

In another embodiment, Error Trades are generated if AMD uses its OverCommit functionality. In this embodiment, the subject system preferably will not use OverCommit Logic if either the Currently Routed order or the Pending New Order are flagged as ServiceBureauOrders.

Unexpected Error Trades

If despite the requirements listed above the system does generate an Error trade against a ServiceBureau flagged order, a system alert preferably will be generated: "WARNING Error Trade Generated for Firm [FIRM MNEMONIC] with Broker [BROKER MNEMONIC] for [EXECID] [SIDE] [EXECQTY] [EXECPRICE]."

Minimum Quantity Requirement

The Optimistic Cancel feature may allow the Subject system to submit multiple orders, or replace existing orders where the Pending New Quantity+Pending Cancel Quantity may be greater than the Order Remaining Quantity. If the Optimistic Cancel results in an Over-Fill of the Customer's Parent Order, those shares may be taken into the Error Count.

The Service Bureau presents a challenge to this functionality since the trading system is no longer the broker/dealer for all of the executions. An overfill on a Service Bureau order can create a fill known to the Target Broker but not to the Customer.

Described below is a Minimum Quantity requirement used in one or more exemplary embodiments for service bureau orders that should decrease the chance of service bureau Error Fills.

Trading Server (a) Configuration

SB_MIN_QTY_LBQ_FACTOR—Float—Multiplied against a Security's LBQ to set the MIN SB QUANTITY for an order.

Default=1 (The LBQ.)

Valid Range=0 (No SB Min Quantity)–9999 (Effectively turns off SB as order quantity would likely always be below the minimum).

This setting may be applied to Firms/Traders.

This setting may be live updatable. Live updates may apply to Orders submitted after the change.

(b) Service Bureau Min Quantity

Service Bureau Min Quantity (SB_MIN_QUANTITY) may be calculated as Order.Security.LBQ×Trader.SB_MIN_QTY_LBQ_FACTOR.

IF an Order has a Target Broker AND the Order Remaining Quantity (Total Quantity−(Filled+Routed))<SB_MIN_QUANTITY_THEN LOGDETAIL(funcname,"Customer [Firm/Trade ID] Order [OrderID] Remaining Quantity [Order.RemQty] is less than [Instrument Ticker/LBQ], remove order from Service Bureau routing.");

Suspend use of the Target Broker for making routing decisions.

All subsequent Child Orders should be routed as host trading system orders.

(c) Service Bureau and Small Orders

IF a new Order arrives with Quantity<SB_MIN_QUANTITY_THEN it will be ineligible for trading via the Service Bureau.

IF the Parent Order is Cancel/Replaced to a Quantity such that its Remaining Shares are >=SB_MIN_QUANTITY THEN the Target Broker can be applied for routed Children until such time that the Remaining Shares fall below 1×LBQ.

(d) Quality Assurance

For the following scenarios assume the following:
Customer is setup with default Target Broker=XX.
Lare Block Quantity (LBQ) for MSFT=100K.
Customer SB_MIN_QTY_LBQ_FACTOR=1.0
SB_MIN_QTY=100K Scenario 1
1. Customer submits Buy 10K MSFT.
2. Server does NOT assign Target Broker.
3. Subject Trading System Routes 10K to DEEPVALUE as "Trading System" Order.
4. DEEPVALUE fills Order, Customer receives 10K from Subject Trading System.

Scenario 2
1. Customer submits Buy 120K MSFT.
2. Subject System Routes 10K to XX as Service Bureau Order, Fills.
3. Subject System Routes 5K to XX as Service Bureau Order, Fills.
4. Subject System wants to Route 10K, (120K−(15K [filled]+10K [pending new])==95K<SB_MIN_QTY [100 k]).
5. Server removes Target Broker.
6. Subject System Routes 10K to DEEPVALUE as "Trading System" Order.

Scenario 3
1. Customer submits Buy 50K MSFT.
2. Server does NOT assign Target Broker.
3. Subject Trading System Routes 10K to DEEPVALUE as "Trading System" Order.
4. DEEPVALUE fills Order, Customer receives 10K from Subject Trading System.
5. Customer Cancel/Replaces to 200K.
6. Subject Trading System applies XX as Target Broker.
7. Subject Trading System Routes 100K to XX as Customer.
8. XX fills Order, Customer receives 100K from XX.
9. Order Leaves==90K<SB_MIN_QTY (100K), Target Broker is removed.
10. Subject Trading System Routes remaining 90K to Subject System Trading Brokers (including XX) as "Trading System".

Allocations System

Service Bureau Execution Handling

ARS may recognize the ServiceBureauExecution flag on trades from the trading system Trading System and store in its Trade table.

ARS may recognize the target broker mnemonic on ServiceBureauExecutions from the subject trading system and store in its Trade table.

ARS may map a combination of the Execution's ClearingID+target broker mnemonic to form a mapping to a unique firm/clearing record for commission tracking purposes.

Trade Blocks

If a trade has the Service Bureau flag it may be blocked into a separate Trade Block from normal Trades. Blocking Logic preferably includes: Service Bureau Flag; Firm; Symbol; Side; Trade Date; Exchange; and ISIN. Service Bureau Trade blocks will be auto-allocated at the trade price. The allocations may compute the revenue based on commission rate set for the Firm/target broker combination.

Trade Block Allocations may have a new NeverSubmit status. ServiceBureau Trade Blocks may be set with status=NeverSubmit and submitted=TRUE which indicates the trades are locked but may be pulled for revenue computations.

ARS GUI will not allow submission (checkbox) when status=NeverSubmit.

Clearing Account

New clearing account type: SBTYPE is just a place holder so that no bad data gets into the allocations.

Clearing Broker: (a) may hold a dummy record to be mapped to SBFirms where we do not actually clear the trades; (b) may be of status=Inactive (where it may never be sent); and (c) may be displayTag=True where this broker's tab will be displayed and allocations displayed.

Firms

New FirmType may be added—SBFirm, to hold the FirmID/target broker ID mappings. Billing Firms will work with SB (service bureau) Firms.

User Interface: Allocations may appear in their own tab (SB Broker). Trades may have a new filter (SB Trades).

Data Warehouse

ETL—Trading Server

Order Fields: Target Broker ID; Target Broker Assignment Type (Automatic/Manual); and ServiceBureauOrderFlag. Execution Broker for ServiceBureauOrder fills.

ETL—ARS

Service Bureau Flag on Trades. Service Bureau Flag on Trade Blocks.

Reports

Fills resulting from Service Bureau Orders may be counted in daily volume/Engine reports.

Service Bureau Orders/Fills preferably are not included in compliance reporting.

Exemplary Service Bureau Scenario

10:00 am Customer routes block order for 220K to subject trading system.

10:01 Subject Trading system routes 5K to BrokerXX as a Service Bureau Order, identifying the Buy-Side Customer as the sender of the order.

10:05 5K, filled, all executions forwarded back to Customer with ExecSource=XXXX.

10:05 Subject Trading system routes additional 15K to XX as Service Bureau Order.

10:06 Block Fill in trading system for 100K. Executions back to customer with ExecSource=BLOK.

10:06 Order now has 105K Filled, 15K in Engine to XX.

10:07 15K order is filled at XX (Leaves=100K).

10:09 Subject Trading system routes 25K to Broker YY as "trading system" (XX does not have appropriate algorithm).

10:11 YY fills 25K.

10:12 Customer clicks "Fast Forward" in GUI, subject trading system routes 75K to Trading Platform AAA as "Trading system."

10:12 AAA fills 75K.

16:00 Customer Allocates/Clears 200K with BLOK.

16:00 Customer Allocates/Clears 20K with XXXX.

What preferably is reported to OATS:

10:00 New Order from Customer for 220K Received by BLOK (BLOK=example clearing name for subject trading system.

10:06 Exec in BLOK for 100K.

10:09 BLOK routes 25K to YY.

10:12 BLOK routes 75K to AAA.

10:12 Order Canceled in BLOK by BLOK (not customer), Leaves=20K.

What Broker XX to OATS:

10:01 New Order from Customer for 5K Received by XXXX.

10:05 Exec in XXXX for 5K.

10:05 New Order from Customer for 15K Received by XXXX.

10:07 Exec in XXXX for 15K.

What YY Reports to OATS:

10:09 New Order from BLOK for 25K Received by YY.

10:11 Exec in YY for 25K.

What AAA Reports to OATS:

10:12 New Order from BLOK for 75K Received by AAA.

10:12 Exec in AAA for 75K.

Do not report routed orders to XXXX, or send any XXXX fills to the clearing firm associated with BLOK.

Trade Allocations to Brokers System Exemplary Embodiments

One or more Service Bureau embodiments allow clients to clear trades with target brokers while still leveraging a trading system for execution quality. These embodiments may be used to route customer orders to valid service bureau brokers, so that the resulting trade is cleared between the client and the broker, with the trading system acting as the technology provider.

Clients may be expected to require the ability to manage the flow of service bureau trades as the list of target brokers increases.

In one or more exemplary embodiments (referenced herein, for convenience only, as a Trade Allocations for Brokers System (TABS)) a system provides a web interface that allows trading system clients to actively manage the percentages of Service Bureau order flow to valid brokers. This front-end may collect information from the client to be used by the subject trading system in routing Service Bureau orders to specific brokers.

An objective of one or more of the TABS embodiments is to allow a client to self-manage their Service Bureau order flow to each of their available Service Bureau brokers via a trading system. The client also should be able to view the historical volume executed by each Service Bureau broker.

Exemplary Application Components

The following exemplary components provide an understanding of how a client may direct their order flow to available Service Bureau brokers.

Client Firm

The client is the entity sending Service Bureau orders to the trading system.

A client firm in the Service Bureau UI represents a firm in the Trading System.

The Firm IDs of the clients may be specified so they may be sent to the Trading System along with the applicable target broker.

Target Broker

A target broker is a broker of the trading system client that has been setup to electronically receive Service Bureau orders from the subject trading system as if they came from the client, so that any resulting trades are cleared between the broker and client.

A Target Broker may be accessible to multiple clients or just a single client.

Firms may have their own set of Target Brokers, which will be a subset of an internal Target Broker list.

Target Brokers may need to be managed through the application.

The status of target brokers may need to be managed through the application interface Target Brokers may need to be assigned to each client.

Target Allocations

Target allocations are based on a client's firm-wide strategy to direct order flow to each broker.

Allocations represent targeted percentages of the client's potential trade volume. This may determine how much of their order flow should be sent to the targeted broker.

Allocations may be applicable firm-wide.

Trade Volume

Service Bureau volume by the client may be viewable and updated intraday in the application by these defining elements:

Trade Volume

Broker

Trade Date

Functional Specifications

This section describes what may be implemented one or more embodiments of the TABS application. The specifications support the primary function of assigning target allocations to brokers and peripheral functions around setup, maintenance, and searching for data.

Setup

The following components may be created through the application interface.

Target Brokers

Target Brokers will be created through the interface with the following traits:

Broker ID: This string id is a code that may be used on Import/Export files to synchronize Brokers between the Service Bureau System and other host trading system Systems.

Broker Description: This is a user-friendly name for the Broker.

Status: This reflects whether a broker is active or not.

The general functionality may be as follows:

A Target Broker can be added.

The status of a Target Broker can be updated between active/inactive.

The Broker Description can be edited.

A record with a duplicate Broker ID cannot be created.

An error message should be displayed explaining that a Broker with the same ID already exists.

An exemplary Target Brokers Screen is depicted in FIG. 34.

Firms

Firms may be created in the system with the following traits.

Firm ID: This string id is a code that may be used on Import/Export files to synchronize Firms between the Service Bureau System and other Subject system trading Systems. It may also identify what information an external user can view in the system.

Firm Description: This is a user-friendly name for the Firm.

The general functionality may be as follows

Firms can be created.

A record with a Firm ID that already exists in the application cannot be created.

An error message should be displayed explaining that a duplicate Firm ID exists.

A Firm Description can be edited.

An exemplary Firms Screen is depicted in FIG. 35.

Users

User administration functionality may be used to grant access to the TABS system. Users can be internal to the trading system or external clients. Below in Table 15 is a list of exemplary system properties for each user record.

TABLE 15

| Field | Description | Internal User | External User |
|---|---|---|---|
| ID | The internal database id | Automatically set to a unique value | Automatically set to a unique value |
| UserName | This is the username used for login to the system | Set by Active Directory | Manually created or taken from subject trading system GUI |
| Password | This is the password used by a user for login. It should be encrypted in the database. A manually created password must fit the following criteria: Length >= 8 chars Must contain 3 of the following 4 groups: (1) uppercase alpha, (2) lowercase alpha, (3) numbers, or (4) symbols. | Set by Active Directory | Manually created or taken from subject trading system GUI |
| First Name | This is the First Name of the user | Set by Active Directory | Manually created |
| Last Name | This is the Last Name of the user | Set by Active Directory | Manually created |
| Email | This is the email address of the user | Set by Active Directory | Manually created |
| FirmID | The ID of the firm the user belongs to | Automatically set to DEFAULT | Manually created |
| Role | This is the security profile assigned to the user that determines what the user has access to. The user can belong to more than one role; its access being the aggregate access of the combined roles. | Manually assigned | Manually assigned |
| In Active Directory | A flag that indicates True if the user was pulled from Active Directory, False if the user was created directly in the database | Automatically set to True | Automatically set to False |
| Created | The time the record was created. | Automatically set | Automatically set |
| Modified | The time the record was last modified | Automatically set | Automatically set |

Internal Users

In one or more exemplary embodiments, TABS may require integration with Active Directory for users on the host trading system network. TABS may support an interface for allowing some users to be created, and authenticated during sign-on, via Active Directory.

Internal users may be added from Active Directory through a "Refresh Users" link which may synchronize the user list with the current Active Directory ("AD").

It may be assumed that the "Refresh Users" button will be used infrequently, so that situations where, for example, three different users refresh users at the same time do not have to be handled.

A timestamp for when Active Directory was last refreshed may be displayed.

A unique database ID may be created to reference the user record.

The following fields may be automatically populated from Active Directory and read-only for internal users.

UserName—The Windows Active Directory username of the user.

Password—The Windows Active Directory password of the user.

First Name—The Windows Active Directory first name of the user.

Last Name—The Windows Active Directory last name of the user.

Email—The Windows Active Directory email of the user.

The FirmID of the user may automatically be set to TRADING SYSTEM.

The In Active Directory flag may be set to True.

The user may be assigned a Role to access the system.

Passwords may not have to be brought into the system from Active Directory. Login credentials may only have to be authenticated against Active Directory.

External Users

External client users may be created through the application interface. The external users may fall into two buckets: (1) users who have a subject trading system GUI login and (2) users who do not have a subject trading system GUI login (their logins may be created in TABS).

The following user data may be manually entered into the application.

UserName—The TABS username of the user; it may be brought in from the Trading System GUI if the user has a login.

Password—The TABS password of the user; it may be brought in from the Trading System GUI if the user had a login.

First Name—The first name of the user.

Last Name—The last name of the user.

Email—The email of the user.

The FirmID—of the firm the user is associated with; this identifier may be a valid FirmID in the system and preferably selected from a dropdown.

A unique database ID may be created to reference the user record.

The In Active Directory flag may be set to False.

A user may not be created if a value for one of the traits below is duplicated for another user record.

UserName

Email

General User Functionality

A User may be created

If the user is internal, all the user information may be retrieved from AD.

If the user is external and has a Trading System GUI, all information except the UserName and Password may need to be manually entered.

If the user is external and does not have a Trading System GUI, all the information may have to be manually entered.

A user may not be created if the username already exists in the application

Users may be deleted when they have no roles assigned.

A user may not have access to the system unless a role is assigned; this especially applies to users available via Active Directory who may not be able to access the system unless a role is assigned If a user is removed from Active Directory, the user may not be able to log in, since the password will be inaccessible.

A user may have a firm associated to it using the Firm ID.

Database Tables users—a table of users and their encrypted passwords. password is only set used for non-active-directory users. is_ldap is set to true for active directory users.

```
CREATE TABLE users
(id integer NOT NULL,
created timestamp without time zone,
modified timestamp without time zone,
username character varying(20) NOT NULL,
"password" character varying(50),
is_ldap bit(1),
is_active bit(1)))
);
``` role_assignments—the table that maps users to roles.

```
CREATE TABLE role_assignments
(id integer NOT NULL,
created timestamp without time zone,
modified timestamp without time zone,
user_id integer,
role_id integer)
```

Figure 36A:
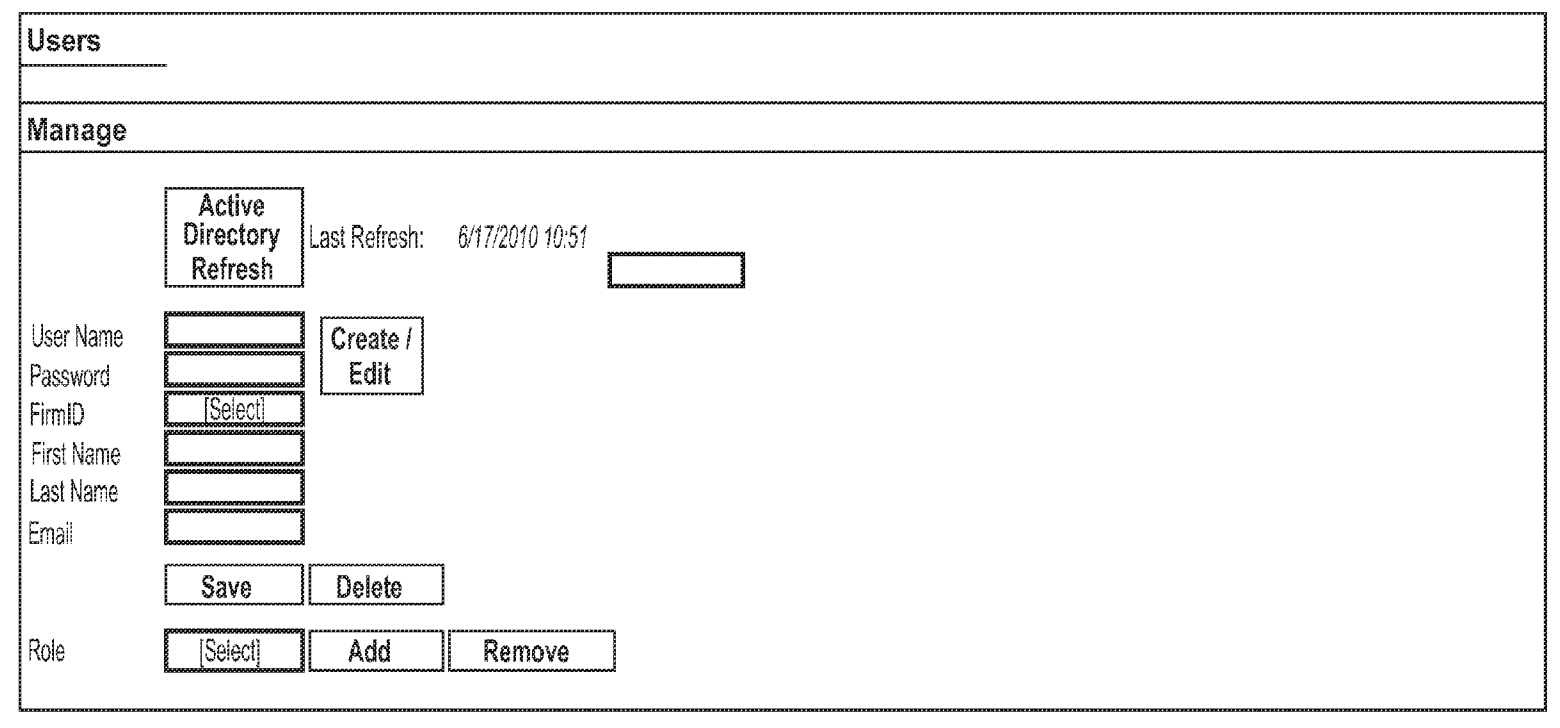

An exemplary Users Screen is depicted in FIG. 36.

Broker-Firm Assignment

Brokers may be assigned to Firms after each are created. This functionality may have the following traits.

Firm ID—the ID of the Firm.

Broker Code—the Broker Code of the Target Broker being assigned to the Firm.

Status—the status of the relationship (active/inactive).

The general functionality may be as follows:

A Broker-Firm assignment may be created only if the Target Broker status is Active.

The status of a new Broker-Firm assignment may default to Active.

The status may be updated (Active/Inactive) for an existing Broker-Firm assignment.

A Broker-Firm relationship may not be deleted; however the status can be set to Inactive.

If a Broker-Firm assignment already exists, a new entry may not be saved.

An error message may be displayed saying there is a duplicate entry.

An exemplary Broker-Firm Assignment Screen is depicted in FIG. 37.

Target Allocations

A Target Allocations screen may house the target percentages for broker volume, historical broker volume, and the host trading system's volume. It may be maintained by the following specifications:

Target Allocations

Each Target Allocation may be a whole number between 0 and 100.

The total of a firm's broker target allocations may equal 100.

For each client firm there may be only one set of Target Broker Allocations directly reflected in the interface. The allocations may be universal for users, regardless of user or permissions.

A target allocation may only be assigned to a non-host trading system broker

Allocations may not be configurable by time range; they will be current until changed.

if target allocations for a client do not add to 100, the distribution set may not be applied.

Brokers

Any target broker may show up in a firm's list of brokers and be able to receive a target allocation value if the following three conditions are met:

1. The broker status=active.
2. The broker is assigned to the firm.
3. The broker-firm assignment=active.

When a new broker is made available for a target allocation to be specified, the target allocation may be defaulted to 0.

If the broker status or the broker-firm assignment becomes inactive, the following may occur:

The text for the broker and target allocation should be highlighted (either asterisked or colored in red text).

A message should be displayed on the screen indicating that either the broker was made inactive or the broker-firm relationship was made inactive.

The target allocation value becomes 0 and read-only.

The target allocation total should deduct the inactive broker's portion.

Historical trade volume should be displayed by broker

Aggregate volumes for the predetermined periods should be shown by broker.

The % of the total volume (by non-host trading system brokers) for the period should be shown by broker.

Trade volume will be displayed by broker by the following predetermined time periods:

Current Trade Date (with intraday updates)
Week-to-Date
Month-to-Date
Qtr-to-Date
Year-to-Date Table 16 below displays exemplary effects of the broker status, the broker-firm status, and the broker-firm assignment on the target distribution and whether the target broker displays for the client.

TABLE 16

| Broker Status | Broker-Firm Assigned | Broker-Firm Status | Target Allocation | Target Broker Displays |
|---|---|---|---|---|
| Active | Yes | Active | Write | Yes |
| Active | Yes | Inactive | Read | Yes |
| Active | No | Inactive | Read | No |
| Inactive | No | Inactive | Read | No |
| Inactive | Yes | Active | Read | Yes |
| Active | No | Active | Read | No |

Trading system

Historical volume should be displayed for host trading system by the following predetermined time periods.

Current Trade Date (with intraday updates).
Week-to-Date.
Month-to-Date.
Qtr-to-Date.
Year-to-Date.
No % A numbers are needed.

An exemplary Target Allocations Screen is depicted in FIG. 38.

Trade Volume

Users may be able to access historical volume data for their firm through a screen in the application.

Historical volume data by date and broker should be viewable.

Data should be exportable from the interface in XLS and/or CSV.

Standard search criteria should be provided for the client:
Date Range.
Broker (optional).

Period Grouping: Daily, Weekly, Monthly, Quarterly, Yearly, YTD.

An exemplary Trade Volume Screen is depicted in FIG. 39.

Permissions

The ability to configure roles and permissions may be created. This provides flexibility in configuring what application components and functionality each role has.

Roles

A role is a grouping of entitlements that can be assigned to users.

- A "Roles" screen that adds and removes roles for each user may be made available. A role assignment is a mapping of a user to a particular role.
- Roles may be created with customizable batches of entitlements (access to different functionality).
- A role may be deleted if the role is not assigned to any users.
- The number of users assigned to the role and the number of entitlements assigned to the role may be displayed
- A user may be assigned to multiple roles. The user's rights may be the sum of the rights of the individual roles.
- A role may have the following properties:
- ID—The internal database id.
- Created—The time the record was created.
- Modified—The time the record was last modified.
- Name—The name of the role being defined.
- Database Tables
- roles—the table that holds the roles.
- CREATE TABLE roles
- (id integer NOT NULL,
- created timestamp without time zone,
- modified timestamp without time zone,
- name character varying(50) NOT NULL)
- entitlements_roles—the table that maps entitlements to roles
- CREATE TABLE entitlements_roles
- (id integer NOT NULL,
- created timestamp without time zone,
- modified timestamp without time zone,
- entitlement_id integer,
- role_id integer NOT NULL)

An exemplary Roles Screen is depicted in FIG. 40.

Entitlements

An Entitlement is a basic building block of permissions. There may be multiple entitlements within a TABS webpage and an entitlement may refer to functionality across multiple pages. Entitlements may be configured in the application and may be added to Roles.

- Base entitlements may allow a user to view a page/screen.
- Other entitlements may need to be programmed into the application.
- When a user accesses a page, the system may check whether the user has the entitlement(s) to view the page and possibly use functionality within it.
- If there is functionality within the page that can only be accessed by certain users, logic may be built into the application to check whether the user has those entitlements.
- To allow a role to edit a page, both the view and the edit entitlements may be assigned to the role.
- If a user belongs to multiple roles, the entitlements may be compounded to grant more entitlements to the user than each separate role would. The specific user's entitlements may be an OR of the entitlements in each role. The user may not have entitlements stripped by being assigned to multiple roles.
- The number of roles the entitlement belongs to may be displayed.
- An entitlement may not be deleted/added/edited
- An Entitlement may have the following fields:
- ID—The internal database id.
- Created—The time the record was created.
- Modified—The time the record was last modified.
- Name—The name of the entitlement being defined.
- Database Tables
- entitlements—Each page may require a particular entitlement for a user to access it.
- CREATE TABLE entitlements
- (id integer NOT NULL,
- created timestamp without time zone,
- modified timestamp without time zone,
- entitlement character varying(50))
- pages—a table that tracks system pages in the database
- CREATE TABLE pages
- (id integer NOT NULL,
- created timestamp without time zone,
- modified timestamp without time zone,
- page character varying(50),
- description character varying
- entitlements_pages—the table that maps entitlements to a specific page. Entries in this table may specify which entitlement is required for any page logic to be accessed. This table preferably only controls base level entitlements—which users have access to the basic version of the page.
- CREATE TABLE entitlements_pages
- (id integer NOT NULL,
- created timestamp without time zone,
- modified timestamp without time zone,
- page_id integer,
- entitlement_id integer NOT NULL)

Below in Table 17 is a list of the required entitlements in the application.

TABLE 17

| Entitlement | Screen | Functionality |
| --- | --- | --- |
| Login | Login | Login to application |
| EditTargetAllocation | Target Allocations | Edit Target Allocations |
| TargetAllocation | Target Allocations | View Target Allocations |
| TradeVolume | Trade Volume | View Trade Volume |
| QueryTradeVolume | Trade Volume | Query Trade Volume |
| TargetBrokers | Target Brokers | View Target Brokers |
| Users | Users | View Users |
| Firms | Firms | View Firms |
| Broker-Firm | Broker-Firm Assignment | View Broker-Firm Assignment |
| SetupUsersFirmsBrokers | Target Brokers, Users, Firms, Broker-Firm Assignment | Edit Target Brokers, Users, Firms, and Broker-Firm Assignment screens |
| Roles | Roles | View Roles |
| Access | Access | View Access |
| Configure Security | Roles, Access | Edit Roles, Access |
| AllFirms | NA | Gives the user access to see data for all firms |
| SingleFirm | NA | Restricts the user to data associated to one firm |

Access

Preferably a user of the system is provided with the ability to:

1. specify IP addresses/networks that user groups can login from; and
2. reject logins for these user groups from IP addresses outside the specified IP addresses/networks.

The IP Address/subnet may be of the format X.X.X.X/Y, where X is the first through fourth octet and Y is the subnet mask length.

The values of the octets may be verified to be within a certain range (0-256).

All 4 IP Address fields and the Subnet Mask Length may be filled out before an entry is created.

A User Group may be assigned to an IP Address/subnet entry.

Multiple User Groups may be assigned to an IP Address/subnet entry.

Multiple IP Address/subnet entries may be assigned to a user group.

An IP Address/subnet entry can be deleted.

The associated links to User Groups may be deleted.

For any user that belongs to multiple user groups, if one of the user groups is restricted to an IP Address/subnet, then the user may be restricted to only that IP Address/subnet. The most restrictive access may be applied.

An exemplary Access interface display is depicted in FIG. 41.

Navigation

User preferably are able to navigate between pages easily. If a user does not have the proper Role (with entitlements) to view the page, the page may not be visible to be clicked on in the navigation panel.

Interface Overview (Exemplary Embodiments)

Table 18 provides a summary of the exemplary screens in one or more exemplary embodiments of the application and their intended purposes.

TABLE 18

| Purpose | Screen | Description |
| --- | --- | --- |
| Security Portal | Login Page | Login page where credentials are entered and access is requested |
| Client Inputting | Target Allocations | Allows target allocations to be input for brokers and real-time volume to be viewed by predetermined time periods. |
| Searching/Exporting Data | Trade Volume | A page where users can query for and export historical Service Bureau volume by broker and date. |
| Setup/Configuration | Target Brokers | Allows a target broker to be created and properties to be specified. |
| | Users | Allows a user to be created, by user login and basic identifying information, for access to the system. In addition allows the role to be assigned |
| | Firms | Allows a firm to be created in the system. |
| | Broker-Firm Assignment | Allows a broker to be assigned to a firm and the status of the assignment to be specified. |
| | Roles | Allows roles to be configured with entitlements. |
| | Access | Allows IP Address/subnet entries to be made which serve as access points for certain users to login to the application through. |

Inputs/Outputs

One or more exemplary embodiments of a Service Bureau application may interface with other trading systems via import and export of two comma delimited data files in CSV format.

The application may support the ability for an external scheduler to invoke the import or export function on demand.

Import—Trade Data Import File Specification

A Trade Data Import file provides the Service Bureau application with Service Bureau trade volume data.

The Import process may over-write existing database volume records for a Date/Firm/Broker combination found in the file. See Table 19.

TABLE 19

| Data | Type |
| --- | --- |
| Date | Timestamp |
| Broker ID | String |
| Firm ID | String |
| Volume | Integer |

Import—User Login Import File Specification

The User Login Import file provides the application with trading system GUI login credentials that would allow it to be launched off the GUI and external users with GUI logins to be authenticated without the user having to login separately.

The Import process may overwrite existing GUI login records for a user if a record for the user is found in the file. The Firm ID may be recognized by both the Trading System and TABS. See Table 20.

TABLE 20

| Data | Type | Encrypted |
| --- | --- | --- |
| Date | Timestamp | |
| Username | String | |
| Password | String | √ |
| First Name | String | |
| Last Name | String | |
| Firm ID | String | |
| Email | String | |

Export—Firm/Target Broker Allocation File Specification

The Firm/Target Broker Allocation File may be exported to the trading system to manage the Firm's trading based on the configured allocations. The Firm ID and Broker ID will both be recognized by the trading system and TABS. See Table 21.

TABLE 21

| Data | Type |
| --- | --- |
| Date | Time stamp |
| Broker ID | String |
| Firm ID | String |
| Target Allocation | Integer |

Figure 42:
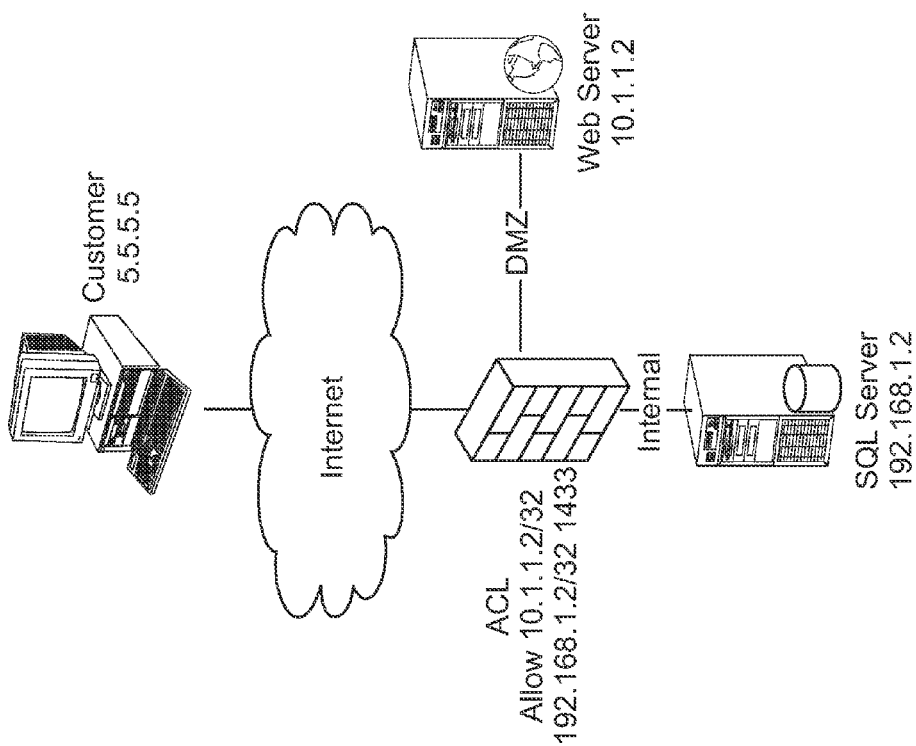
FIG. 42 depicts exemplary network architecture for one or more exemplary embodiments.

FIG. 42 depicts exemplary network architecture for one or more exemplary embodiments.

Exemplary TABS Software Architecture

Definitions, Acronyms, and Abbreviations (see Table 22).

TABLE 22

| ACCR. | Description |
| --- | --- |
| DB | Database |
| FS | File system |
| MVC | Model-View-Controller |
| ORM | Object-Relational Mapping |
| TABS | Trade Allocation to Brokers System |

For the exemplary embodiments described below, the following architecture constraints may be taken into consideration for TABS architecture design:

Linux used as operating system.

Apache used as Webserver.

PostgreSQL used as DB server.

PHP used as implementation language.

Logical View

This section describes certain architecturally significant parts of the design model, such as its decomposition into subsystems and packages.

Overview

TABS may be built using Yii (http://www.yiiframework.com/) which is a high-performance component-based PHP framework.

From a file system point of view, the application may consist of 3 main folders:

"Yii framework" folder containing the framework distribution.

"Public" folder which may be the only folder accessible from Web. The only PHP code located in the folder may be index.php file acting as a front controller calling Yii to handle page requests. Apart from the front controller, the folder may contain CSS, JavaScript and image files used by TABS.

"Protected" folder containing TABS-specific configurations, models, view, controllers, components, libraries, and extensions used by the application.

Architecturally Significant Design Packages

This section covers significant parts of code located in a "Protected" folder.

Configuration Folder

Configuration files are packaged in "config" folder. These may include:

main.php—contains general settings like application name, homepage path, login path, DB connection credentials, logs configuration, etc.

ldap.php—contains LDAP-specific configuration like access credentials.

console.php—contains configuration specific to executing code from console (e.g. by Cron)

test.php—configuration specific to Unit tests running

Components

Classes located in a "components" folder may be either service classes or classes extending default Yii behavior to meet TABS-specific requirements. The more significant classes are:

AccessManager—provides authorization-specific methods.

Controller—base class for all controllers being used throughout the application. For instance, the class performs authorization checks prior to executing a controller.

LdapUser—a service class for LDAP authentication and data synchronization.

UserIdentity—extends Yii's CUserIdentity class and contains TABS-specific authentication method code that checks if the provided data can identify the user.

Controllers

Controller classes may reside in a "controllers" folder. All these may extend components.Controller class for consistency.

Extensions

An "extensions" folder may contain code extending built-in Yii components—e.g., "mbmenu" extension (http://www.yiiframework.com/extension/mbmenu/) provides a drop-down JavaScript menu.

Models

A "models" folder may contain both ORM PHP classes (e.g. Firm, Broker) and models for forms (e.g., LoginForm).

Libraries

External libraries may be placed in a "vendors" folder:

Addendum—provides support for annotations mechanism.

Zend—parts of Zend Framework will be used, e.g. code operating with LDAP.

Views

A "views" folder may contain HTML code with PHP injections forming visual output. The views may be grouped by controller, a view for each action is in a separate file—e.g., views/user/create.php is a view for "create" action of UserController.

Filters

Filters in this context are classes implementing Yii's CFilter class and may be used to perform specific actions before/after a controller is processed.

AccessFilter—checks if current user can access specific action of a controller.

HttpAuthFilter—is used for automatic log in using Basic HTTP Auth.

Deployment View

An exemplary minimal configuration includes a web server and a DB server, which may run on separate computers.

Hardware requirements:
  Server running TABS application:
    256 MB RAM or greater
    about 50 MB HDD space
    CPU: 32 bit
  Server running PostgreSQL server: at least 100 Mb space available for DB Software Requirements:
  OS: Linux
    CentOS, RedHat or other server-oriented distribution
    Cron
  Apache web server:
    version 1.3 or 2.2
    with mod_ssl module
    with mod_php5 module
    with mod_rewrite module
  PHP:
    latest PHP 5.2.x branch version
    with php_pdo extension
    with php_pdo_pgsql extension
    with php_ldap extension Deployment Procedure EPAM provides a package including application files, SQL dump and detailed instructions. An exemplary deployment procedure may include copying three folders to web server FS, setting up DB/LDAP connection credentials and importing a SQL dump to Postgres database.

Implementation View

In an exemplary embodiment, the application follows a MVC paradigm and its implementation is provided by Yii. More details can be found here: http://www.yiiframework.com/doc/guide/basics.mvc.

Overview

Figure 43:
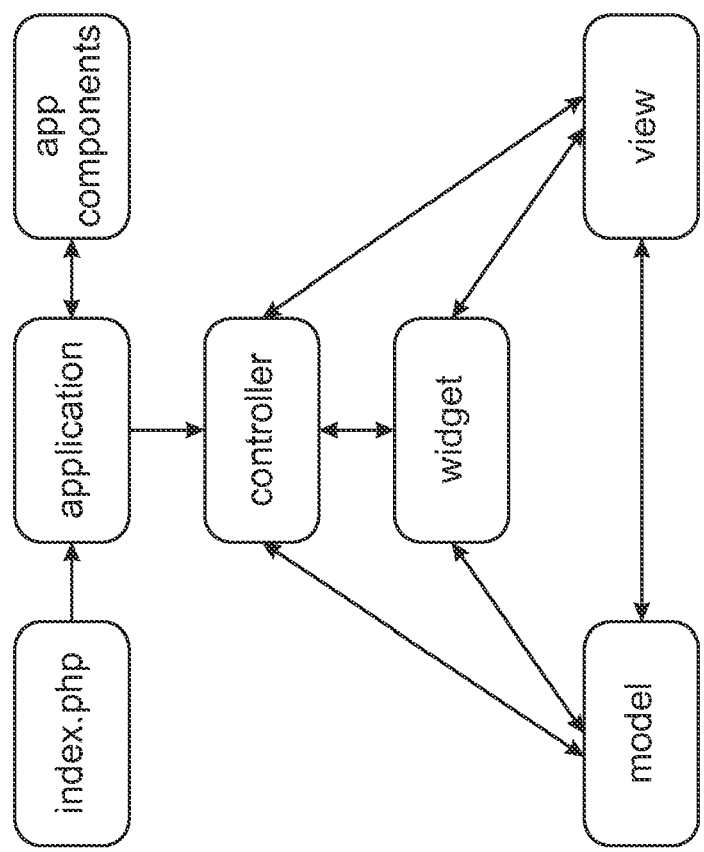
FIG. 43 depicts structure of an exemplary Yii application.

Structure of an exemplary Yii application appears as depicted in FIG. 43. Index.php is the Front Controller, which executes Yii code (application) by retrieving a controller which, in turn, operates with views, models and widgets (if any).

Figure 44:
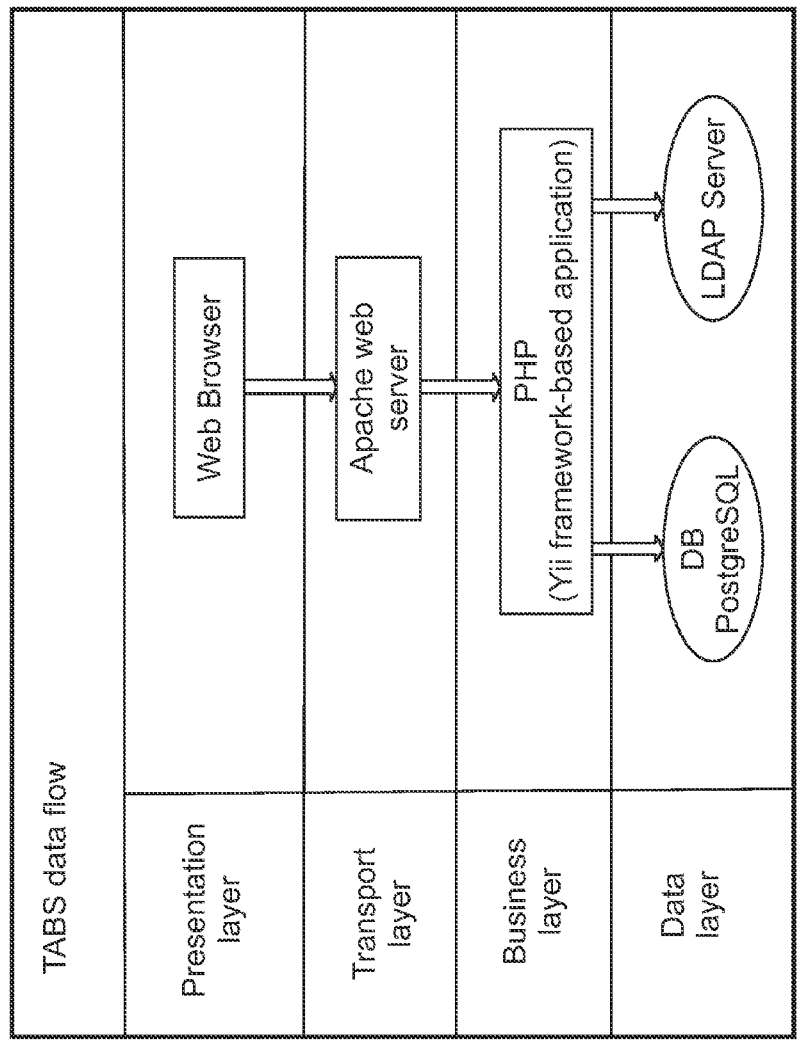
FIG. 44 depicts exemplary TABS data flow.

Layers (See FIG. 44).

An exemplary Presentation tier preferably consists of HTML pages interacting with user input and transferring collected data to the server. All communications between client and server may be based on HTTPS protocol. Business logic processing may be implemented using PHP which may be called by an Apache web server. It interacts with all other application parts.

This is the brain of the system. A Data layer is represented by 2 data storages: database and LDAP server.

Data View

Figure 45:
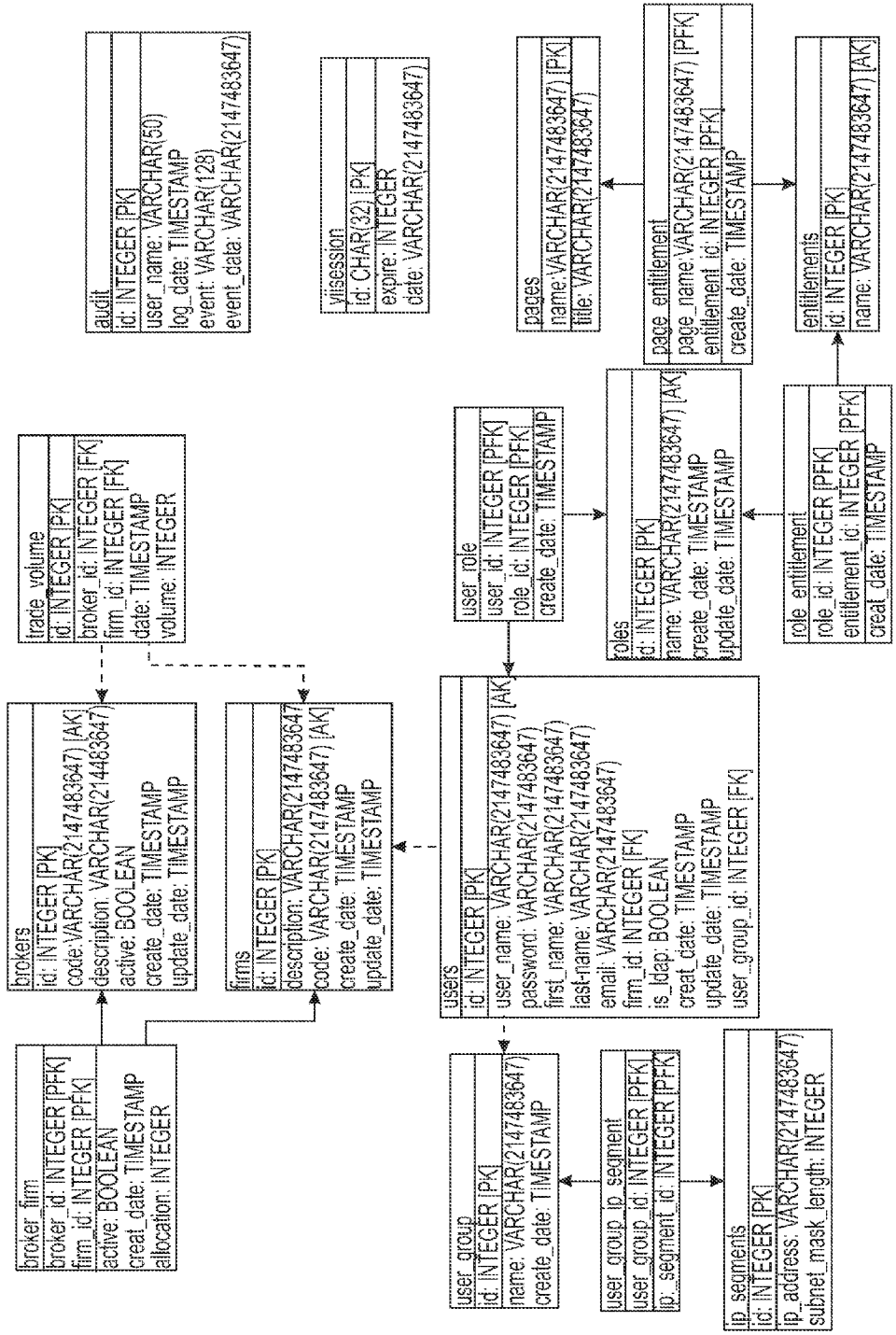
FIG. 45 depicts exemplary database tables and relationships.

FIG. 45 depicts exemplary database tables and relationships.

Exemplary TABS User Guide

1. Introduction

The Trade Allocations for Brokers System (TABS) is a web interface that allows our clients to actively manage the percentages of Service Bureau order flow to valid brokers.

2. Authentication

There are 2 ways a user can log into TABS:

Automatically—if the user is authenticated in the GUI application and accesses TABS from the GUI, the system will try to automatically log him/her in. If authentication from the GUI fails, the user is redirected to a login page, having a respective error message displayed.

Manually, from login page—if the user does not have a GUI account or has failed to automatically log in according to the previous scenario.

3. Authorization 3.1. Roles and entitlements

Authorization in TABS is done in terms of entitlements, which are assigned to roles, which, in turn, are assigned to users.

Entitlements are basic building blocks of the authorization system. They are hard-coded into the application and cannot be managed via UI.

Entitlements are assigned to roles via a Setup/Configuration menu (please refer to section "4.1 Roles" for details). Roles are assigned to users via Setup/Configuration menu as well; this is covered in section "4.4 Users".

NB. There is a special "Login" entitlement, which should be present for all users which able to log in, otherwise they will see a "User is not allowed to log in" error. Two predefined roles "Internal User" and "External User" have this role.

3.2. IP Address-Based Access

A special case of authorization is that related to IP access rules.

If there is a need for some users to be able to access the system only from specific IP range(s), a new user group should be created for them. The user group(s) is (are) assigned to required users on User Edit page. An access rule is created, by specifying IP Address, Subnet mask length (the 2 values will determine allowed range of IP-addresses) and user group(s) for which the access rule should be applied.

If a user does not belong to any user groups, or his user groups do not have any related IP Access rules, he/she is not restricted by IP-addresses and can access TABS from any IP address.

NB. If a user has user groups which in turn have IP Access rules, he'll be able to use TABS only if his IP address is within the IP-addresses range of every rule. So if a user has 3 related Access rules, and one of these cannot be applied to his IP, the user won't be able to access TABS and a "User is not allowed to log in" error will be shown to him during login.

For information on managing users, user groups and access rules, refer to sections "4.4 Users", "4.3 User Groups" and "4.2 Access" respectively.

4. Setup/Configuration menu 4.1. Roles

Users having "Roles" entitlement can see the page in main menu and view the list of roles and related entitlements as well as number of users having the role and its create and modification dates.

Users having "Configure Security" entitlement can create new roles, edit existing ones and delete roles which are not assigned to any user.

4.2. Access

Users having "Access" entitlement can see the page in main menu and view the list of IP access rules.

Users having "Configure Security" entitlement can create new access rules, edit and delete existing ones.

4.3. User Groups

Users having "Access" entitlement can see the page in main menu and view the list of user groups and number of users assigned to every group.

Users having "Configure Security" entitlement can create new user groups, edit existing ones and delete user groups which are not assigned to any user.

4.4. Users

Users having "Users" entitlement can see the page in main menu and view the list of users with information about associated firm, roles and user groups. Internal users (having AliFirms entitlement) can see information about all users, while External users (having SingleFirm entitlement) are restricted only to information related to an associated firm.

Users having SetupUsersFirmsBrokers entitlement can create new users, edit existing ones and delete users which do not have any role assigned.

It's only possible to create a non-LDAP user manually. During user creation, unique user name, password and associated firm must be entered, all other fields are optional.

Password must fit the following criteria:

Length >=8 characters

Must contain 3 of the following 4 groups:

uppercase alpha lowercase alpha numbers symbols

When a non-LDAP user is being edited, and its password is not to be changed, it should be left blank. Otherwise, the new password has to comply with the criteria specified above.

A User create/edit page has an "Active Directory Refresh" button, which allows importation of users from LDAP into a TABS database. During the import, information related to existing TABS user (basing on username) is overwritten by LDAP data.

For LDAP users, it's only possible to edit information about the associated firm and assign roles/user groups.

4.5. Brokers

Users having "TargetBrokers" entitlement can see the page in main menu and view the list of brokers.

Users having "SetupUsersFirmsBrokers" entitlement can create new brokers, update descriptions for the existing ones and toggle their statuses (active/inactive). When a broker is set to inactive, all related target allocations are set to 0.

When a broker is created, its ID should be recognizable by both the Trading System and TABS, because it's being used for trade volume import and target allocations export (see the "6 Import/Export console tasks" section below).

4.6. Firms

Users having "Firms" entitlement can see the page in main menu. If a user has "AllFirms" entitlement, the list of all firms is shown to him, otherwise the user will see only an associated firm.

Users having "SetupUsersFirmsBrokers" entitlement can create new firms and update descriptions for the existing ones.

When a firm is created, its ID should be recognizable by both the Trading System and TABS, because it's being used for all imports and exports (see the "6 Import/Export console tasks" section below).

4.7. Broker-Firm Assignment

Users having "Broker-Firm" entitlement can see the page in main menu. If a user has "AllFirms" entitlement, the list of all assignments is shown to him/her; otherwise the user will see only assignments related to an associated firm.

Users having "SetupUsersFirmsBrokers" entitlement can create new (unique broker-firm assignments) and toggle their statuses (active/inactive). When a broker-firm assignment is set to inactive, the related target allocation value is set to 0.

The application contains a broker with ID=TRADING SYSTEM which cannot be assigned to any of the firms. The broker is used to import non-service bureau data to be shown on target allocations page (see the section "5 Target allocations page" below for details).

4.8. Audit Log

An Audit log page is available for users having "Configure Security" entitlement, the page allows to viewing information about what user has performed the following actions and when:

Logged In
Add Broker
Add Firm
Add User
Add User
Add Role
Add User Group
Add Access
Edit Broker
Edit Firm
Edit User
Edit Role
Edit User Group
Edit Access
Delete User
Delete Role
Delete User Group
Delete Access
Edit Broker-Firm Assignment
Broker-Firm Target Allocation Update
Add Broker-Firm Assignment
Inactive Broker
Inactive Broker-Firm Assignment
Assign User To Firm
Search Trade Volume

5. Target allocations page

A Target allocations page is intended for viewing and managing target broker volume percentage per firm.

The page is visible and accessible for users having TargetAllocation entitlement; only users with EditTargetAllocation entitlement can manage the allocations. Internal users should have "AllFirms" entitlement, he/she has a possibility to view/edit data for any company. External users should have a "SingleFirm" entitlement which will restrict them only to data for associated firm.

The page consists of 2 parts:
  The first one shows a current target allocation percentage for brokers assigned to the firm, as well as information about Current Trade Day, Week-to-Date, Month-to-Date, Qtr-to-Date and Year-to-Date volume and percentage based on the actual volume.

Allocations are manageable only for active brokers and broker-firm relations (inactive brokers are shown in red).

Figure 6:
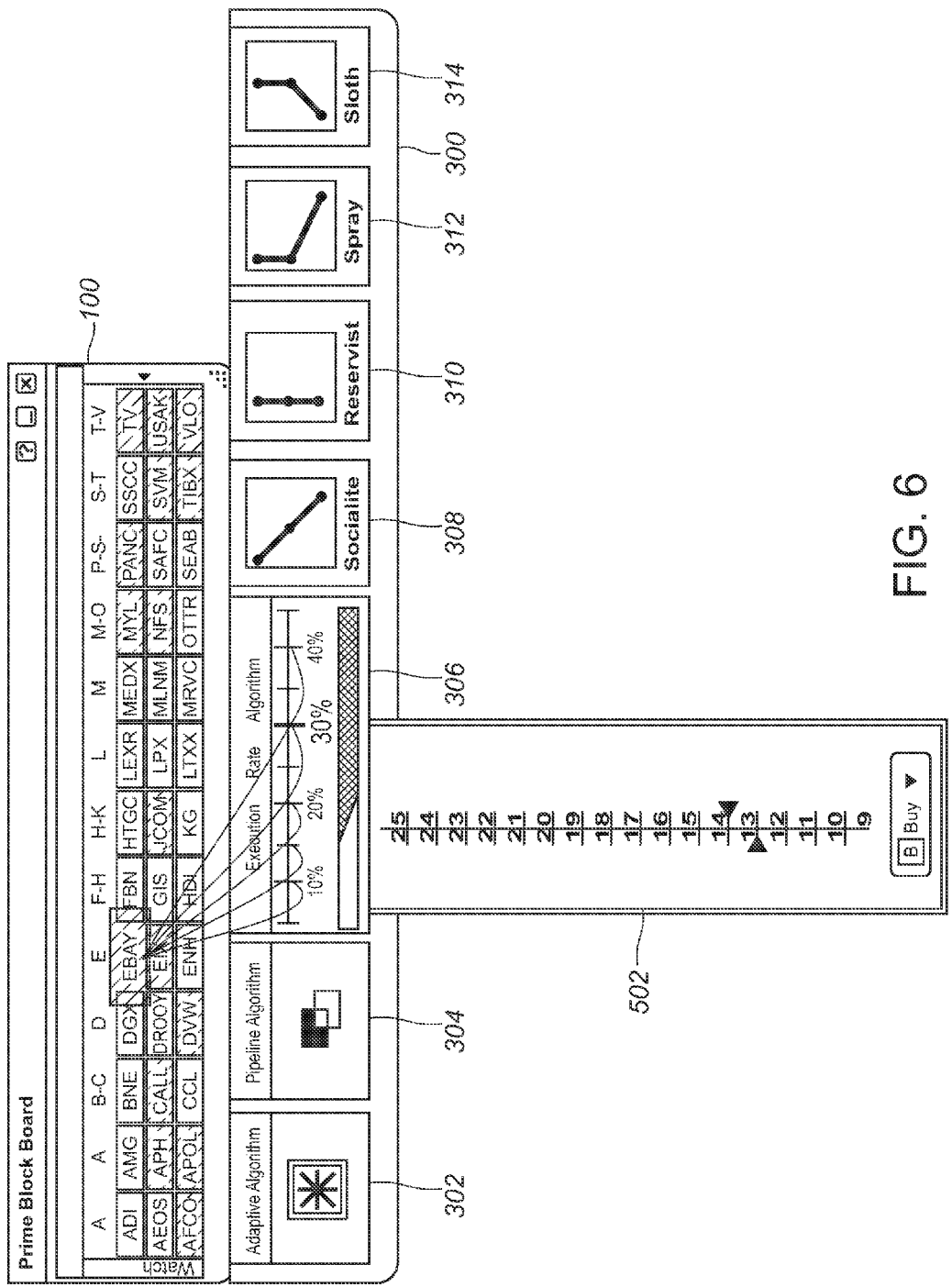
FIG. 6 shows an operation of dropping a symbol on a desired participation rate to launch the fishbone for a participation rate algorithm.

In order to successfully update target allocations, they must total 100%, else the system won't allow to update the FIG. 6.

Import/Export console tasks

Importing and exporting of data is done by executing protected/data/impex.php from console.

Console tasks provide basic help on their usage:
$ php {path_to_impex.php}
Yii command runner (based on Yii v1.1.3)
Usage: php {path_to_impex.php}<command-name>[parameters . . . ]
The following commands are available:
export
import
To see individual command help, use the following:
  {path_to_impex.php} help <command-name>
Import/export processes write quite verbose logs (protected/logs/tabs_impex* files) which can be checked for errors occurred during the processes.

Importing is done within a single transaction, so if a file to be imported contains invalid record, the other records won't be applied as well

6.1. Importing Users

Users can be created/updated from a CSV file having the following columns (without a header row):
Date—will be used as user's create_date
Username—login, required
Password—encoded password, required
Salt—salt used in password encoding logic, required
First Name
Last Name
Firm ID—ID of firm to be associated with the user, required
Email The import will be aborted if any of the required columns are empty/invalid.

To import users from file/home/tabs/users.csv:
$ php {path_to_impex.php} import users/home/tabs/users.csv

6.2. Importing Trade Volume

Records indicating trade volume processed by a broker for specific firm on specific day can be created/updated from a CSV file having the following columns (without a header row):
Date—date to which the trade volume applies
Broker ID
Firm ID
Volume The import will be aborted if any of the columns is empty/invalid and/or if there's no specific broker-firm assignment (unless data for HOST TRADING SYSTEM broker is imported).

To import trade volume from file/home/tabs/trade-volume.csv:
$ php {path_to_impex.php} import trade-volume/home/tabs/trade-volume.csv

6.3. Exporting Target Allocations

To export target allocations into file/home/tabs/allocations.csv:
$ php {path_to_impex.php} export allocations/home/tabs/allocations.csv The CSV file will contain data about allocations for all films for active brokers and active broker-firm assignments. The following columns will be present in the file:
Date—the date broker-firm assignment was created
Broker ID
Firm ID
Allocation, %

Tactical Algorithms:

In addition to the "Strategic" algorithms described above, the subject system also offers the user a selection of tactical algorithms. Direct access to these tactical algorithms are provided for the user who wants to use algorithms to automate order entry but does not want to turn over the selection and management of tactical algorithms to a strategic algorithm. As previously defined, a tactical algorithm is an algorithm concerned with placing and canceling orders according to a single set of pre-programmed instructions. Providing a selection of tactical algorithms allows the user to automate his trading while maintaining a higher degree of control over the placement and cancellation of orders. It is important to note that when the user employs tactical algorithms, he must both select the algorithms and set the parameters for the algorithm's operation. In addition, he must manually change these operating parameters to maintain his strategy as market conditions change. The subject system enables the user to set and alter these parameters through simple drag and drop motions, as will be described in more detail below.

However, while the use of these tactical algorithms does require greater involvement from the user, a trader can use these tactical algorithms to automate a complex trading strategy by initiating a plurality of tactical algorithms for the same stock. Here is an example: a user initially activates a single algorithm to buy 800,000 shares of EBAY up $30.55. However, let's say that after he initiated that algorithm, he realized that the stock was more volatile than he originally thought. Instead of canceling that first buy algorithm, he decides to layer a few more tactical algorithms to create a more nuanced strategy to match the volatility of the market. So in addition to the original buy algorithm, he adds another algorithm to buy aggressively when the price drops below $30.48, another to sell passively when the price moves up to $31.57, and another to sell aggressively if the price moves above $31.60.

Once the user has initiated all four of these tactical algorithms for EBAY, the subject system's "unified" setting ensures that the user can manage all these individual tactical algorithms as part of unified strategy. This unified setting treats every order from a user-initiated tactical algorithm associated with a given symbol as part of a larger aggregate order. For example, as soon as two or more algorithms are associated with a single symbol, the subject system automatically coordinates the activity of each of those algorithms against a single, aggregate position goal. That aggregate position goal is always established when the trader launches the first algorithm for that particular symbol—in this example the order to buy 800,000 shares of EBAY. This coordination is preferably enabled by keeping track of all open orders, the position goal, the achieved position, and limit the size of new orders to be placed on the market in such a way that the sum of the achieved position plus open orders never exceeds the initial, aggregate position goal.

In cases where both buy algorithms and sell algorithms are being used, the algorithms that are working in the opposite direction to the stated position goal are limited to place orders that will never in aggregate exceed the original aggregate position goal. For example, if the user's initial aggregate position goal is to buy 800,000 shares of EBAY, and the achieved position is 500,000 shares of EBAY, with 100,000 shares pending (potentially leading to a position of 600,000) at the time the additional three algorithms are initiated; then an algorithm seeking to place a new buy order will be limited to a maximum of 200,000 shares, and an algorithm seeking to sell will be limited to 500,000 shares.

Therefore as a result of this "unified" setting, the subject system automatically coordinates the order activity driven by all user-initiated tactical algorithms for a particular symbol such that those algorithms will only place orders that both follow their pre-programmed logic and keep the trader's position inline with that original position goal. This feature enables the trader to employ a plurality of algorithms with specialized tactics in a coherent strategy without having to micromanage his order position. In addition, the subject system provides the trader with multiple high-level visual cues (described in detail below) that allow him to track his progress relative to his aggregate position goal. As a result, the subject system is able simultaneously to pull the trader away from order level micro-management while enhancing his capabilities for higher level strategy management.

Deciding on an Algorithm

As previously noted, a user has the ability to choose between strategic and tactical algorithms when using the subject system to automate his trading strategy. Because the direct selection of tactical algorithms requires more thought and management by the trader, the subject system includes two tools to help the users who decide to select manually tactical algorithms rather than relying on the strategic algorithms to mange this selection for them. These two tools are the Execution Rate Scale and the Behavior Matrix, both of which are designed to help the trader understand how each tactical algorithm will interact with the market.

The Execution Rate Scale is a tool that provides users with a comparative measure of the expected rate of execution for each of the different tactical algorithms. The purpose of this scale is to help users understand how aggressive each tactical algorithm is on a relative basis by presenting a scale that indicates where each of the available tactical algorithms falls on a scale of aggressiveness—both relative to the other tactical algorithms and as compared to a percentage scale that represents expected rates of execution. The scale appears on the subject system's Dashboard whenever a user drags a symbol from a Watch List over one of the tactical algorithms, with the selected tactical algorithm highlighted in yellow to ensure the user knows which algorithm he is considering at the time.

For the purpose of this application, "Watch List" is defined as a representation 100 of a collection of symbols 102 the user is interested in monitoring (FIG. 1). The Watch List may also be connected to the user's Order Management System (OMS) in such a way that the symbol-representing cells within the Watch List are linked to information about the user's order(s) in that symbol. The example shown in FIG. 1 is a Watch List used in Pipeline Trading System's Graphic User Interface (GUI), but any other version of a "Watch List" as known or could be imagined by those skilled in the art can also be used in conjunction with the subject system.

When the user rolls over the symbol 102 in the Watch List that he wants to trade, that symbol is shown as an enlarged symbol 202, so as to make it clear to the user which symbol he is selecting (FIG. 2). Then if the user clicks on that enlarged symbol, the "Dashboard" 300 appears at the base of the Watch List (FIG. 3). For the purposes of this application, the "Dashboard" is the element of the subject system's user interface where the available algorithms are presented to the user. In the preferred embodiment the dashboard only appears when a user clicks on an enlarged symbol in the Watch List so as to limit the amount of terminal real estate occupied by the subject system's user interface. However in an alternate embodiment the dashboard is a permanent aspect of the subject system's user interface, visible whenever the subject system's user interface is open on a user's desktop or terminal.

In the example shown in FIG. 3, the dashboard includes the following elements. The icons for algorithms include those for strategic algorithms (an adaptive algorithm 302, a pipeline algorithm 304, and an execution rate algorithm 306) and for tactical algorithms (a socialite algorithm 308, a reservist algorithm 310, a spray algorithm 312, and a sloth algorithm 314). The various algorithms are explained elsewhere in the present disclosure.

Figure 4:
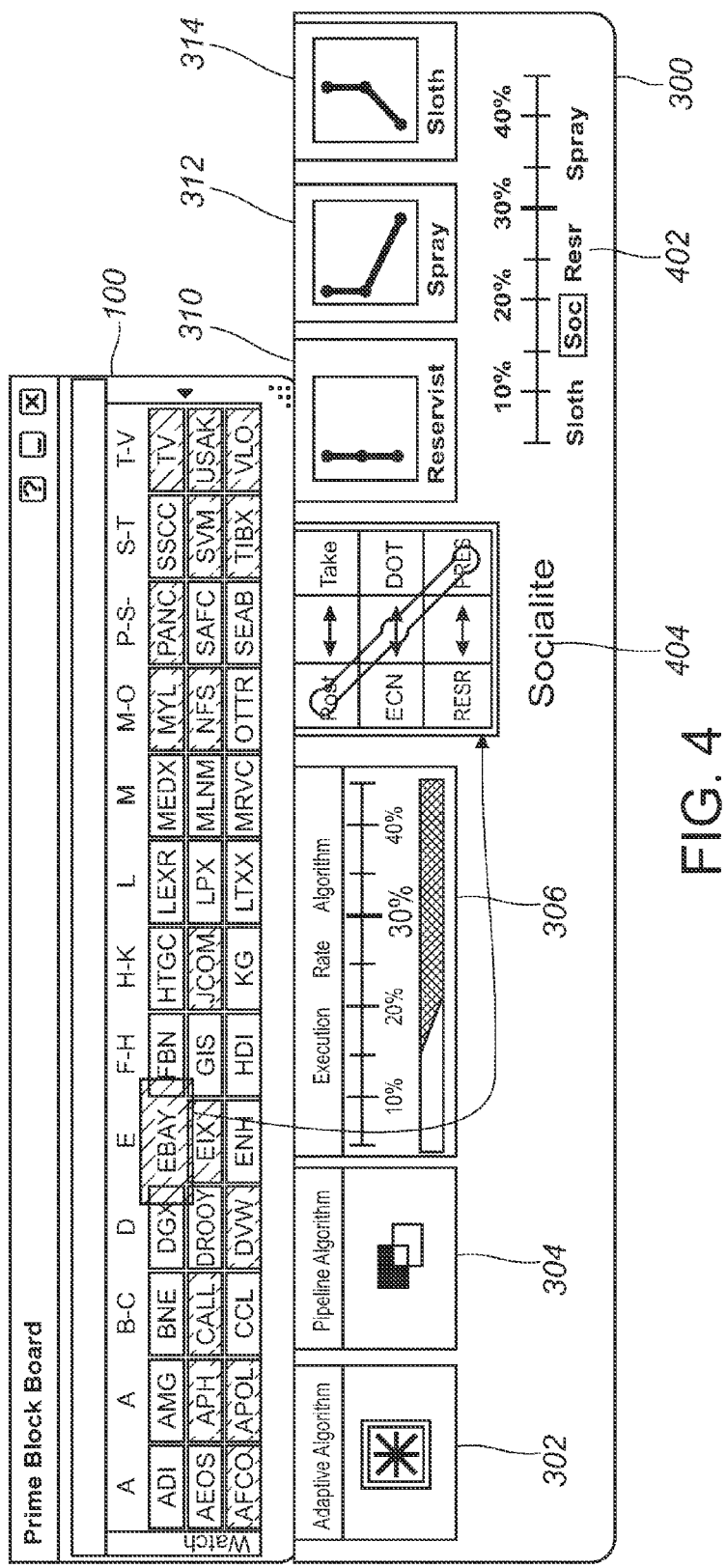
FIG. 4 shows the dashboard of FIG. 3 with a behavior matrix and a display of execution rates for a selected tactical algorithm.

FIG. 4 shows what it looks like when a user has dragged a symbol (here EBAY) over one of four available tactical algorithms, the "Socialite" tactical algorithm, revealing both the Execution Rate Scale 402 (described above) and the Behavior Matrix 404. It is important to note that while FIG. 4 depicts an embodiment with four tactical algorithms (the "Socialite," "the Reservist", "the Spray," and "the Sloth,") limitless other embodiments with any number and variety of tactical algorithms, both proprietary to the subject system and provided by third party providers, can easily be imagined by those skilled in the art and should be understood as encompassed within the present invention.

The second tool for helping users select a tactical algorithm is The Behavior Matrix 404. The Behavior Matrix is an element of the subject system's user interface that gives the user information about the characteristic behaviors of the tactical algorithms available via the subject system. Examples of these behavior-defining characteristics might be whether the algorithm "posts" orders or "takes" orders, places "reserve" orders or maintains a visible "presence," or if it places orders on "ECNs" or on "DOT." Other examples could be whether an algorithm "kicks" or "punches," "ducks" or "blocks," "stands" or "runs."

It is important to note the terms used above are only examples of characteristic descriptors, and that any set terms can be used to describe behavior-defining factors, assuming they have meaning for the traders and serve to describe how the algorithms will behave in different market conditions. The purpose of the matrix, regardless of the terms used, is to give the trader information about how each algorithm will operate without requiring him to understand the specific, detailed logic that drives the algorithm's operation.

To access the Behavior Matrix, the user can either roll the mouse or drag a symbol from the watch list over one of the icons that represent a tactical algorithm (Again, see FIG. 4). When the user takes this action, that tactical algorithm's Behavior Matrix will appear behind the algorithm's icon. For example, in FIG. 4, the user has dragged the EBAY symbol over the "Socialite" icon, one of subject system's the tactical algorithms. By looking at which cells the "dots" of the Socialite's icon occupy in the matrix, the user knows which combination of factors characterize the behavior of that algorithm. Looking at the Socialite example, the user knows that that algorithm will "post" orders rather than "take" orders, place orders on both "ECNs" and "DOT" depending on the available liquidity, and that it will maintain a visible "presence" on the market rather than just placing "reserve" orders. If a dot falls inside a middle cell with a double arrow, (as it does in this example), it means the algorithm will display both of the characteristics within that row depending on the circumstances. It is important to note that the Behavior Matrix solves one of the most pressing problems in algorithmic trading: the need for traders to understand the general behaviors of a particular algorithm without having to know or understand the algorithm's underlying logic.

Drag and Drop Algorithm Selection and Initiation

Once a user has decided which algorithm he wants to use and is ready to initiate an algorithm, all he has to do is drag the symbol he wants to trade from his Watch List and drop it onto the icon on the dashboard that represents the algorithm he wants to use. To ensure the user is aware which algorithm he is selecting, the background of the selected algorithm is highlighted. If the user's Watch List is connected to his OMS in the preferred embodiment, this action of dropping the symbol on an algorithm representing icon automatically launches the algorithm. As a result, the subject system allows traders to initiate complex trading strategies with a single motion; here a "drag and drop," but other single motion techniques as can be imagined by one skilled in the art also apply. With a simple drag and drop on one of the three strategic algorithms, the user of the subject system is able to set in motion a complete trading strategy which automatically selects, initiates and then adjusts the algorithm or set of algorithms required to execute the user's order based on the user's order inputs, real-time analysis of market conditions, and reinforcement feedback on the algorithms' impact on the market.

Alternatively, if the user's OMS is not connected to his Watch List, or if it is connected but the user has deactivated the auto-launch feature; dragging the symbol over any of the algorithm-representing icons (except the Pipeline Algorithm) will reveal a "Fishbone" 502 at the base of the algorithm's icon or its behavior matrix 404 (FIG. 5). For the purposes of this application, the Fishbone is a dynamic, vertical price scale that represents the current bids and offers for the selected symbol. The trader can then drop the symbol at his limit on the price scale; thereby setting the algorithm's limit and initiating the algorithm. In the instances where the user's OMS is connected to the subject system but the user has disabled the auto-launch feature, the Fishbone allows the user to set a limit for the algorithm that is more passive than the limit contained in his OMS. However, as a price-protection precaution, the user cannot use the Fishbone to set a limit for an algorithm that is more aggressive than the limit contained in his OMS. To make the limit more aggressive, the user must make that change within the OMS itself.

Figure 7:
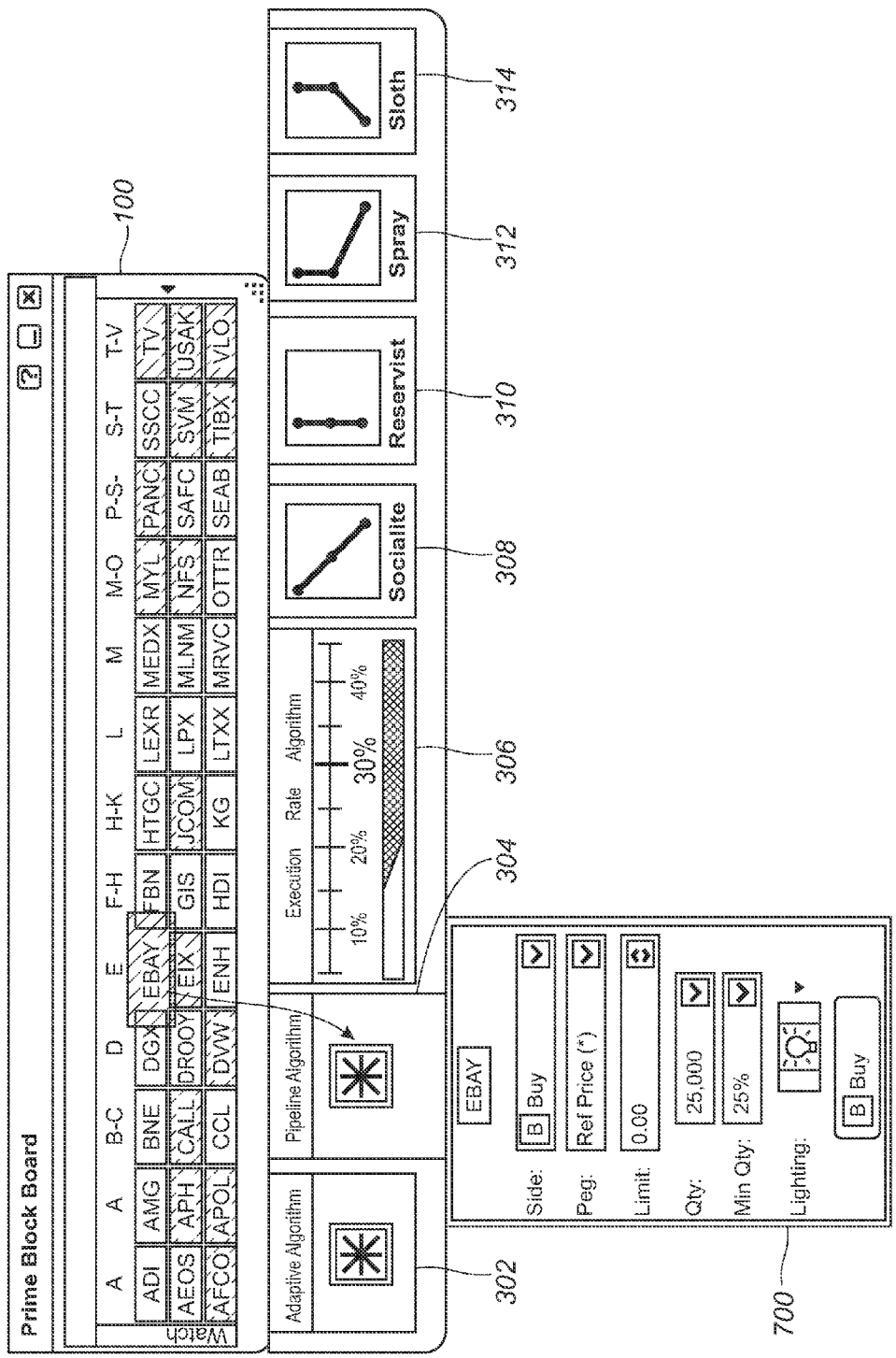
FIG. 7 shows an operation of dropping a symbol on the pipeline algorithm to launch an order-entry box.

While dragging and dropping a symbol anywhere on the icons that represent the Adaptive algorithm or any of the tactical algorithms will either initiate the algorithm (if watch list is connected to the OMS) or launch the fishbone (if the OMS is not connected to the watch list or if the OMS is connected but auto-launch feature is disabled); to initiate the Execution Rate algorithm or to launch its Fishbone, the user must drag and drop the symbol onto the specific execution rate that he wants to set for the algorithm (FIG. 6). In addition, dragging and dropping a symbol onto the Pipeline Algorithm in the instances where the watch list is not connected to the OMS or it is but the auto-launch feature is disabled will not launch a Fishbone. Instead it will launch an order entry box 700 where the user can set all of the parameters that relate to the timing, frequency and circumstances (as detailed above) for when a block order should be placed or canceled on Pipeline (FIG. 7).

In the cases where the watch list if not connected to the user's OMS or it is connected but the user has disabled the auto-launch feature, the user can initiate an algorithm by hitting the buy (or sell) button inside the Fishbone or the order entry box for the algorithm he has selected.

Figure 8:
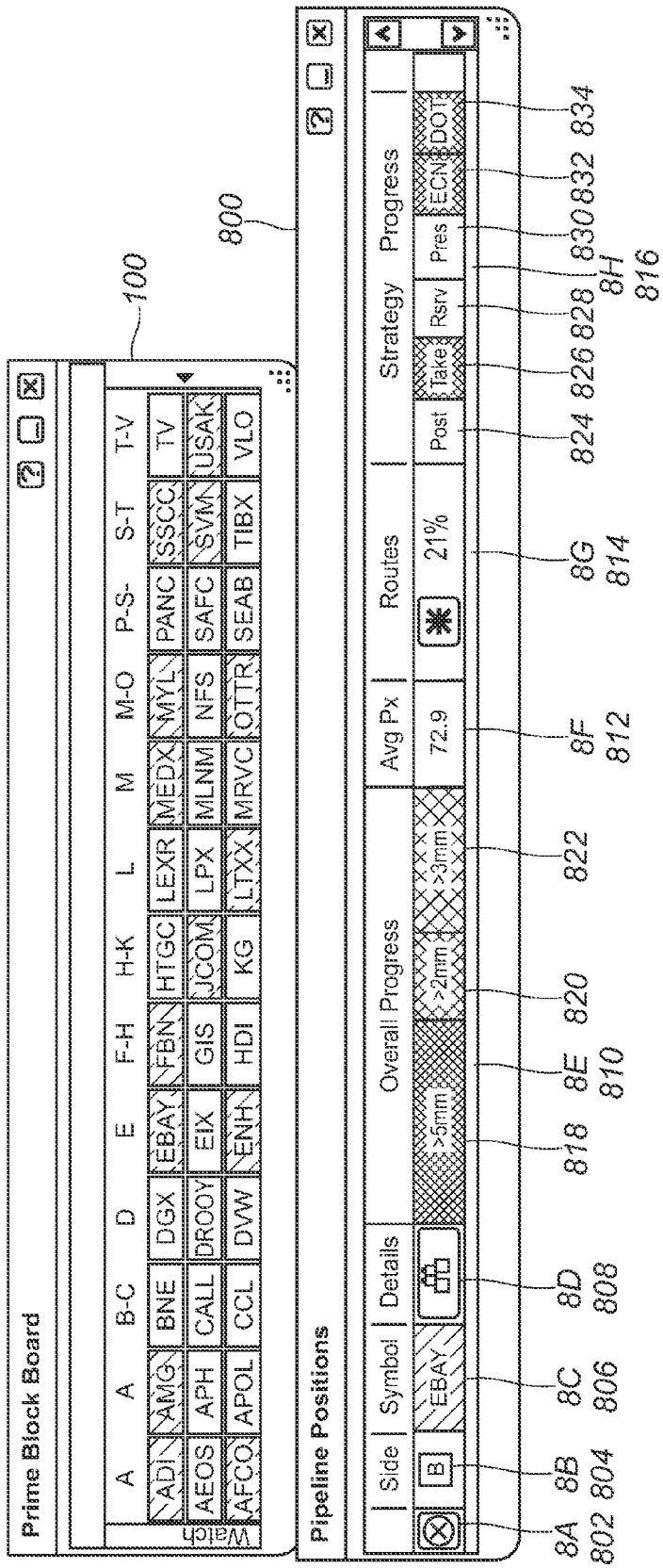
FIG. 8 shows a positions window.

The Provision of Real-Time Feedback Regarding Algorithm Operation and Order Execution Once an algorithm is initiated, either automatically or by the user, a "Positions" window 800 replaces the dashboard and fishbone at the base of the Watch List (FIG. 8). For the purpose of this application, the "Positions" window is defined as the aspect of the subject system that provides users with real-time feedback regarding the algorithms' order activity, the execution tactics being used by the active algorithms, and the effectiveness/impact of these tactics.

In the first column within the Positions window, users are given a button 802 that they can use to cancel all of the orders that have been placed by the algorithms working on that order. Looking at the remaining columns in the Positions window from left to right, the user can see: the side of the order being worked by the algorithm (804), the symbol being worked by the algorithm (806), a list of trade details for executed orders (808—revealed when the user clicks on the binocular icon, more detail below), how much of the order has been completed vs. how much of the order remains unfilled (810), the average price across all executed orders in that symbol (812), the algorithm or set of algorithms being used to work a particular symbol along with its average execution rate(814), and feedback regarding the tactics in use and whether or not these tactics are successful or need updating.(816).

This Positions window is unique in the world of algorithmic trading products in that it providers users with the "Details," "Overall Progress," "Routes", and "Strategy Progress" columns to give the user information about which algorithms are working a particular symbol, the shares those algorithms have filled, the tactics being used by the active algorithm or algorithms, the impact of these tactics on the market, and the effectiveness of these active algorithms; rather than expecting users to trust what an algorithm is doing without giving them any specific information about what it is actually doing. In addition, the Position window also provides the user with quick and easy access to a range of functionality for managing active algorithms.

In the column labeled "Overall Progress," the subject system uses dynamic bars in different colors to provide a real-time representation of how much of the user's order has been completed and how much of the order remains unfilled. In FIG. 8, in the overall progress monitor 810, the blue bar 818 represents the portion of the order that has already been filled by the algorithm, the orange bar 820 represents the portion of the order that is active, but has yet to be filled, and the red bar 822 represents the portion of the order that is unfilled and inactive. While blue, orange and red coloring is used in this example, any other colors or patterns could be used for the same effect.

In addition, each of the colored bars 818, 820, 822 contains an inequality that gives an approximation of the number of shares represented by that bar. As shown, there are a ">5 mm" on the blue bar, ">2 mm" on the orange bar, and ">3 mm" on the red bar; meaning that on the EBAY order represented in this line of the Positions window in FIG. 8, more than five million shares have been filled, more than two million are unfilled and active and more than three million shares are unfilled and inactive.

In addition to seeing the approximate values for shares filled, active unfilled and inactive unfilled on a particular order; the ricer can also use the Overall Progress column 810 to see the exact number of shares and the percentage of the total order represented by each of these three categories. When the user scrolls over and pauses on any area of the Overall Progress column 810, an information box 900 appears (FIG. 9) with the following information: the exact number of shares that the algorithm has filled versus the total number of shares in the order, the exact number of shares that are active, unfilled versus the total number of shares in the order, the exact number of shares that are inactive, unfilled versus the total number of shares in the order, the percentage for each of these categories, the average price across all of the filled shares and whether or not there is a "Market Participation Warning" 902.

A Market Participation warning 902 is an indication that the subject system uses to let the trader know that the number of unfilled shares on the order is greater than the subject system's projected remaining volume in the market for that symbol for the remainder of the trading day. To calculate whether or not it needs to issue the warning, the subject system calculates the number of shares it expects would be executed over a time period extending from the current time to the close of the market. To this end, it multiplies the expected execution rate as previously defined herein, by the historical average volume traded during the time period in days past, taking the average over the last 60 trading days. The Market Participation Warning is issued if the number of unfilled shares is less than the number of shares it expects to execute. In addition to inserting the Market Participation Warning at the base of the information box, the red bar that represents the unfilled, inactive portion of the order in the Overall Progress column also flashes red where there is a Market Participation Warning.

Taken together, the elements contained within the Overall Progress column offer the user a fast yet detailed perspective on the status of his order. However, if the user wants even more detailed information about his executed orders, he can click on the icon located in the "Details" column of the Positions window 808. Clicking on this icon launches a "Trade Details" information box 1000 (FIG. 10). The purpose of this information box is to give the user specific information on each order executed by the algorithm. For each executed order, the Trade Details information box gives the user the "Strategy" that executed the order (in FIG. 10 this is the Adaptive algorithm), the time the order was executed, the number of shares in the order, the average price of the order, and the name of the specific tactical algorithm that executed the order.

Figure 9:
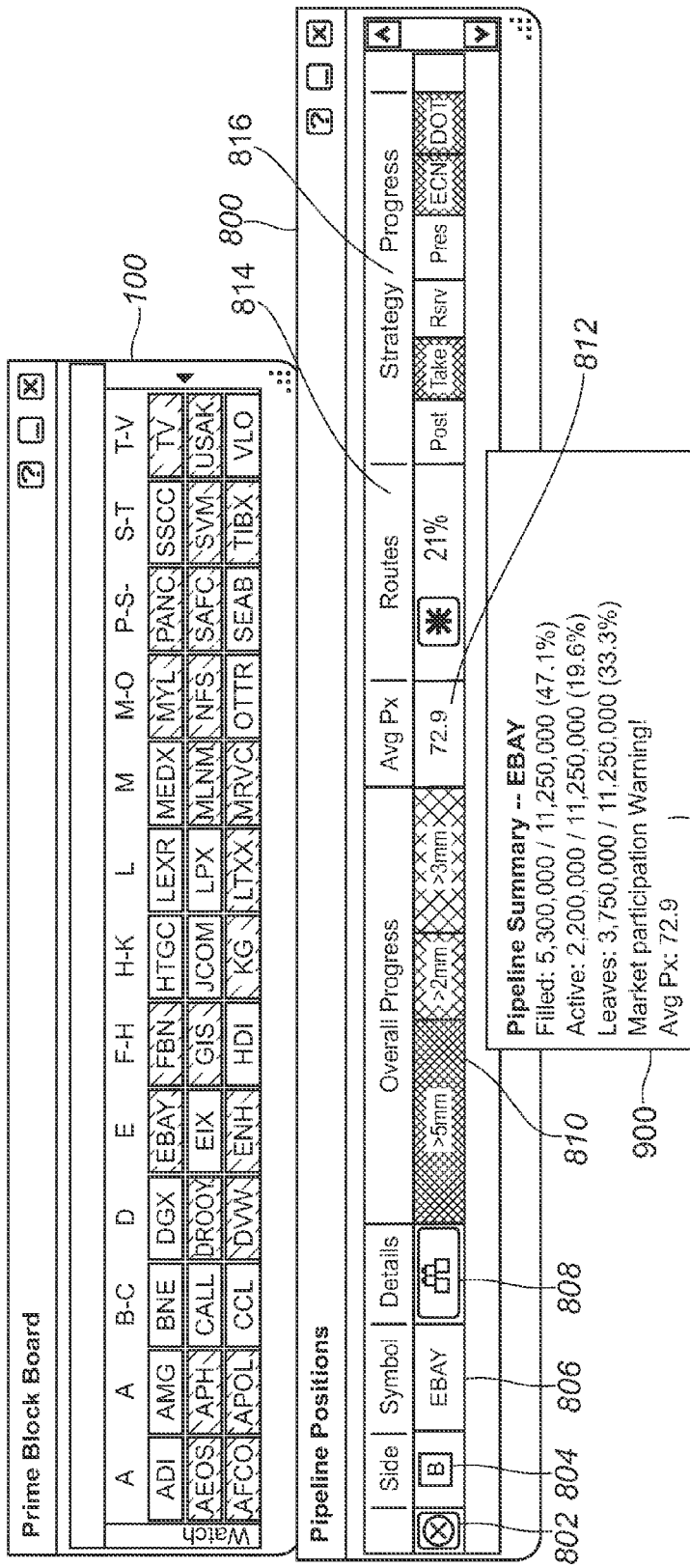
FIG. 9 shows the positions window with an overall-progress information box.

In some instances, i.e. when a user has initiated a tactical algorithm, the "Strategy" information and the "Algorithm" information will be the same since as a "strategy" a tactical algorithm only follows one set of behaviors. However in the instances when the user initiates a strategic algorithm, the strategy and algorithm information will be different. For example, if the user initiates the Adaptive algorithm, the Strategy column will reflect that it is the Adaptive algorithm at work, while the "Algorithm" column will reflect which of the specific tactical algorithms the Adaptive algorithm used to complete that segment of the larger order. In the example of FIG. 9, the Adaptive Algorithm used the "Reservist" tactical algorithm to execute the first portion of the order, while it used the "Socialite" tactical algorithm to execute the second and third portions of the order. Providing this level of information regarding a strategic algorithm's logic and execution is a revolutionary development in the world of algorithmic trading products—for the first time, the user is being informed about the specific tactics the algorithm is using to complete the order, not simply expected to trust a "black box."

For even more specific information about the tactics being used by the algorithm, the user can turn to the Behavior Matrix included in the "Strategy Progress" column 816 on the Positions window. While the Behavior Matrix is used in the Dashboard to allow the user to review the characteristic behaviors of the tactical algorithms before they are active, when it is used in the Strategy Progress column, it allows the user to see the characteristic behaviors of the algorithms after they have been initiated. As previously noted, examples of the behavior-defining characteristics that can be used in the matrix are whether the algorithm "posts" orders or "takes" orders, places "reserve" orders or maintains a visible "presence," or if it places orders on "ECNs" or on "DOT."

In the "Strategy Progress" area 816, each of these characteristics is represented by a cell labeled with the name of the characteristic. FIG. 8 shows a Post call 824, a Take call 826, a Reserve call 828, a Pres cell 830, an ECN cell 832, and a DOT cell 834. As a particular tactical algorithm works an order, the cells that define the tactics of that algorithm are highlighted, letting the user know what kinds of tactics the algorithm is using at a given moment in time. If, for example, the user has employed the "Adaptive Algorithm" as described above, and the automated selection function determines that the level of market impact caused by an active algorithm is too high; then the system notifies the user of the algorithm's (or tactic's) failure to meet the order requirements and its pending cancellation by outlining in red the cell(s) in the Behavior Matrix that represent the failing tactic/algorithm. When the subject system cancels that algorithm or that tactic, the same characteristics that were outlined in red are highlighted with red backgrounds. Then once the subject system has selected and initiated a new algorithm or a tactic better suited to the new market conditions/dynamics, the characteristics of that newly initiated algorithm/tactic are highlighted in green.

By using the black background highlights in conjunction with the red and green color signals, the user knows which tactics are being used to complete his order, as well as which tactics are successful or need updating. Plus, the user is given valuable information regarding market color (feedback on how the market is performing in real time) each time he see that the subject system has made a change in tactics/algorithms—he knows there has been a change in the market or a market event significant enough to warrant an entirely new tactic. In addition, the user can enable a feature which uses the strategy progress area to display which tactical algorithm is active, when there is a change in tactics, and the reason for that change. For example the user might see a message stating, "Transition to Sloth due to sensitivity to postings on ECNs."

FIGS. 11A-11H give a series of examples as to what a user might see while the Adaptive algorithm was working his order. FIG. 11A shows a transition to Sloth due to sensitivity to posting on ECNs. FIG. 11B shows Sloth working. FIG. 11C shows a transition to Socialite due to sensitivity to taking on both ECNs and NYSE. FIG. 11D shows Socialite working. FIG. 11E shows a transition to Reservist due to heavy market presence. FIG. 11F shows Reservist working. FIG. 11G shows a transition to SlothSocialite due to excessive fill rate. FIG. 11H shows SlothSocialite working.

In addition to these fairly simplistic measures of effectiveness provided by the red and green signaling mechanism and the pop-up messaging system, the Strategy Progress column can also expand to provide the user with access to a range of more complicated, continuous measures of effectiveness. While the red/green signaling lets the user know if an individual tactic or algorithm is working; these more complex measures of effectiveness serve to provide the user with a real-time assessment of the overall success/failure of the strategy as a whole. For example, the Strategy Progress column could also include a graphical element that displays a particular algorithm's participation rate in the market since initiation. Or, it could include a ratio between the achieved participation rate and the expected participation rate. An even more sophisticated example would be the absolute value of the logarithm of the ratio of achieved participation rate to expected participation rate, which would provide a measure of the relative difference between actual and expected rates—a good indication of how well the strategy is meeting the user's intended goal. In addition, other continuous measures of effectiveness can easily be imagined, including any number of the benchmarks known to those skilled in the art.

However an important point is that the subject system allows traders to employ complex algorithms to automate their trading and gives them insight into how the algorithms work and how well they are performing when active. Other systems fail to anticipate either automatic tactic switching or the provision of market color feedback. In addition, other systems known in the art fail to anticipate providing guidance on the expected rate of execution or expected market impact in order to help a trader decide which algorithm to use given the current state of the market.

Figure 12:
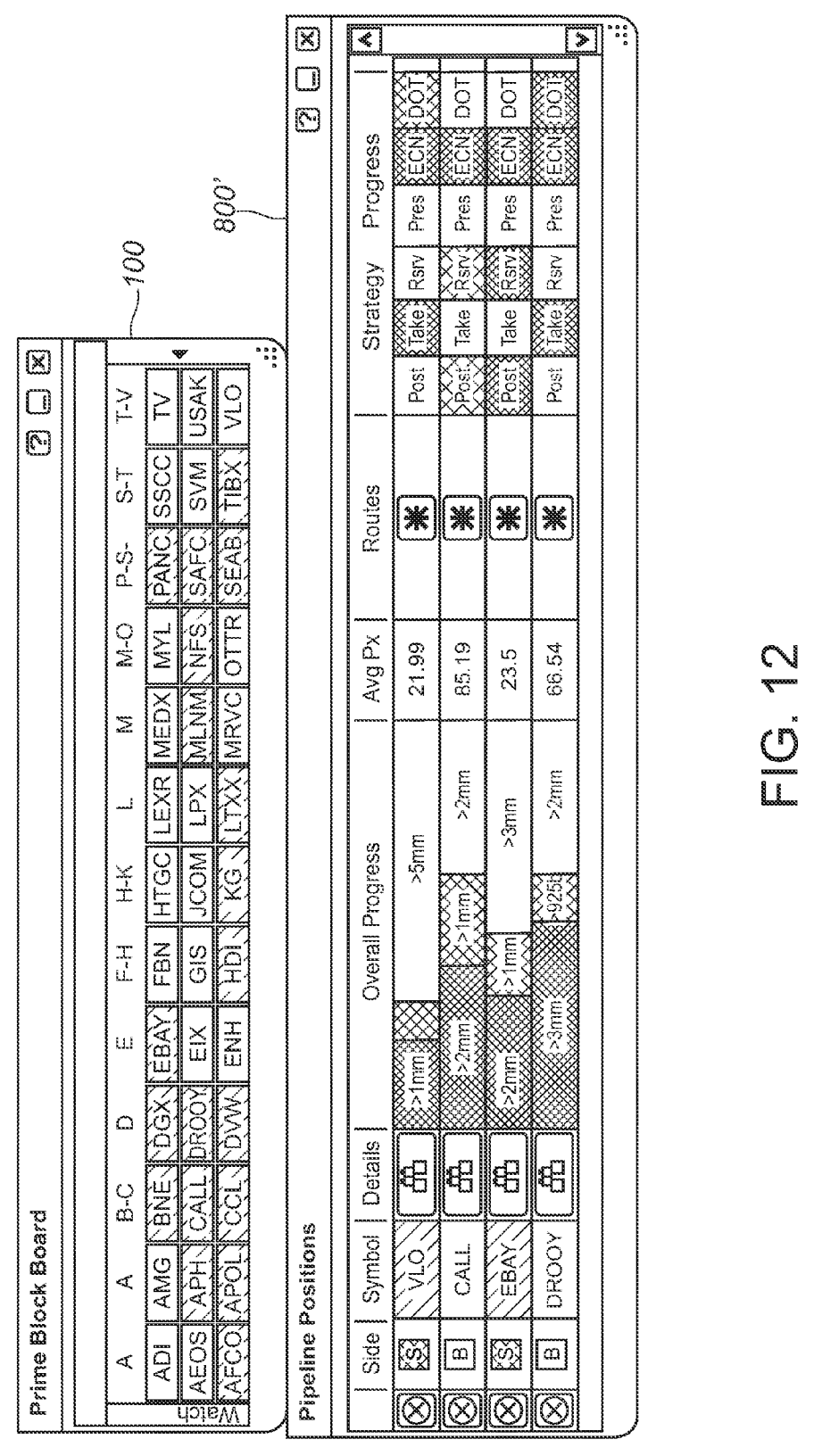

FIG. 12 has been provided to give a specific example of a Positions Window 800' for a user with orders in multiple stocks. FIG. 12 also offers a good example of what the Strategy Progress area looks like when the Adaptive Algorithm is executing orders and making tactical adjustments across many symbols. Looking specifically at FIG. 12, as the Adaptive Algorithm works the user's order in VLO, it has selected aggressive tactical algorithms that are "taking" rather than "posting" orders. In addition these aggressive tactical algorithms had been placing orders on both ECNs and DOT, but the Adaptive Algorithm determined that the tactic of placing orders on DOT was failing, so that tactical was cancelled, as indicated by the red background in the cell labeled DOT.

In the next order, an Adaptive Algorithm working the user's order in CALL initiated a passive tactical algorithm that is "posting" rather than taking orders, and is only maintaining orders as "reserves" rather than maintaining a visible "presence" on the market. This tactical algorithm has also been using both ECNs and DOT when it places orders, but the red outline around the DOT cell indicates that the Adaptive Algorithm is about to adjust tactics and stop placing orders on DOT. In addition, this Strategy Progress window indicates the algorithm responsible for "posting" "reserve" orders in CALL has been recently initiated because the backgrounds of these cells are green.

By simply looking at the Strategy Progress Window, the user has access to a lot of information about both the algorithms working his order and the effectiveness of their tactics. In addition, the user can gain valuable information about market color and changing market dynamics by watching and considering which tactics are failing and which are succeeding in light of market impact tolerance. As a result, users can look to the subject system as both a sophisticated automated trading system and an indicator of changing market dynamics.

Figures 13, 14, 15:
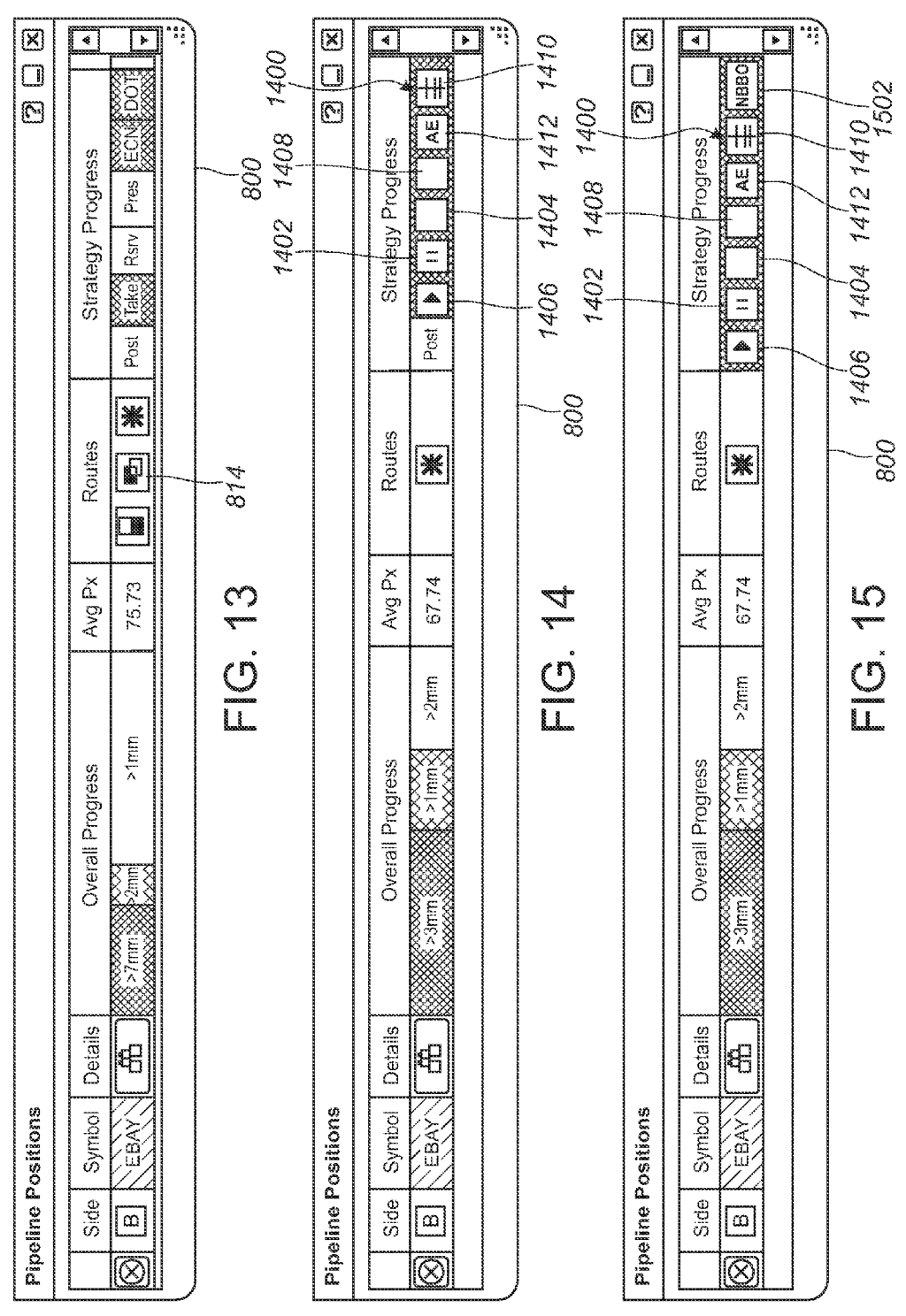

It is also important to note that if the user has initiated multiple algorithms for a specific symbol, all of the active algorithms will be represented by their icons in the "Routes" column 814 as in FIG. 13. To see the specific information offered by the other columns about each algorithm, all the user has to do is click on the icon in the "Routes" column that represents the algorithm he wants to see. Once he has clicked on that icon, the information provided in each of the other columns will reflect the information about that particular algorithm.

Providing User Easy Access to Tools for Algorithm and Order Management.

A final aspect of the Strategy Progress area is the ability to use this section of the Positions Window to manage the algorithm working that particular order. Scrolling over any of the cells in the Strategy Progress area reveals a tool bar for managing the active algorithm(s) related to that order (FIG. 14). This tool bar gives users access to a range of functionality with the click of the mouse: it allows users to pause (1402) any algorithms working the order, cancel (1404) any algorithms working the order, re-start (1406) any algorithms that have been paused, launch (1408) the Trade Details Information Box for that order, open (1410) a Fishbone for the active algorithm, or force an "Auto-entry" (1412). In addition, in the embodiment designed for the Pipeline alternative trading system, the tool bar also contains a button 1502 that allows the user to accept a passive counter offer at the NBBO (FIG. 15).

An auto-entry is when the user forces the active algorithm to enter its next pending order immediately, overriding any order-entry delays required by the algorithm's logic. This feature is useful in the instances when a trader knows there is size that he wants to take and does not wait to wait for the algorithm's logic to determine that the time is right to enter the order. It also ensures that even if a trader employs a passive algorithm, or an algorithm with a low participation rate that he still has the ability to enter orders aggressively if circumstances require him to do so.

Figure 16:
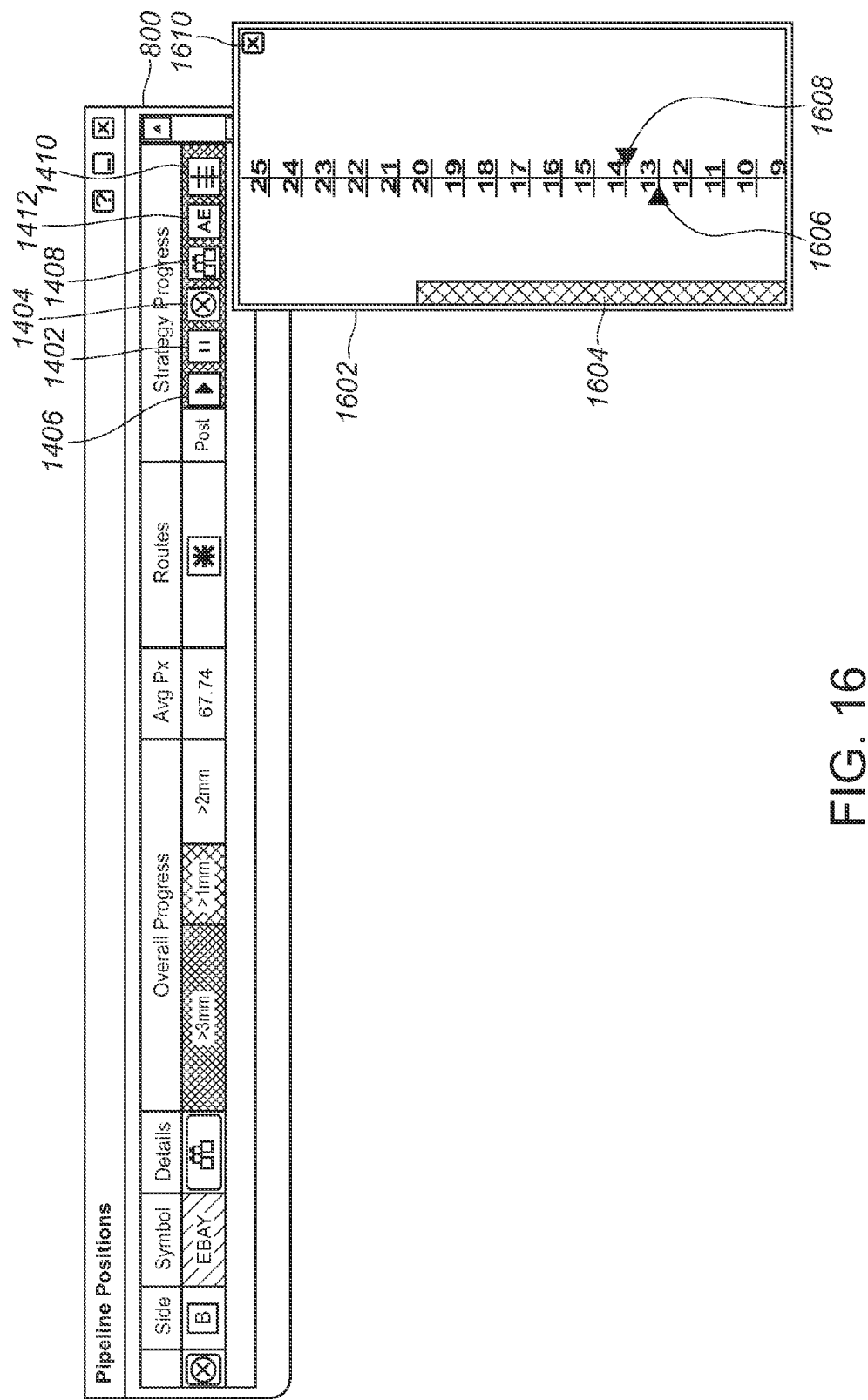
FIG. 16 shows a fishbone for an active algorithm launched from the positions window, in which the fishbone shows a limit price for the active algorithm and the current bid/offer.
Figure 17A:
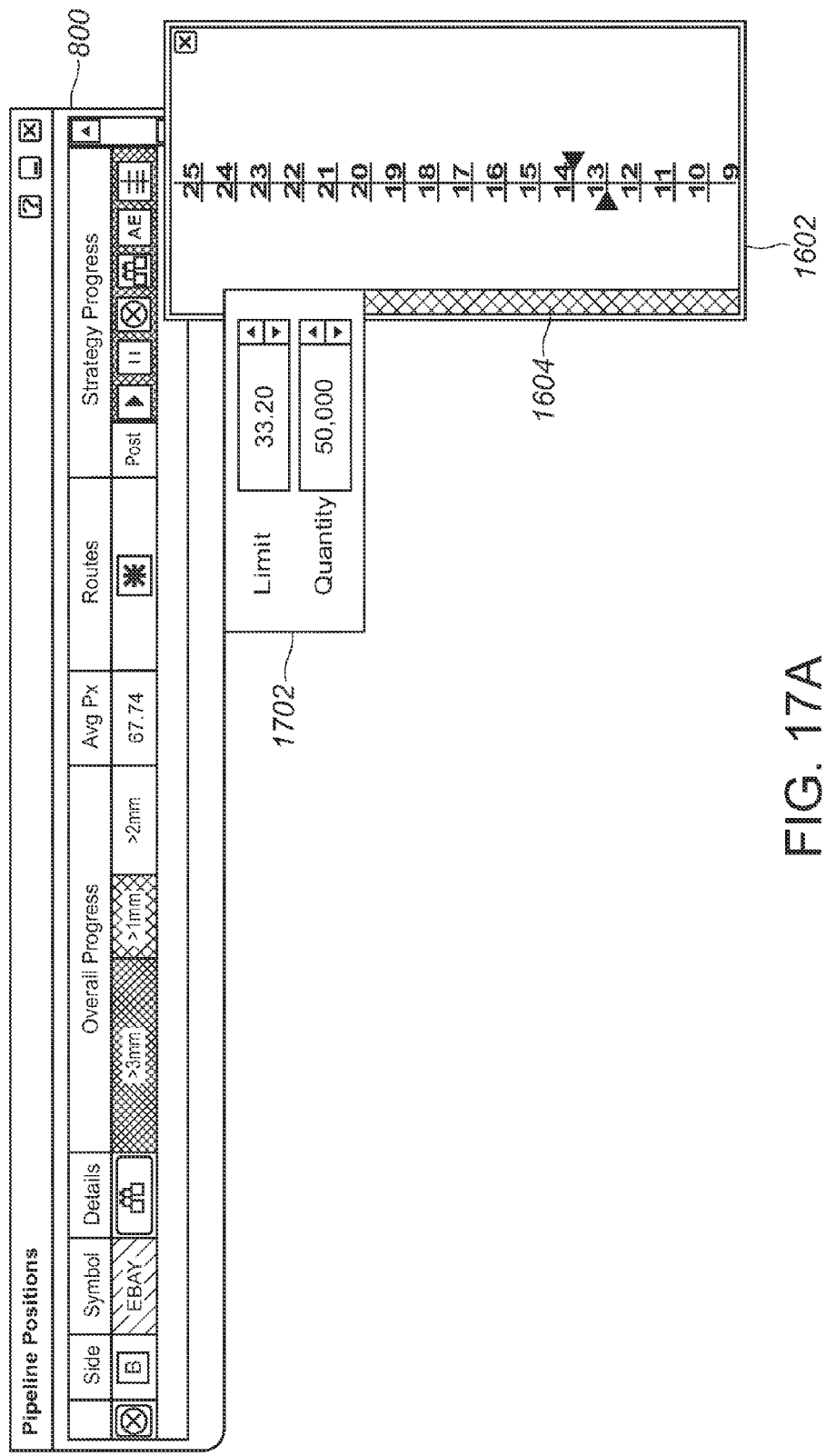
FIGS. 17A and 17B show an order box launched from the active fishbone used to alter the algorithm's operating parameters.
Figure 17B:
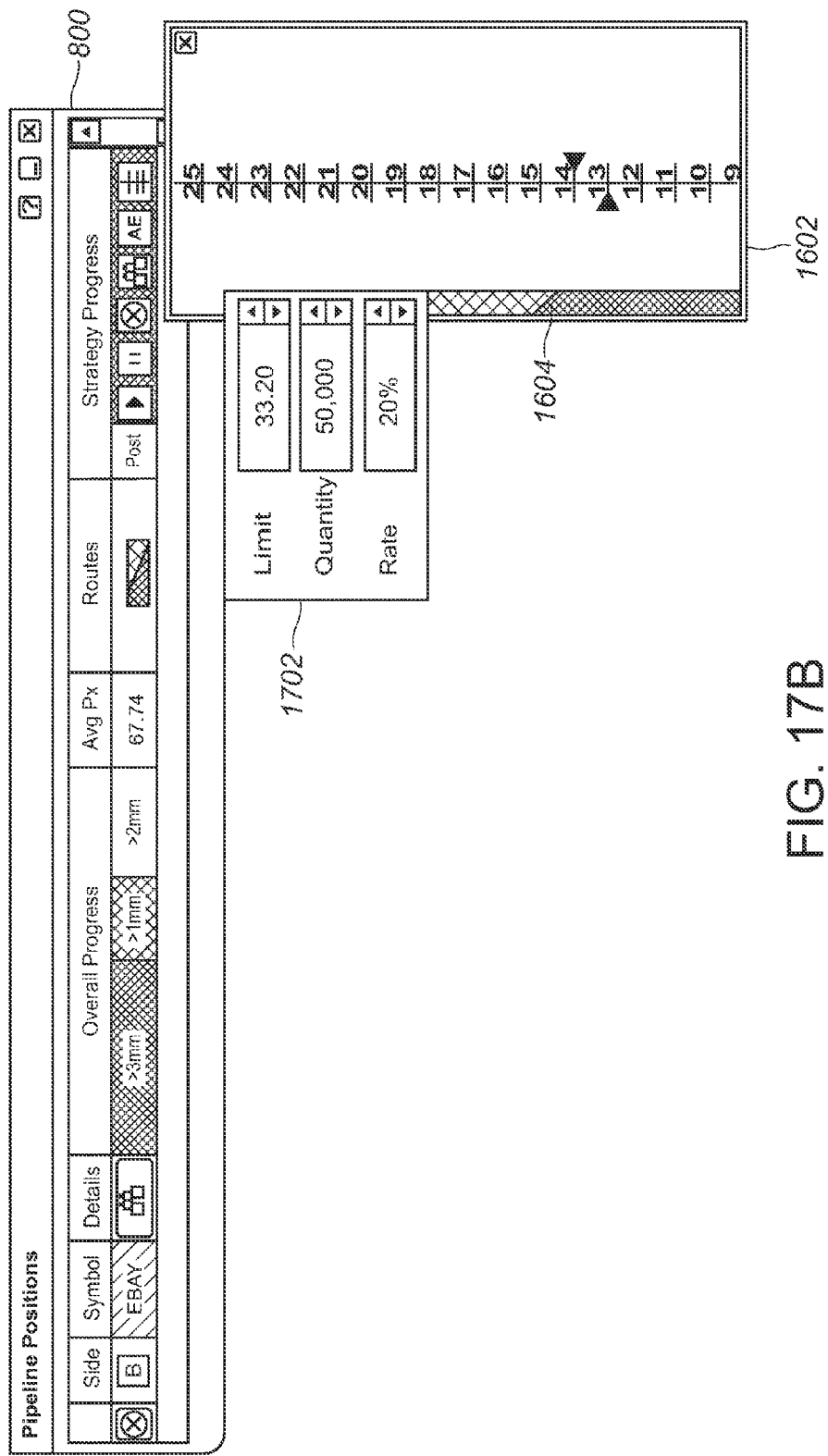

Opening a Fishbone for an active algorithm gives the user the ability to see filled and pending orders, cancel pending orders, or adjust the algorithm's limit price. As soon as a user initiates an algorithm, either through the auto-launch or by manually dropping a symbol onto a Fishbone in the Dashboard, that algorithm is represented visually on the Fishbone with a color-specific vertical column that extends up or down along the vertical price scale (depending if it is buying or selling) to the algorithm's limit price. In the example in FIG. 16, an order in EBAY is being worked by the Adaptive algorithm with a limit to buy up to twenty cents. To help the user track which algorithm is represented on the fishbone 1602, the color of the vertical column 1604 matches the color of the algorithm's icon on the Dashboard. Again, looking at the example in FIG. 16, the color of the vertical algorithm representing column is green to match the background of the Adaptive Algorithm's icon. If there is more than one algorithm working on a symbol, these vertical columns are placed next to each other along the top (or bottom) of the price scale such that the columns do not overlap or obscure each other. These algorithm-representing columns are also interactive tools that can be used to manage the algorithms. To change the limit of an algorithm, all the user needs to do is catch the bottom (or top) of the bar and pull (or push) the bar to the new limit. Alternatively, the user can alter the algorithm's operating parameters by double-clicking on any of the algorithm representing bars. Double-clicking on a bar will display a box 1702 (FIGS. 17A and 17B) which contains information about all of the parameters that the user can set/alter for that particular algorithm. The two examples in FIGS. 17A and 17B illustrate the boxes 1702 displayed to a user when he double clicks on a column representing the adaptive algorithm (the first image) or the Execution Rate algorithm (second image).

Figure 18:
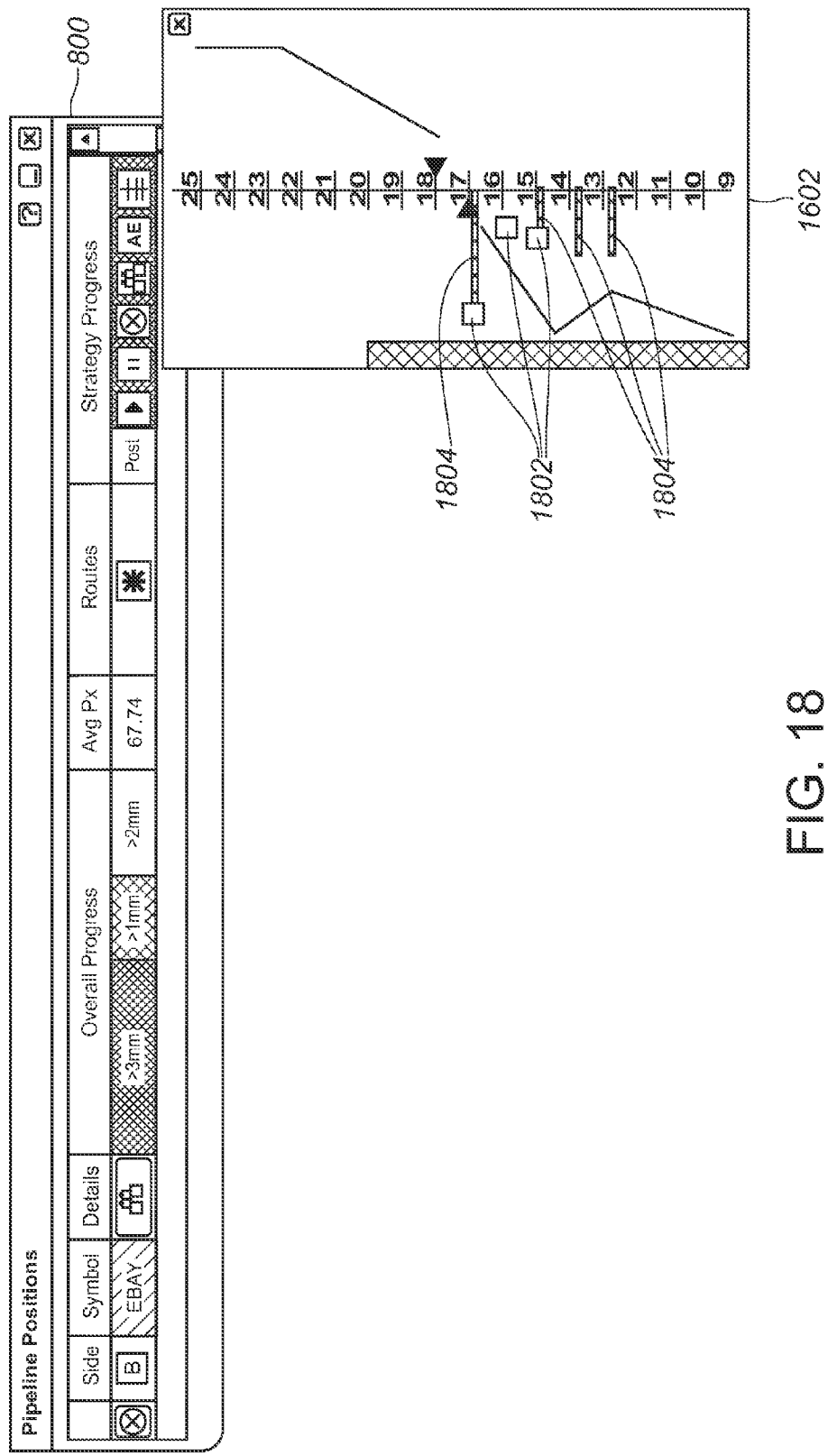
FIG. 18 shows the fishbone for the active algorithm launched from the positions window toolbar, in which the fishbone shows pending and filled orders

Once an algorithm is active, the Fishbone also displays the orders that each of the algorithms have placed and executed. When an algorithm places an order, a small block 1802 appears on the price scale next to the price point of the order (FIG. 18). Therefore a block represents a collection of pending (active, unfilled) shares at a single price point. Users can manually cancel any pending order by double clicking on a pending-order block. Then, once an order or part of an order has been filled, the block or blocks that represented those shares when they were pending orders disappears, and a horizontal bar representing the filled shares appears (FIG. 18).

Figure 19:
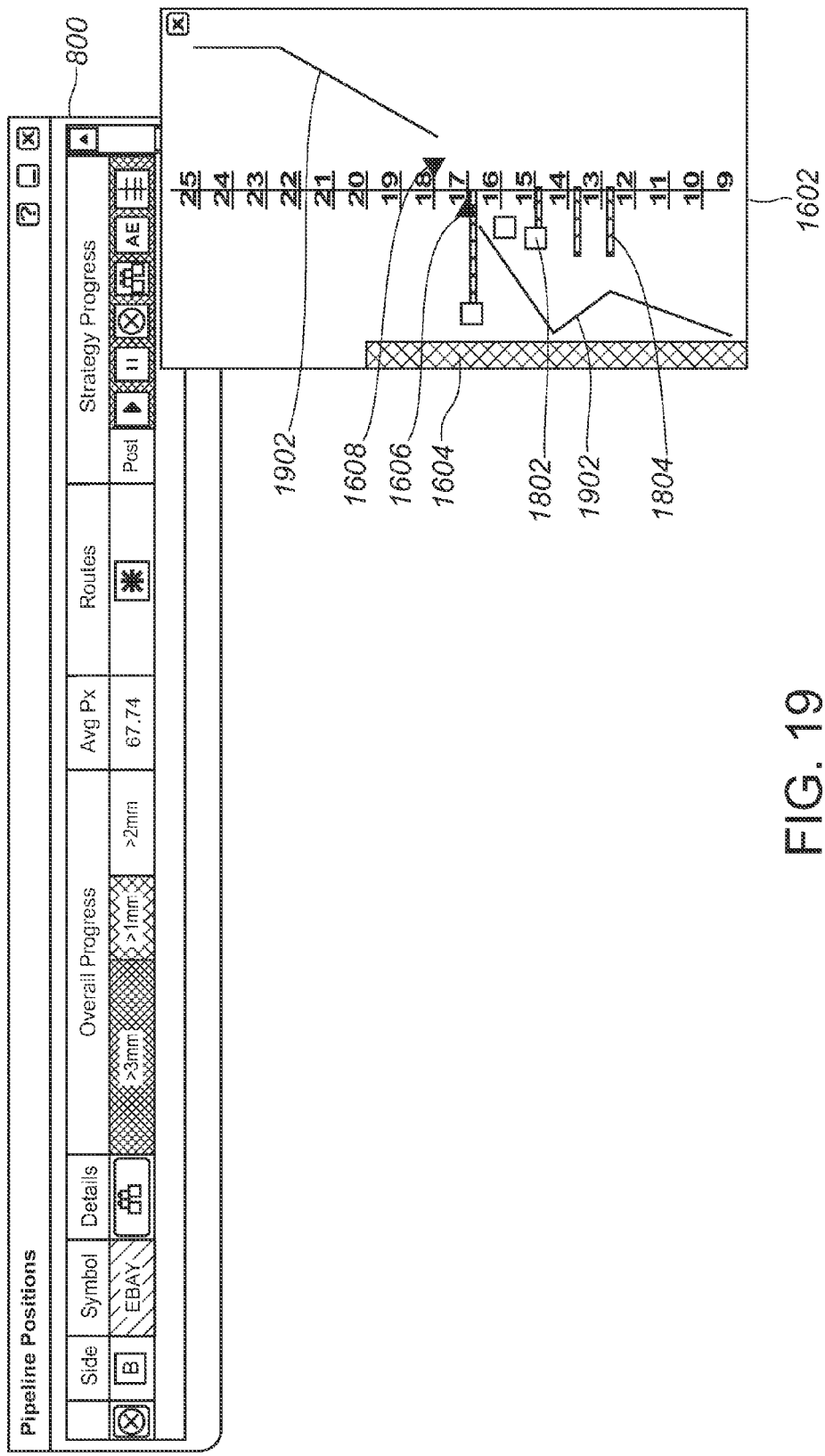
FIG. 19 shows the fishbone for an active algorithm launched from the positions window tool bar, in which the fishbone shows liquidity lines representing the effective depth of the book.

In addition to the features already noted, the Fishbone also includes an indication of the bid/ask spread and a representation of the effective Depth of Book. Small grey arrows (1606, 1608 in FIG. 16) appear on the price scale next to the price points that represent the bid and ask, while the Effective Depth of Book is represented as a gray line (1902 in FIG. 19) indicating the amount of size likely to be available at each price point at and above the current best offer and at and below the best bid. The effective depth can be defined as the displayed quote sizes aggregated over multiple market destinations, as is known in the art. However, this representation of book depth fails to capture hidden liquidity (reserve orders) or latent liquidity (orders that have not yet been placed on the market). For a long time the trading community has expressed the need for a depth of book indicator that incorporates an estimate of reserve and latent liquidity along with the aggregated displayed liquidity. The subject system preferably attends to this need by calculating the amount of liquidity that would be needed to push the price of the stock through various price points. More specifically, the number of shares that would trade at a $20.01 offer before the price moved up to $20.02 would be the "effective offer size" at $20.01. While this amount may be considerably larger than the displayed liquidity, it could also be smaller that the displayed amount if it turns out that the displayed size was only a fleeting quote. In order to calculate an effective offer size at a given offer price, the subject system looks back at price and quote changes to find most recent time in the past when this same offer price was the best offer and the best offer was completely filled leading subsequently to a new higher best offered price. It then calculates the total number of shares that traded while the original offer price was available, counting shares printed at any price but only during the period of time during which the offer was available. This total number of shares is the effective offer size; it represents the total number of shares required to push a security's price through that offered price level. Similarly for the effective bid, the subject system identifies the most recent time that this bid was completely consumed and counts the number of shares that traded before the bid was dropped. If there is no prior example in the same day of pushing through the given bid or offer, the subject system assumes the effective bid (offer) size is the average effective bid (offer) size over all other price points for which there are prior examples. A more elaborate model for calculating the effective liquidity at each price point is given in the appendix titled "An empirical study of resistance and support on Liquidity Dynamics." Other algorithms for inferring the likely number of shares that can be executed before pushing the price through a given bid or offer price level can be imagined by those skilled in the art.

To calculate "effective quote size," as defined above the subject system employs an algorithm that is connected to a real time feed of market prints which includes information about every trade, including the trade price and the size of the trade as reported to the tape. Prints are aggregated into buckets, each bucket will be later labeled as a "buy bucket" (next price move is up) or a "sell bucket" (next price move is down). Each bucket has a low price and a high price. The first two prices traded are the low and high of the first bucket. While a bucket is open, add all shares printed to the total share count for that bucket. The first print above the bucket high price (or below the bucket low price) closes the bucket; the high (low) price is the "effective offer price" (effective bid price) and the total quantity in the bucket is the effective offer quantity (effective bid quantity). In addition, a pair of in-memory vectors keeps the most recent value of the effective bid size and effective offer size at each price point.

To close a Fishbone launched from the "Strategy Progress Toolbar," the user can click on the "x" (1610, FIG. 16) in the upper right hand corner of the window. Finally, if the Strategy progress tool bar is not used and the user moves his cursor away from the Strategy Progress area, the tool bar disappears until the user scrolls over the area again. This "disappearing tool bar" is a useful feature within the Strategy Progress area as it gives the user immediate access to a wide range of functionality without requiring use of permanent desktop real estate.

Provision of Real Time Benchmark Monitoring

Figure 20:
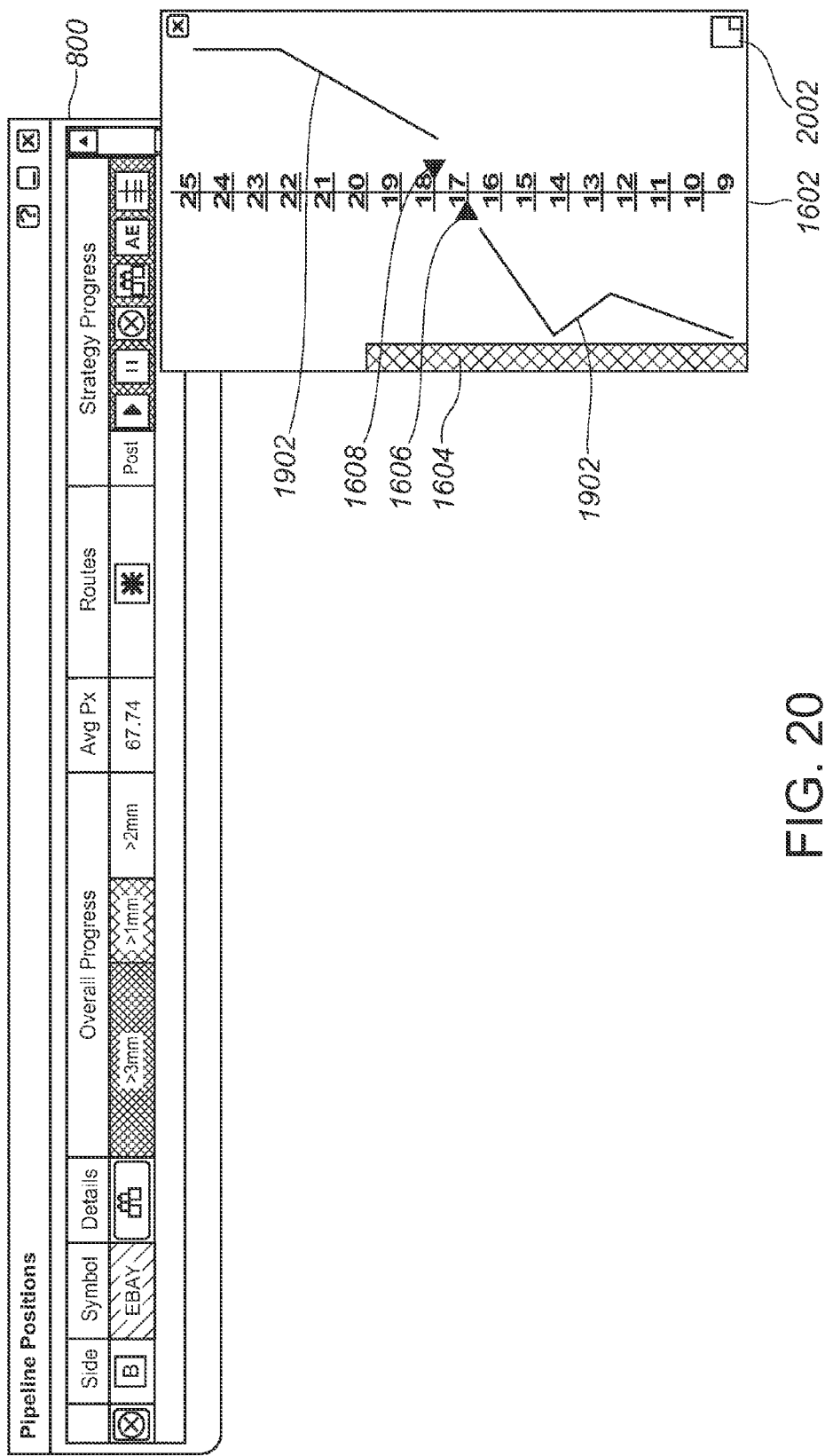
FIG. 20 shows the fishbone in a strategy-progress area with a "Display Benchmark Monitor Dial" button.

In addition to providing real time feedback regarding the operations of the active algorithms and order executions, the subject system also provides the user with real time benchmark monitoring. This real time benchmark monitoring is provided via a dynamic dial that can be displayed directly below the fishbone in the strategy progress area by clicking on the "Display Benchmark Monitor" button (2000, FIG. 20) if the user has elected to turn this feature "on." While active, the purpose of the dial is to provide the trader with visually-enhanced, real-time feedback regarding the performance of his trading strategy and the performance of the market relative to a particular benchmark through real-time alterations in spatial orientation, shape, size, color, shade, and texture within the dial and its surrounding area. It is also important to note that the user can customize the benchmarks he uses to monitor his trading, and some examples include but are not limited to: market price, market average price, P&L, volume-weighted average price, time-weighted average price, closing price, opening price, or one standard deviation of short term volatility.

Figure 21:
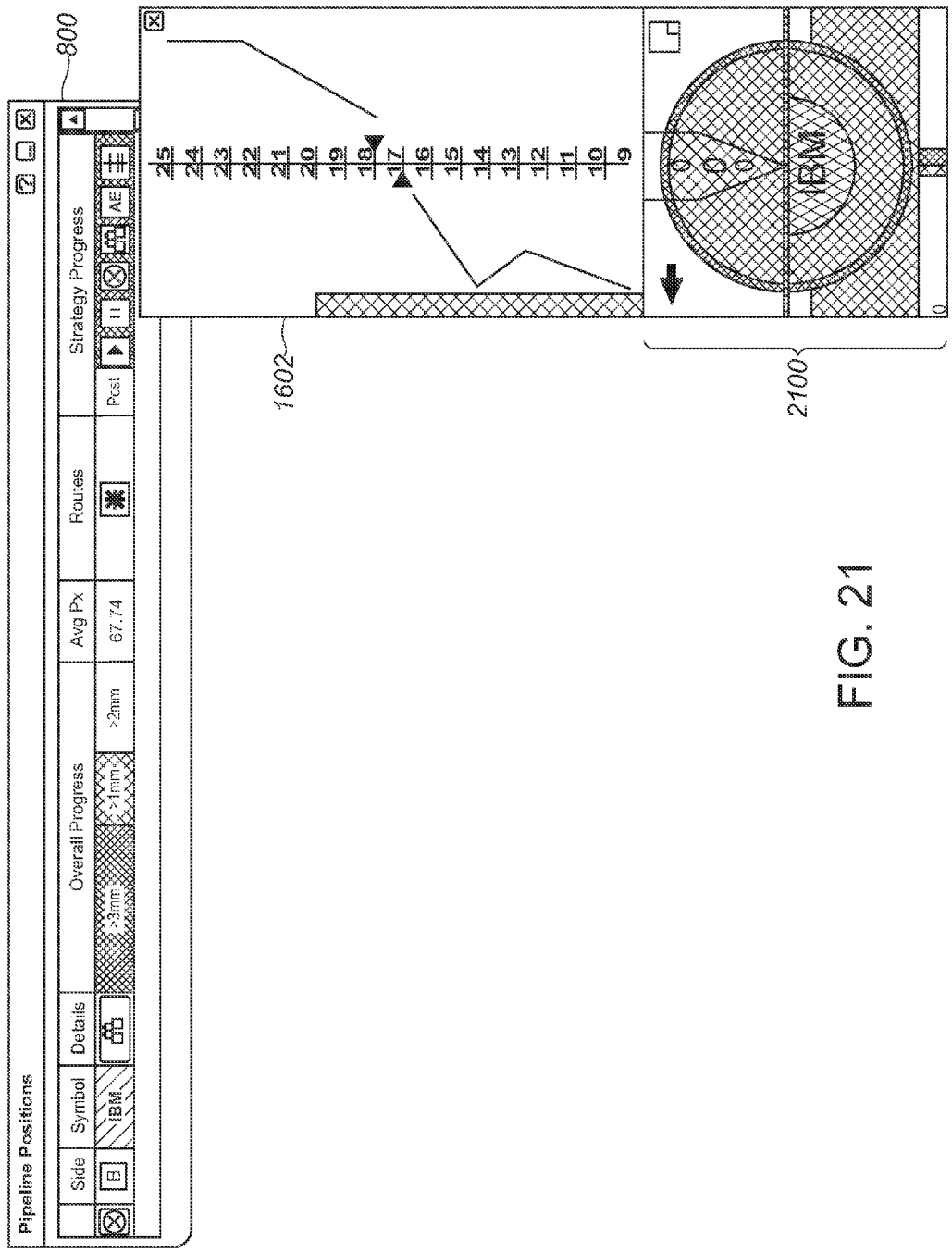
FIG. 21 shows a benchmark dial area below the fishbone in the strategy-process area in a situation in which the benchmark dial is inactive.
Figure 22:
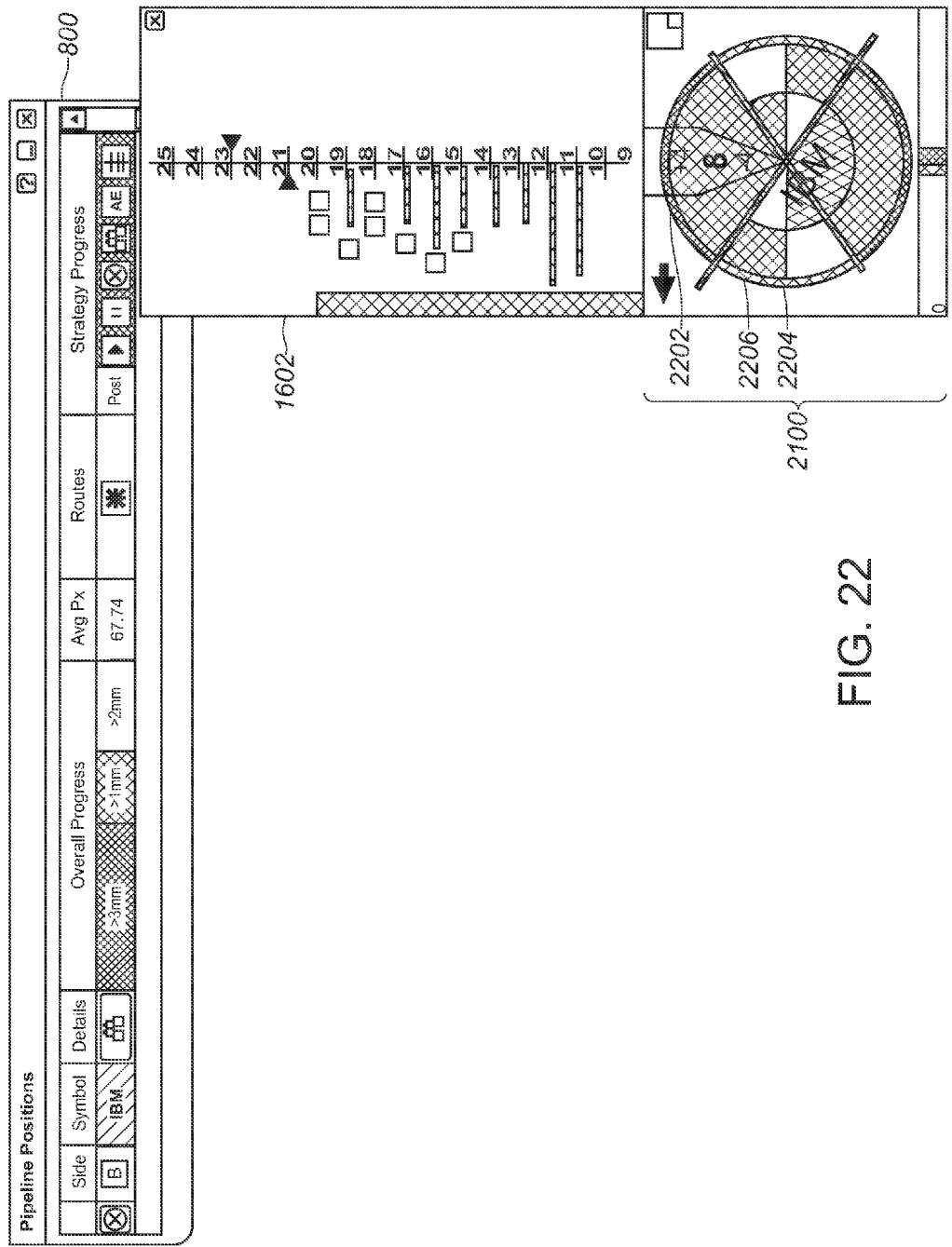
FIG. 22 shows the active benchmark dial below the fishbone in a strategy process area with numeric indicators labeled.

FIG. 21 depicts the benchmark dial 2100 in its "inactive" state before an algorithm or algorithms have begun to place orders to work an order. Then once an algorithm begins to work a user's order, the dynamic benchmark monitor moves from this "inactive" state to an "active" state (FIG. 22). For illustrative purposes the following description of the operation of the dial will use VWAP (volume weighted average price) as the benchmark, but as previously indicated this is just one possible benchmark a trader could use and is in no way intended to limit the scope or application of the subject system.

Looking at the active dial in FIG. 22, there are three numbers at the top of the dial, "+4" "8" and "−4." The number closest to the fishbone, here a "+4" represents a measure 2202 of the trader's executions against the benchmark he has chosen for the dial. Because this example uses VWAP as the benchmark, in this case the number represents how much the trader is beating or missing VWAP on an average price per share basis over some predetermined period of time. In this particular example, the trader is beating VWAP by four cents per share, and the fact that he is beating, rather than missing VWAP is communicated by both the green color of the font as well as the "+" sign in front of the number four.

The number closest to the dial, here a "−4" represents a measure 2204 of the market's current performance relative to the same benchmark. Again, because this example is using VWAP, this means that at this point in time the market is missing VWAP by four cents a share, and the fact that this is a loss is reflected in both the "−" sign in front of the number and the red color of the font.

And finally, the third (middle) number represents the spread 2206 between the other two numbers, and serves as a relative indicator for the user of how his position compares to the market's current position. Again, because this example is using VWAP as the benchmark, this number represents how much money the trader is making on a per share basis relative to where the market is currently trading. Here the number is a positive eight, indicating that at the moment, the trader is making eight cents per share.

Figure 23:
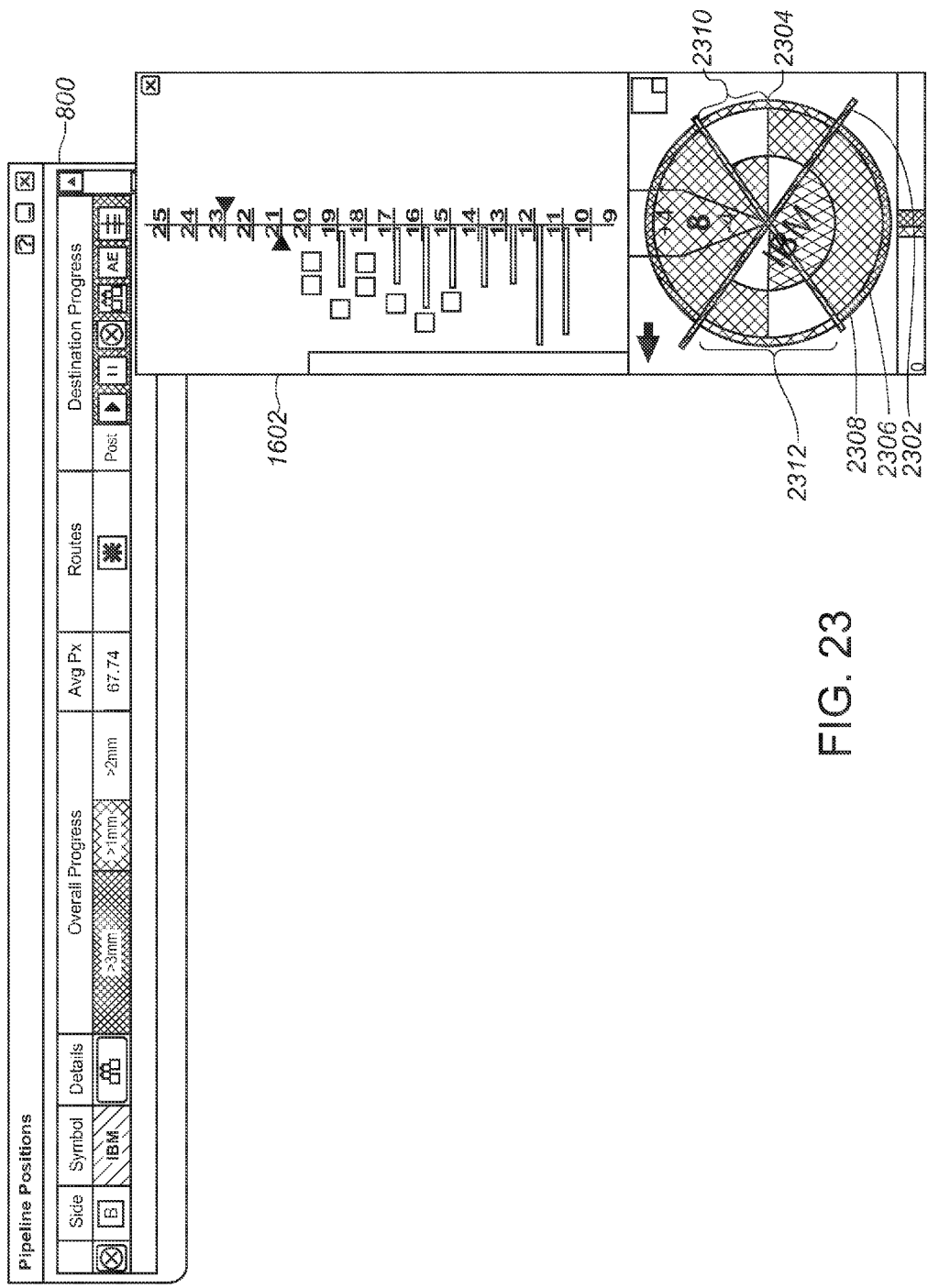
FIG. 23 shows an active benchmark dial below the fishbone in a strategy process area with graphic indicators labeled.

Because these numbers represent calculations that use the trader's average price and the market's current price, they are dynamic metrics that change along with movements in the market's position and the trader's aggregate position. In addition, the information communicated by these numbers is also displayed graphically inside of the monitor. First, as the metrics fluctuate, the bars that run through the center of the dial rotate about the central axis. By looking at the rotation of each bar relative to its horizontal or "0" position in the inactive state, the trader can quickly assess both hnw the market is currently performing relative to the benchmark and how the his algorithms are performing relative to the benchmark. To assess the market relative to the benchmark, the user can look at the displacement of the red bar 2302 from the "0" position 2304 and the size and color of the pie-shaped area 2306 at the center of the dial. In FIG. 23, this area is labeled, and with a quick glance it is evident that the market is missing VVAP by a significant margin, indicated by both the size of the pie shaped wedge and the red shading inside that wedge.

Then to assess his position relative to the benchmark, the trader can look at the displacement of the blue bar 2308 from the "0" position 2304 and the size and color of the trapezoid shaped area 2310 along the outer edge of the dial. This area is also labeled on FIG. 23. With a quick glance at this area, it is also easy to see that the trader is beating VWAP by a significant margin, indicated by both the size of the trapezoidal area and the green shading within that area. As the difference between the market or the trader's position and the benchmark increases, both the size of the area and the severity of the shading within the area increase. Likewise, as the difference between the market or the trader's position and the benchmark decreases, both the size of the area and the severity of the shading within the area decrease.

Finally, the trader can also get a quick visual indication of how well he is doing relative to the market by looking at the size and color of the band 2312 formed along the perimeter of the dial in between the red market representing and the blue trader representing bars. Both the size and color of this band help communicate to the trader if he is making or losing money relative to the market, as well as the degree of this gain or loss.

In addition to FIG. 23, FIGS. 24A-24F are included to help illustrate the dynamic nature of the benchmark dial and demonstrate how the benchmark dial would look over time as changes occurred in both the market and the trader's position.

Figure 24A:
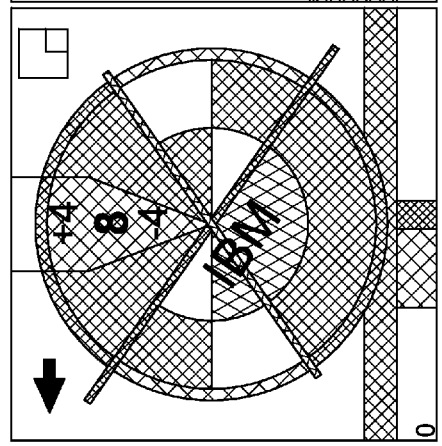
FIGS. 24A-24F show a series of active benchmark dials.

In FIG. 24A, the trader is beating VWAP by 4 cents, the market is missing VWAP by a 4 cents, and, as a result, the trader is making 8 cents per share.

Figure 24B:
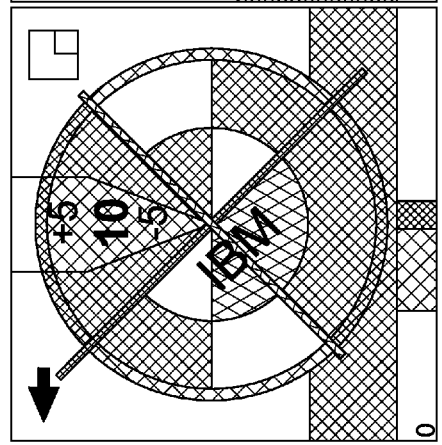

In FIG. 24B, the market has moved further in the trader's favor. Now the trader is beating VWAP by 5 cents, the market is missing VWAP by 5 cents, and the trader is making 10 cents per share. The market-representing wedge and the trader-representing trapezoid are larger, and the red and green shadings are darker.

Figure 24C:
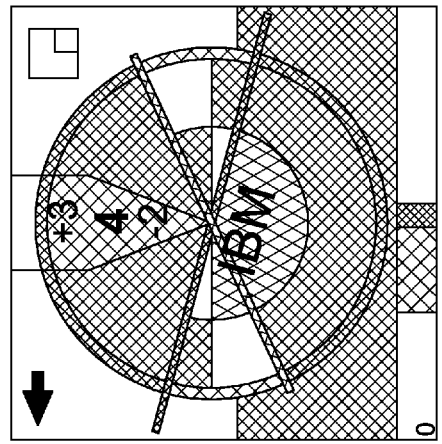

In FIG. 24C, the market has turned. Now the trader is beating VWAP by only 3 cents, the market is missing VWAP by 2 cents, and the trader is only making 4 cents per share. Also, the sizes and color depths in the shaded areas have changed.

Figure 24D:
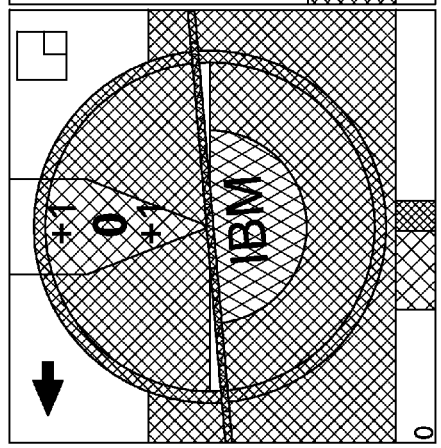

In FIG. 24D, with continued movement, the trader and the market are now even, both beating VWAP by one cent. As a result, the trader is now even with the market.

Figure 24E:
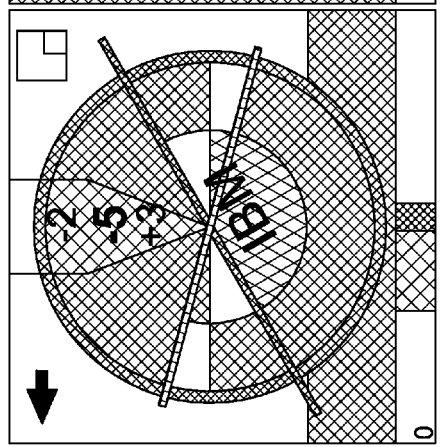

In FIG. 24E, as the market continues to move, the trader is now missing VWAP by 2 cents, while the market is beating VWAP by 3 cents. As a result, the trader is now losing 5 cents a share.

Figure 24F:
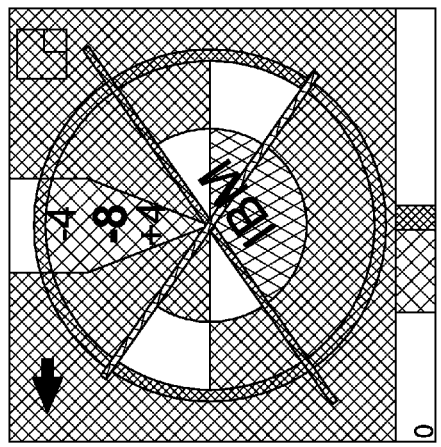

In FIG. 24F, in a total reversal of fortune, the market has moved such that the trader is in the very opposite position from where he started. He is missing VWAP by four cents, the market is beating VWAP by 4 cents, and the trader is losing 8 cents per share.

In certain embodiments, the color of the background behind the benchmark dial also changes in color and depth of color to reflect the trader's positive or negative deviation from the benchmark. In these embodiments the specific color and shade matches that of the trapezoidal area formed on the outer edge of the dial by the displacement of the blue bar from the "0" position and simply serves as a visual reinforcement of whether or not the trader's selected strategy is succeeding (a green background) or is failing and in need of an update (a red background.)

Together, all of these elements give a user real-time numeric and visual feedback regarding the status of his position relative to a benchmark and the market. In addition, the benchmark also gives the trader a visual depiction of how close he is to meeting his aggregate position goal in a particular symbol at any given point in time. To display this information, the background area "behind" the monitor's dial "fills up" or "drops down" as the trader's overall position in a symbol moves closer or father from meeting the initial aggregate position goal. It is important to note that this indicator is based on the assumption the base of the monitor's background area represents the "zero" position where the trader has made no progress towards meeting his aggregate position goal, while the top of the dial's background area represents the 100% mark where the trader has complete that goal. FIGS. 24A-F demonstrate this feature, as the gray-colored background area behind the dial is higher in each successive imagine as the trader's aggregate goal is gradually met over the course of these six images until it is totally filled in the final image, FIG. 24F In addition to the real-time trading performance feedback, the monitor also provides traders with a graphic that indicates the liquidity ratio between the number of shares available to buy (green) and the number of shares available to sell (red) at the NBBO. A green area represented to the left of a mid-line is as wide as the available shares on the bid (with each millimeter in width representing 100 shares); a red area to the right represents the shares available on the offer. This graphic can also be seen at the base of each of the "active" dial images in FIGS. 24A-F. The purpose of the liquidity ratio is twofold: to give the trader a sense of the balance (or imbalance as the case may be) in the available shares on the bid and the offer, and by extension to give him a sense of the volatility of the stock. If there is an even (or close to even) number of shares on the bid and the offer, then it is reasonable for the trader to assume that it is a fairly stable stock that will be hard pressed to move in either direction. On the other hand, if there is a distinct imbalance, it lets the trader know that the stock has the potential to be volatile and serves as a warning to plan accordingly.

Alternate embodiments also include a measure of "price inertia" for the symbol. The price inertia, as defined by the inventors, is the number of shares required to move the stock one cent, and the purpose of this indicator is to supplement the liquidity ratio by giving the trader a more specific understanding of the overall volatility of the stock he is trading. To calculate the price inertia, the subject system tracks the cumulative number of shares that print to the tape as long as the best bid and best offer have not both changed. When both changed this number of shares is recorded as the last available measure of instant effective liquidity at this point, and the cumulative share counter is reset. The price inertia is the trailing average of the five most recent effective liquidity values, signed by the direction of the aggregate price change over these five periods (positive if the price has risen and negative if it has fallen). Other measures of price inertia can easily be imagined to those skilled in the art.

Providing Users with Market Contexts for Symbols Traded

While the purpose of the dynamic benchmark monitor is to give the trader real-time feedback as to the success of his algorithmic trading strategy, the flip side of the dial provides the user with a customized view of market data that gives the user a unique perspective on how a particular stock fits into the larger context of the market. In the subject system, this customized view of market data is called a "market context," and it is specifically designed to give the user a perspective on a stock's position and movement in the market relative to other stocks that meet certain parameters. These parameters can be customized by the user, and include but are not limited to: market sector, correlation, market cap, affinity, blotter, trading style and basket. More detailed descriptions of these parameters are provided below.

To access this "market context," in FIG. 25A, a user simply clicks on the "rotate" arrow 2502 at the top of the benchmark monitor. When he does this, he will flip the benchmark monitor over and reveal a "market context" 2504, or a group of cells oriented around a central, enlarged cell (FIG. 25B). In the illustration in FIG. 26 this central, enlarged cell 2602 is IBM. Each of the cells 2604 included in the market context represents a particular stock, indicated by the symbol name inside the cell. The central cell, also called the reference cell or the reference symbol, represents the stock being traded on the associated fishbone and benchmark monitor, again in this example IBM. The specific group of symbols displayed on a particular context is based on the parameters selected by the user, while the particular arrangement of those cells relative to the reference cell represents the degree of parameter correlation between each cell and the reference cell. In the preferred embodiment, the subject system uses visual cues to transmit information in a way consistent with "self organizing map technology" as known to those skilled in the art.

The user can return to the view of FIG. 25A by clicking on the arrow 2506. There is also a green and red liquidity ratio 2606 at the base of each cell in the market context. The market context includes either the NBBO or in the embodiment for Pipeline Trading Systems, as displayed in FIG. 26 as 2608, the Block Price Range. Clicking the "change parameter" arrow 2610 allows the user to scroll through the various context parameters that are available.

The number of stocks the subject system displays in any given market context can be customized by the user and the map will auto-resize to accommodate the number of stocks the user chooses to include. If at any point a user decides that he wants to add a stock that is not included in a context, all he needs to do is drag and drop that symbol from the watch list onto the market context. When the symbol is dropped onto the context, it automatically "snaps" into the appropriate place relative to the other symbols.

In addition to showing the relationships between the reference symbol and the other symbols, every market context also provides the user with specific information about each symbol included in the context. More specifically, every market context displays the National Best Bid and Offer (NBBO) for each symbol included in the context or in the version of the subject system specifically designed for Pipeline Trading Systems (as in FIG. 26), the Block Price Range replaces the NBBO. Each context also includes a "liquidity ratio" for every symbol. This ratio looks and operates in the same manner as the liquidity ratio at the base of the benchmark dial and is represented graphically at the base of each cell in the market context. As on the benchmark monitor side, the purpose of the liquidity ratio is to give the user a rough indication of how many shares are available on the bid and on the offer at the current NBBO, and serves as a high level indication of volatility of the stock. In an alternate embodiment, the market context also displays directionality of each stocks price movement through the color of each symbol's font. If the average movement of a stock's price over a user-specified period is upward, the symbol's font is blue. On the other hand, if the average movement of a stock's price over that period is downward, the symbol's font is orange.

Finally, in the version of the subject system adapted for Pipeline Trading Systems, the market maps also convey information from Pipeline's proprietary watch list, called the Pipeline Block Board. Looking at a market context like the example in FIG. 26, the user can tell for each symbol whether or not the stock is currently active on the Pipeline Block Board (the symbol's cell has an orange background), if it is currently inactive but was active earlier in the day (the symbol's cell has a grey background), or if it is inactive now and has been inactive all day (the symbol's cell has a white background). In addition, the context indicates if Pipeline has printed a block in a particular stock by giving those cells a three dimensional appearance.

Individually, each of these indicators presents a very high level of information. However, when these indicators are presented in concert, across multiple stocks organized by relational parameters, they provide the trader with a valuable snapshot of the market's position and its relative movement.

As noted above, the user can choose from a range of parameters when customizing a market context. These parameters include, but are not limited to: market sector, correlation, market cap, affinity, blotter, trading style and baskets. The concepts behind the market sector, correlation, and market cap parameters will be obvious to those skilled in the art; however for the sake of clarity we will provide more detailed explanations for the affinity, blotter, and trading style parameters. The basket parameter is described in a separate section as it enables functionality that is distinctly different from the functionality of the other parameters.

The "affinity" parameter refers to grouping securities based on clustering in a multi-factor model. For example, a set of stocks representing companies with divergent business models, but which are subject to the same systemic economic risks (i.e. interest-rate movements, energy prices, etc.)

The "blotter" parameter simply creates a context that includes all of the symbols in a user's blotter. This map offers the user a quick way to get a high level perspective on the movement and position of all of the stocks in his blotter, or to build a basket with symbols from his blotter (as described below).

The "trading style" parameter is a concept specific to the subject system. This parameter displays the set of stocks that "behave" in a similar manner to the reference stock when traded by the same algorithm or algorithms. The subject system's historic, collective information about how a stock reacts when it is traded by one of the subject system's algorithms is used to inform this parameter. In addition, when a user selects this context, right clicking inside the context displays a ranked list of the subject system's algorithms according to their success in trading that set of stocks. This context is a particularly innovative feature as it simultaneously gives the trader a group of stocks that share common trading characteristics and tells him the best algorithms to use on those stocks. It is important to note that any combination of parameters can be used in a single market context. When more than one parameter is used, the subject system simply aggregates and correlates the data from each parameter, and then builds a context based on the final output of that correlation. Because of this feature, the subject system's customized market contexts can range from simple, single-parameters contexts like "Large Cap Tech" in FIG. 26 to extraordinarily complex, multi-parameter contexts.

Figure 26:
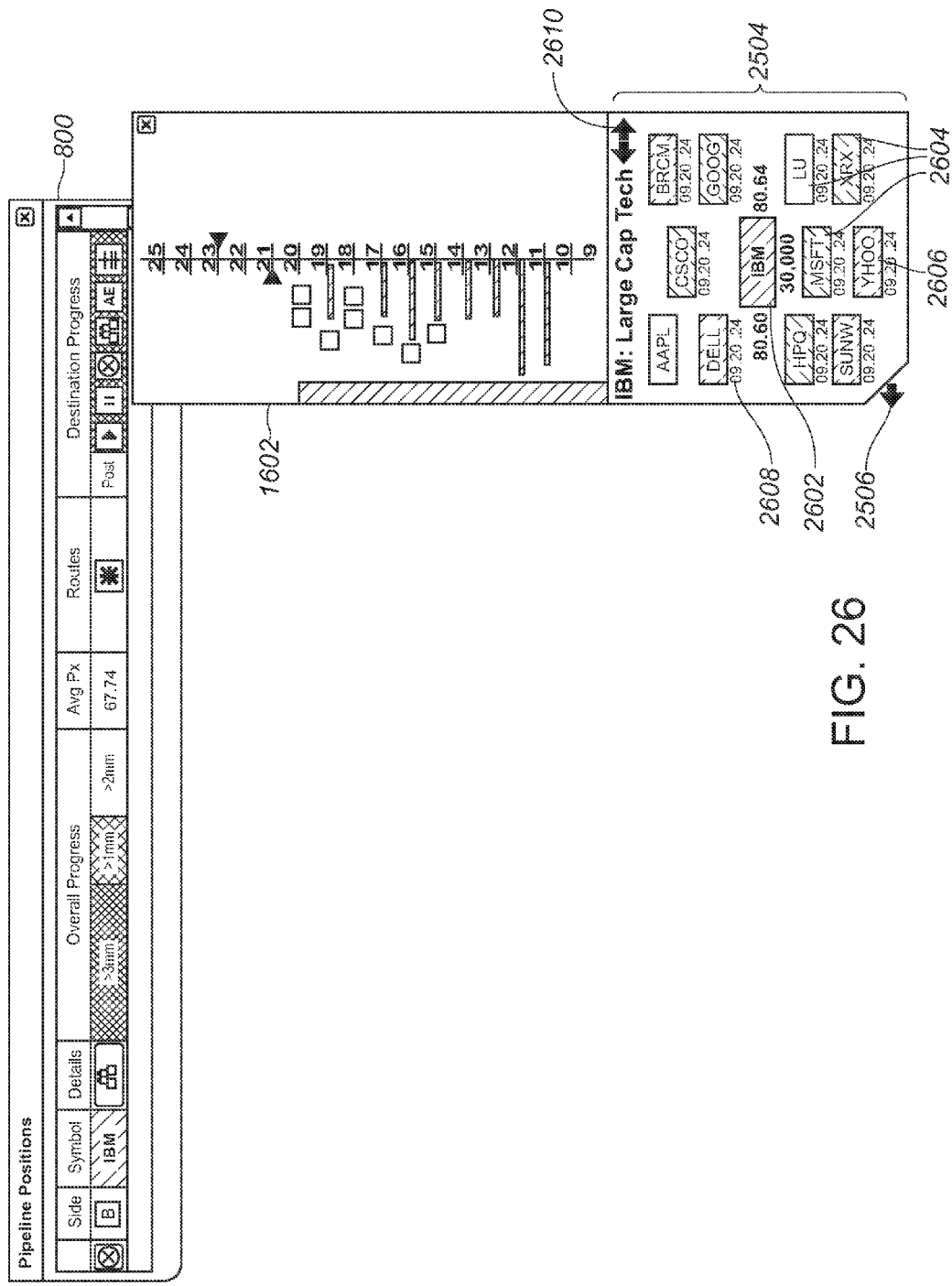
FIG. 26 shows an example of a market context.

When the user con FIGS. the subject system, he chooses a default set of parameters for his market contexts. This default setting is automatically used to build a context as soon as the user initiates an algorithm. Therefore, when the user flips over the benchmark monitor to access a market context, he automatically sees a context based on those default parameters. If the user decides he wants to change parameters and see a different context, all he has to do is right click the "change parameter" arrow on the top of the market context (FIG. 26). Clicking on this arrow automatically shifts the parameter for the market context and the new parameter is indicated in the title to the left of the arrows. In an alternate embodiment a "change parameter" button is used instead of the arrows. Clicking on this button launches a list of all of the parameters with check boxes next to each parameter. The trader can then select all of the parameters he wants to include in his new context, and then hit the "rebuild context" button at the base of the list to create a new context.

In an alternate embodiment, a trader can launch a market context before he initiates an algorithm, allowing him to bypass the default settings and build a context based on a different set of parameters. To launch a market context directly from the watch list, the user drags the "market context" icon located on the dashboard and drops it onto the stock in his watch list that he wants to use as the reference symbol for the context. In our example, the user would drop the "market context" icon on top of IBM in his watch-list to make a market context for IBM. After the user drops the "market context" icon onto the reference cell (in our case IBM) in the watch-list, the reference cell expands while the surrounding cells in the list simultaneously slide and shrink to accommodate the expansion of the reference cell without impacting the specific order or arrangement of the watch list. (The purpose of this enlargement is to make it clear to the trader which symbol he had put in "market context mode.") At this point, the "market context" feature has been engaged, and the user can customize the parameters for his market context. Right-clicking inside the expanded reference cell in the watch-list displays a list of the context parameters along with a checkbox for each parameter. Once the user has selected the parameters he wants to use in his context, he clicks the "build context" button at the base of the parameter list, and a market context is launched in a separate window. It is important to note that there is no limit to the number of market contexts that a user can have active at any given time. When a user is not looking at a particular context, he can either minimize the context or close it completely, but in the course of a trading day a user can activate and maintain as many contexts, for as many reference symbols as he sees fit.

In the same way that a trader can use the benchmark monitor to access the market context if he launches the monitor first; he can use the market context to access the benchmark monitor if he launches the market context first. By clicking the green "rotate" arrow at the bottom of the market context, the user can flip over the map and see the benchmark monitor for the reference symbol.

An additional feature of the subject system allows the user to streamline the process of launching customized "market contexts." Every time a user chooses a combination of parameters, he has the option to save and name that particular combination. For example, a user might choose to build a context based on the market sector, affinity, market cap and trading styles parameters knowing that he will use that particular combination on a regular basis. To avoid repeating the process of dropping the "market context" icon and selecting that combination each time he wants to build that particular context, he can choose to name and save that combination, using the "save as" feature at the parameter selection step. Once he has named and saved that combination, it will appear as a labeled icon next to the "market context" icon on the watch list. Then the next time he wants to use that same parameter combination to build a context all he has to do is drop that combination's icon onto a reference symbol, automatically generating a context with that combination of parameters in one, easy step.

A final feature related to the market contexts is the ability to use the contexts to build baskets which can then be traded using the available algorithms. If a user selects the "basket" parameter in conjunction with any of the other parameters (market sector, correlation, market cap, affinity, blotter, trading style), he activates the feature that enables him to create a customized basket. To build a basket when the "basket" feature is enabled, the user simply left-clicks on each of the symbols in his market context that he wants to include in the basket. If a user wants to include a stock that is not displayed on his context, all he has to do is "drag and drop" the symbol from the watch list onto the context. When the new symbol is dropped on the context, it automatically "snaps" into the appropriate place relative to the other stocks, and can then be included in the basket. Once the user selects all of the symbols he wants to include, he uses the "save as" feature on the market context to name and save the basket. This "save as" feature is always present on the market context; however it is only "active" when the basket parameter is enabled.

Once the basket has been named and saved, that basket becomes the reference cell, replacing the original reference cell. In our example, if the user created a basket and named that basket MONEY, the reference cell would become MONEY replacing IBM. At the same time, the name of the basket also appears as symbol on the watch list, ensuring that a user only has to create a particular basket one time. Once the basket becomes a symbol on the watch list, it can be treated in the same manner as a single-stock cell on the board; thereby allowing a user to apply the functionality behind any icon to the entire basket of stocks with a single click.

For example, if a user has created an icon for a particular combination of market context parameters, dropping that icon onto the MONEY basket symbol will create a market context with those parameters for the entire set of stocks in that basket. Or in another example, if a user drops the MONEY basket symbol on one of the algorithm representing icons, the system will automatically begin trading every stock in that basket with the same algorithm. A user is preferably enabled to set a percentual tolerance level for proceeding at different rates with various constituents of the basket. The target number of shares of a given item in the basket (e.g. IBM) is the total number of shares to be acquired at completion multiplied by the average completion rate of the entire basket (dollars traded versus marked-to-market dollar value of the basket); the lower and upper bounds on the desirable position in IBM is set by applying plus or minus the tolerance percentage to this target number of shares. Again taking the above example if the IBM order for 100,000 shares is part of a basket that has achieved 15% completion by dollar value and the tolerance level is set to 20%, then the subject system's current target completion for IBM would be 15,000 shares and orders will be placed on the market in such a way that the sum of achieved position plus open buy orders will not exceed 18,000 shares and the sum of achieved plus open sell orders will not fall below 12,000 shares. In that way, the activity of a plurality of agents on both sides of each constituent of a basket can be coordinated towards achieving a unique execution trajectory with set tolerance on relative rates of execution of the constituents.

Figure 27:
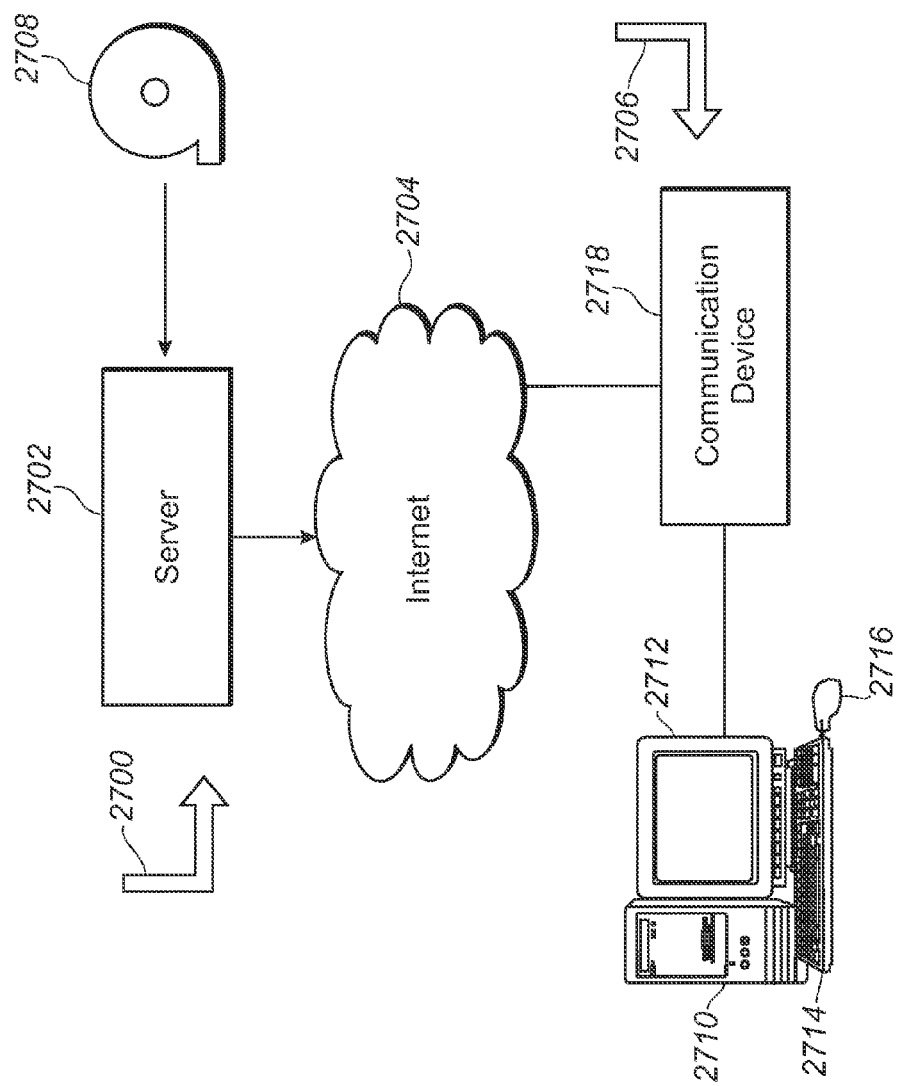
FIG. 27 is a block diagram showing a system on which the preferred embodiments can be implemented.

FIG. 27 shows a block diagram of a system 2700 on which any of the disclosed embodiments can be implemented. A server 2702 communicates over the Internet 2704, or another suitable communication medium, with a user's computer (or other device such as an Web-enabled cellular telephone) 2706. The software to implement any of the embodiments can be supplied on any suitable computer-readable medium 2708. The computer preferably includes a microprocessor 2710, a display 2712 for displaying the user interface described herein, input devices such as a keyboard 2714 and a mouse 2716, and a communication device 2718, such as a cable modem, for connecting to the Internet 2704.

An overview of the operation of the preferred embodiment will be set forth with reference to the flow chart of FIGS. 28A-28C, which should be understood in relation to the disclosure given above. Rectangles represent user actions, while ellipses represent system actions.

Figure 28A:
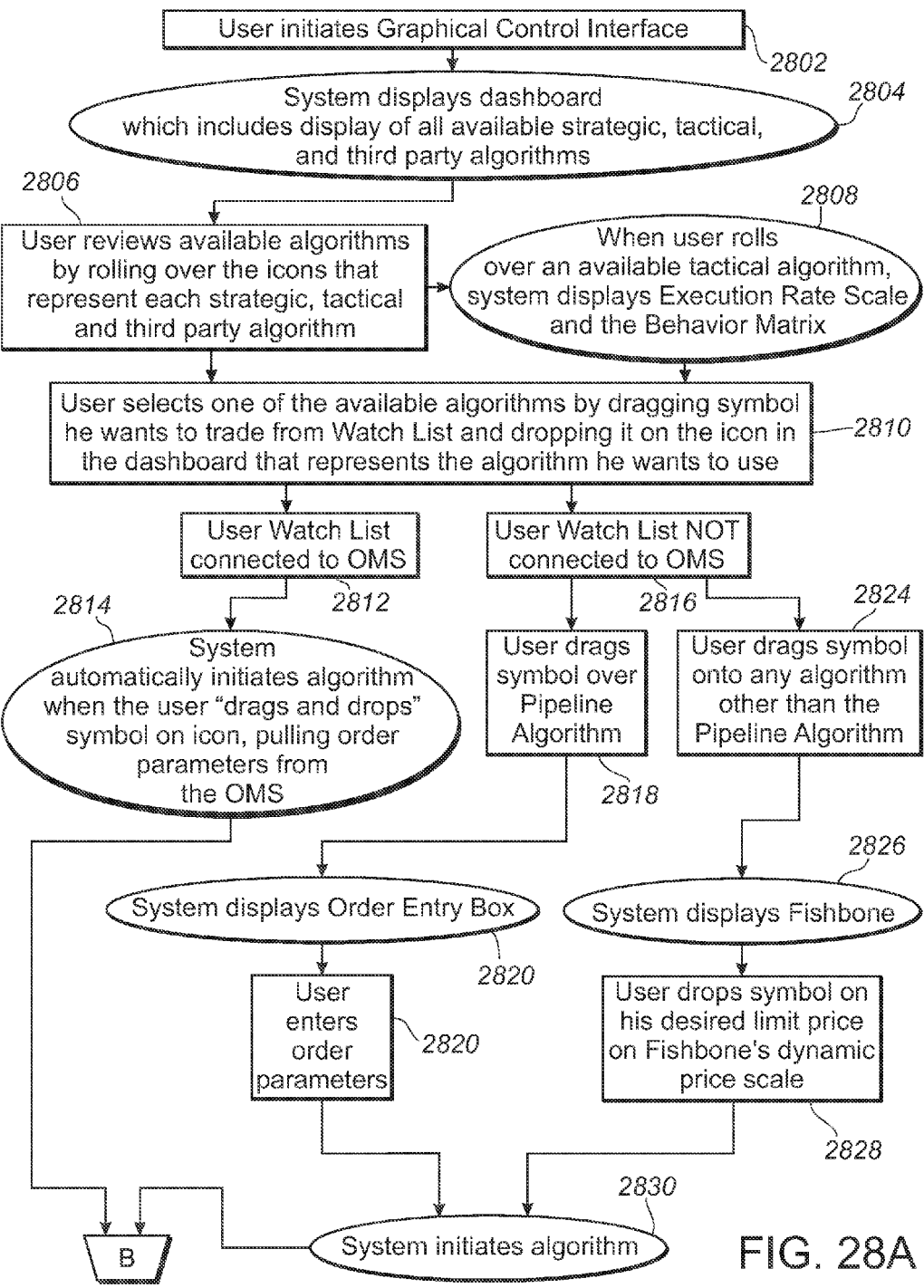
FIGS. 28A-28C are flow charts showing an overview of an exemplary embodiment.
Figure 28B:
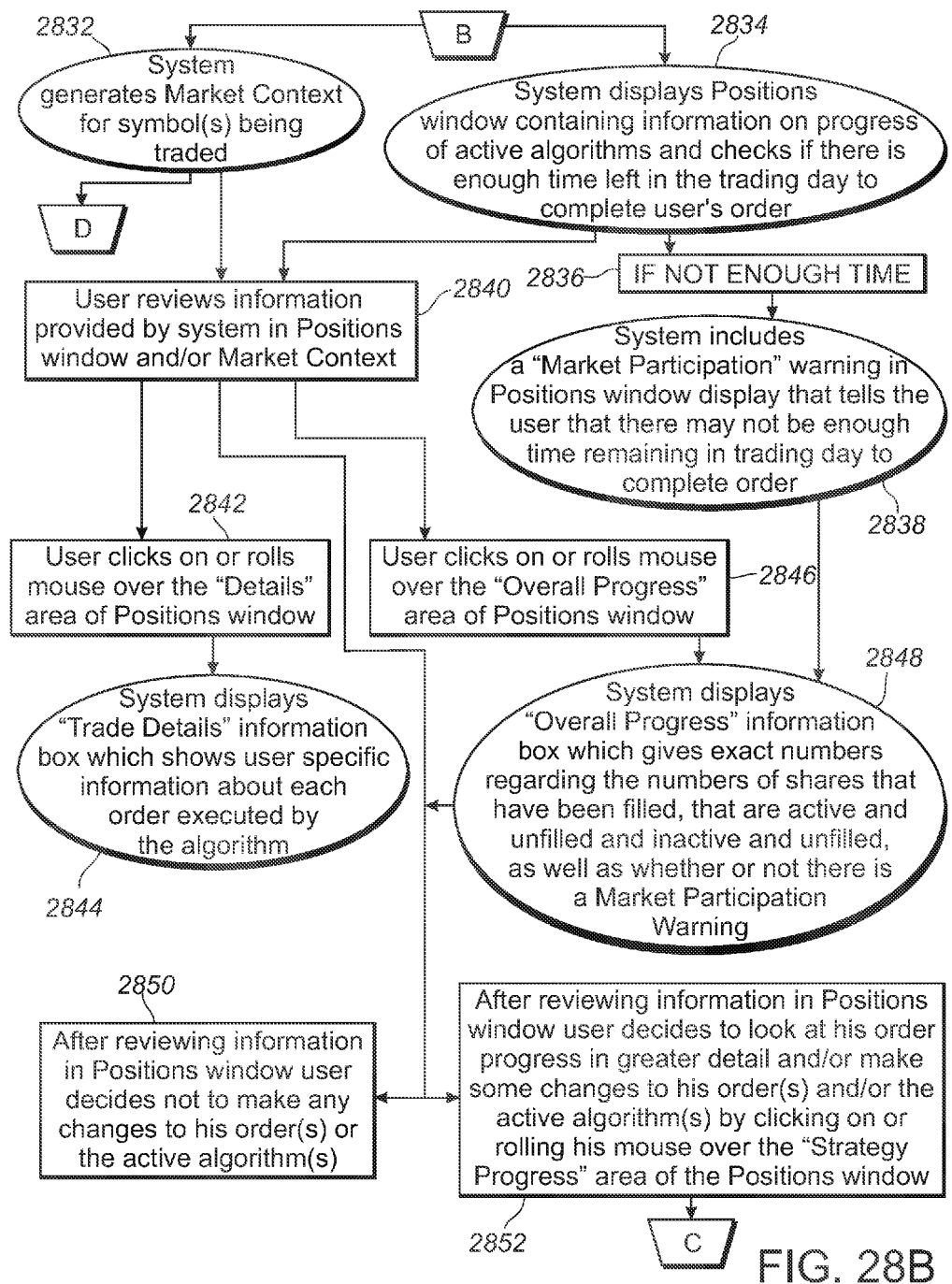
Figure 28C:
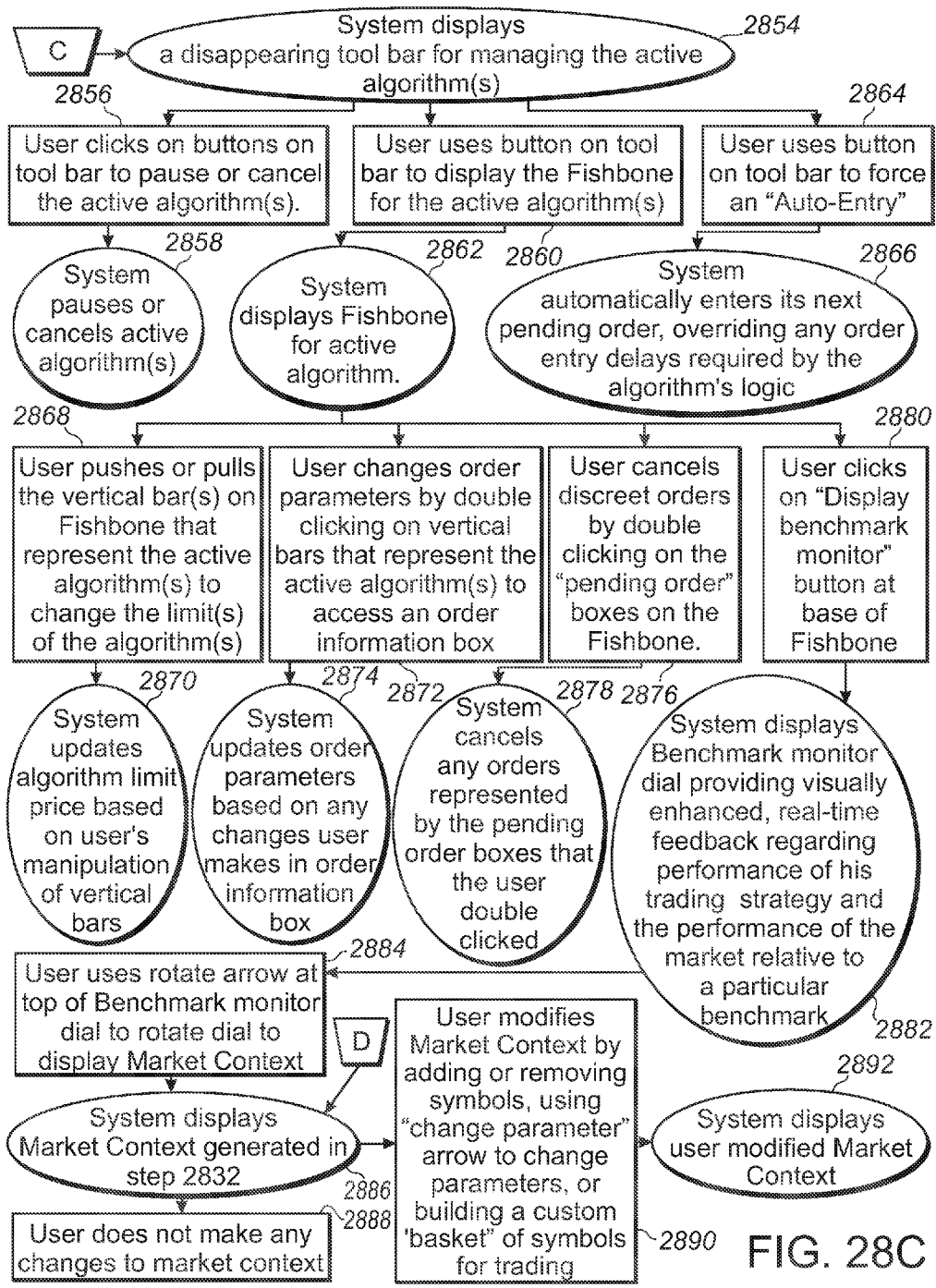

In FIG. 28A, step 2802, the user initiates the graphical control interface, which is then displayed to the trader. In step 2804, the system displays the dashboard, which includes a display of all available strategic, tactical and third-party algorithms. In step 2806, the user reviews the available algorithms by rolling over the icons which represent each strategic, tactical and third-party algorithm. When the user rolls over an available tactical algorithm, then, in step 2808, the system displays the execution rate scale and the behavior matrix. From either step 2806 or 2808, the user proceeds to step 2810, in which the user selects one of the available algorithms by dragging the symbol which the user wants to trade from the watch list and dropping it on the icon in the dashboard which represents the algorithm which the trader wants to use.

If it is determined in step 2812 that the user watch list is connected to the OMS, then, in step 2814, the system automatically initiates the algorithm when the user drags and drops the symbols onto the icon, pulling order parameters from the OMS. If it is determined in step 2816 that the user watch list is not connected to the OMS, then one of the following sequences of events occurs, based on the user's choice. If the user drags the symbol over the Pipeline algorithm in step 2818, then, in step 2820, the system displays the order entry box, and in step 2822, the user enters the order parameters. If the user drags the symbol onto any algorithm other than the Pipeline algorithm in step 2824, then, in step 2826, the system displays the fishbone, and, in step 2828, the user drops the symbol onto the desired limit price on the fishbone's dynamic price scale. Either way, the system initiates the algorithm in step 2830, and the overall process proceeds to FIG. 28B.

The system generates the market context for the symbol(s) being traded in step 2832 and/or, in step 2834, displays the positions window containing information on the progress of the active algorithms and checks to see whether there is enough time left in the trading day to complete the user's order. If it is determined in step 2836 that there is not enough time, then in step 2838, the system issues a "market participation" warning in the positions window display which tells the user that there may not be enough time remaining in the trading day to complete the order.

After step 2832, 2834 or (if applicable) 2838, the user reviews the information provided by the system in the positions window and/or the market context in step 2840.

The user can then click on or roll the mouse over the "Details" area of the positions window in step 2842. In step 2844, the system displays a "Trade Details" information box which shows user-specific information about each order generated by the algorithm. Alternatively, the user can click on or roll the mouse over the "Overall Progress" area of the Positions window in step 2846. In response to step 2846, the system displays an "overall progress" information box in step 2848, which gives exact numbers regarding the numbers of shares which have been filed, which are active and unfilled and which are inactive and unfilled, as well as whether or not there is a market participation warning (as determined in step 2838).

After step 2840, 2844 or 2848, the user can do either of the following. In step 2850, after reviewing the information in the positions window, the user can decide not to make any changes to the orders or the active algorithms. Alternatively, in step 2852, after reviewing the information in the positions window, the user can decide to look at the order progress in greater detail and/or make some changes to the orders and/or the active algorithms by clicking on or rolling the mouse over the "Strategy Progress" area of the positions window, whereupon the process proceeds to FIG. 28C.

In step 2854, the system displays a disappearing tool bar for managing the active algorithms. In response, the user can do one of three things. In step 2856, the user can click on the buttons in the tool bar to pause or cancel the active algorithm(s), whereupon the system pauses or cancels them in step 2858. In step 2860, the user can use the buttons in the tool bar to display the fishbone for the active algorithm(s), whereupon the system displays the fishbone in step 2862. In step 2864, the user can use the buttons on the tool bar to force an "auto-entry," whereupon, in step 2866, the system automatically enters its next pending order, overriding any order entry delays required by the algorithm's logic.

In response to step 2862, the user can do one of the following four things. In step 2868, the user can push or pull the vertical bar(s) on the fishbone which represent the active algorithm(s) to change the limit(s) of the algorithm(s), whereupon, in step 2870, the system updates the algorithm limit price based on the user's manipulation of the vertical bars. In step 2872, the user can change the order parameters by double clicking on the vertical bars which represent the active algorithm(s) to access an order information box, whereupon, in step 2874, the system updates the order parameters based on any changes which the user has made in the order information box. In step 2876, the user can cancel discreet orders by double clicking on the "pending order" boxes on the fishbone, whereupon, in step 2878, the system can cancel any orders represented by the pending order boxes which the user has double-clicked.

The fourth option is more involved. In step 2880, the user can click on the "display benchmark monitor" button at the base of the fishbone. In response, in step 2882, the system displays the benchmark monitor dial, providing visually enhanced, real-time feedback regarding the performance of the user's trading strategy and the performance of the market relative to a particular benchmark. In step 2884, the user uses the rotate arrow at the top of the benchmark monitor to rotate the dial to display the market context. In step 2886, the system displays the market context generated in step 2832.

The user can choose not to make any changes to the market context in step 2888. Alternatively, in step 2890, the user can modify the market context by adding or removing symbols, using the "change parameter" arrow to change the parameters, or building a custom basket of symbols for trading. In step 2892, the system displays the user-modified market context.

Figure 29:
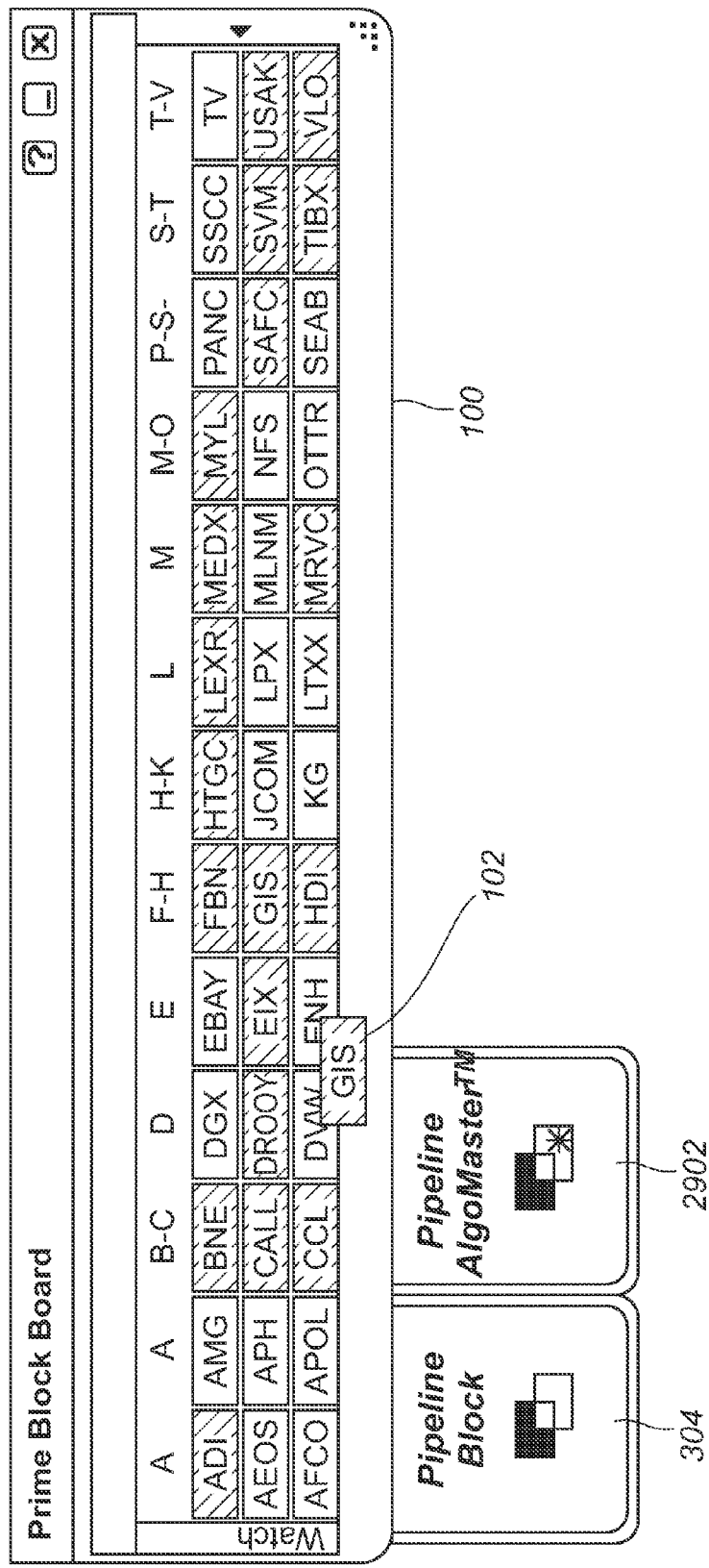

Another variation of the preferred embodiment will be set forth in detail with reference to FIGS. 29-33. As shown in FIG. 29, the trader clicks and drags a symbol onto the Pipeline Block icon 304 or action icons in a toolbar to participate in the market. The trader can con FIG. an optional delay to start participating with trader settings dialog. The following action icons appear when scrolling over the AlgoMaster icon 2902: The Pipeline Block 304 places a block order on Pipeline, and the Pipeline AlgoMaster 2902 places a block order on Pipeline and simultaneously accesses the market using algorithms. Additional icons can be provided to bring up news wires or technical charts via strategic partnerships.

Figure 30:
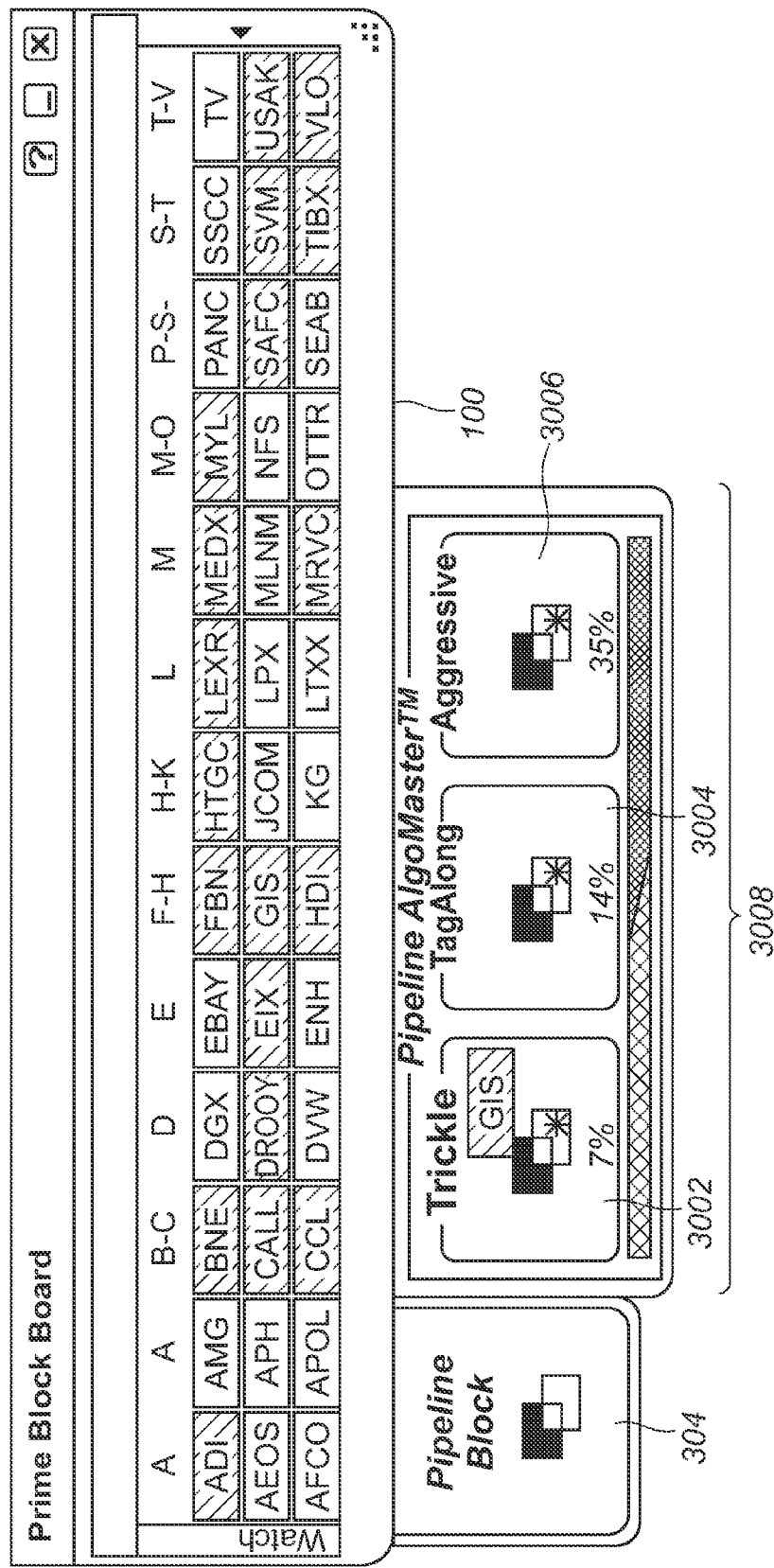

FIG. 30 shows the operation of dropping on an icon to launch Pipeline+Algorithms. Three speed settings are based on the current "red-line rate" (as defined in paragraph 0057) for the stock. Red-line values are available if symbol is on the BPR watch list. "Trickle" 3002 indicates Pipeline+best tactic for low-market impact routing (3-10%). "TagAlong" 3004 indicates Pipeline+market participation as fast as we can go without becoming the "axe". Expect 10-30% depending on market conditions "Aggressive" 3006 takes 30-60% of the market until half the order is done or substantial resistance is encountered, then alternates with "tag along" methods to allow price to find an equilibrium but averaging at least 20% of the market. A red-line bar 3008 shows the red-line rate; of course, other indicators could be used as well, such as a car tachometer.

Figures 31, 32:
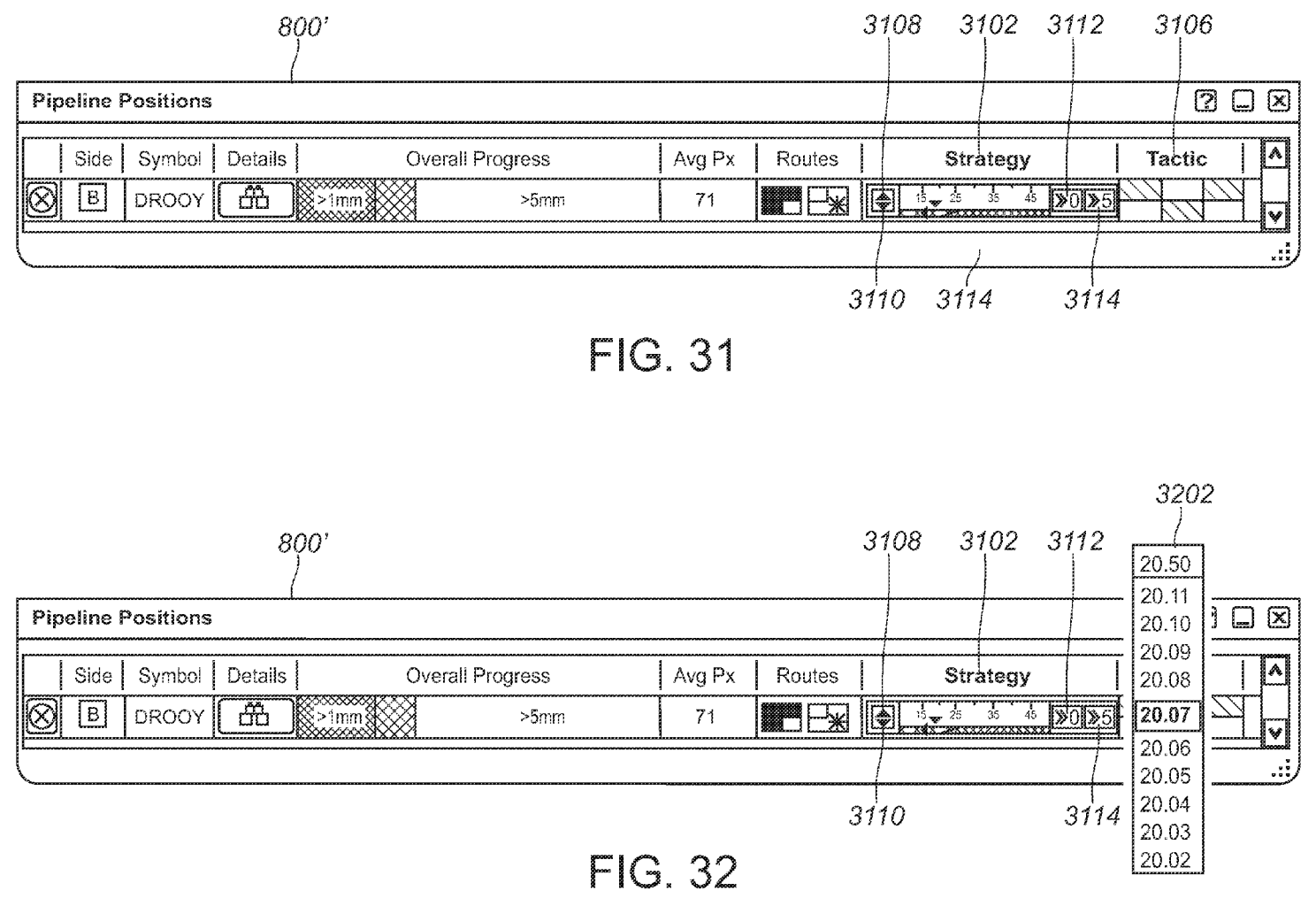

Referring to FIG. 31, in a modified Pipeline Positions bar 800', the Strategy graphic 3102 shows a market color (red-line) graphic 3104 similar to the red-line bar 3008 just described. The trader can click on the Pipeline route icon to see an alternative display showing a Bollinger band/XVA graphic and Pipeline-specific controls. The switching action is visible on the Market Color graphic (Tactic) 3106. Automatic algorithm switching minimizes information leaks by cutting out some of six possible actions (such as "Peg", or "Take", . . . ). The interface provides trader controls to switch up/down in speed, such as the up/down arrow buttons 3108 and 3110, and Fast Forward buttons to launch very aggressive trading (smart sweep) to the offer (bid) (button 3112) or up (down) 5 cents (button 3114). The trader can right-click to change number of cents, as explained below, or save other default in trader configuration.

As shown in FIG. 32, the trader can use a fast-forward limit price override using a drag and drop paradigm. The default limit is 5 cents (configurable) from NBBO. The trader can right-click to change the number of cents; in one example, a pick list 3202 appears. The limit price graphic will remain steady; market prices may fluctuate. The price scale can change with price (e.g., ticks should be 2 cents for PG, 5 cents for GOOG). The fast-forward button graphic toggles to simple forward to revert back to normal mode or when the offer is above the limit.

Figure 33:
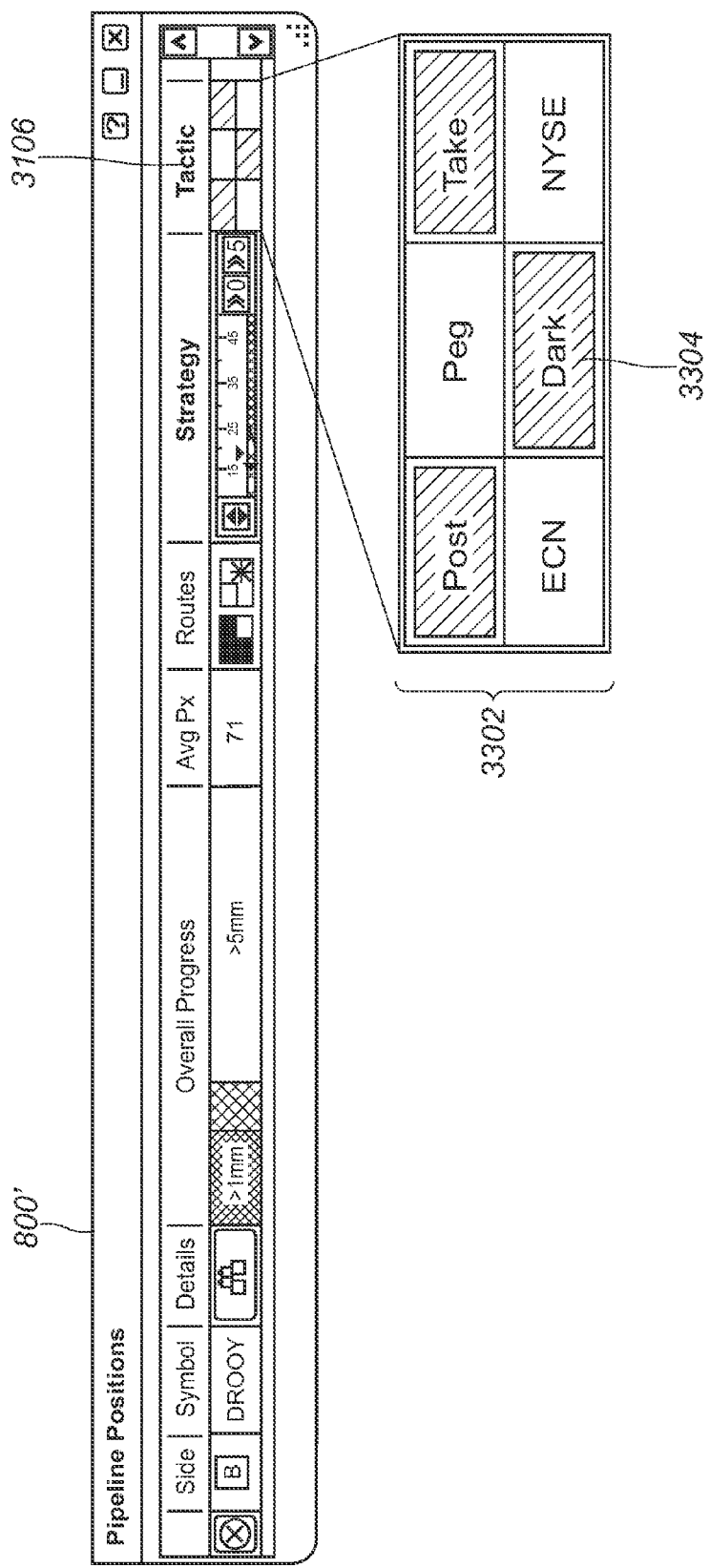

As shown in FIG. 33, a mouse scroll over the market color graphic reveals the meaning of the tactic display in a display 3302. On switching, the elements switched off show a red outline 3304 for 5 seconds, and new elements are shared green. The interface uses color rather than gray to convey that this is market color. In other embodiments, the colors can convey additional information, such as the market response to the algorithm's orders. This can be defined as a flag where "sensitive" indicates a stronger-than-average response, "normal" is average and "two-sided" indicates an increase in counter-party activity or a decrease in competition. Alternatively the market response can be measured as the ratio of the aggregate third-party order size triggered by the algorithm's orders to the algorithm's own aggregate order size; for example a response factor of 50% means that every 1000 shares placed by the algorithm prompts other market participants to either place an additional 500 shares on the same side or cancel 500 shares on the contra side. Of course, both the use of color rather than grayscale and the specific colors used are illustrative rather than limiting.

While preferred and alternative embodiments have been set forth above, those skilled in the art who have reviewed the present disclosure will readily appreciate that other embodiments can be realized within the scope of the present invention. Some possible variations have been disclosed above. Also, features of the embodiments that have been disclosed separately can be used together, while those disclosed together can be used separately. In particular, all or only some of the disclosed functionality can be used in any given embodiment. Therefore, the present invention should be construed as limited only by the appended claims.

Appendix: an Empirical Study of Resistance and Support on Liquidity Dynamics

The purpose of this empirical study is twofold. Firstly, we examine whether there is evidence of liquidity clustering around reference price levels. In a second step, we test whether the predictors similar to those of liquidity also determine price direction. The bulk of the existing literature on trade clustering focuses on how trades tend to gather around prices that are round numbers (Osborne, Niederhoffer, Harris) or psychological barriers (Sonnemans, Donaldson and Kim). Sonnemnans develops an empirical strategy to test between the odd price hypothesis, according to which humans attribute more weight to the first digit of each number, and the alternative hypothesis that investors have target prices for their holdings. His findings suggest that prices can indeed turn into psychological references to the traders and act as resistance and support levels. Donaldson and Kim find evidence that price levels at multiples of 100 are psychological barriers to the Dow Jones Industrial Average and act, at least temporarily, as support and resistance levels.

This study focuses on intraday fluctuations in liquidity as measured by the number of shares traded required to push a stock through a certain price level. Resistance and support levels are not asymptotic prices at which trigger strategists buy or sell a stock (as in Krugman) but, instead, prices that can be crossed, although perhaps with more difficulty, if the number of shares is large enough to push the price through such levels (as in Donaldson and Kim or Bertola and Caballero). The proposed estimation model of liquidity dynamics is a more general one than those found in existing literature since, for each price level, we consider major prior events and associated quantities as potential determinants of accumulation of liquidity. Resistance and support levels, in which an unusual amount of liquidity is available on one side of the market, are a particular case of historical price levels under consideration.

After proposing a set of potential key predictive drivers of liquidity at each price level, we fit empirical models explaining its fluctuations in order to estimate the impact and test the significance of each individual predictor.

Data and Methods:

We analyze market data for the period between Dec. 18th and Dec. 28, 2006, excluding after-hours trading due to the lower liquidity levels and frequency of trades at that time. For these same reasons, and to assure a fairly homogenous set of tickers where liquidity dynamics is more likely to occur, we restricted the universe of stocks to those with an average volume-weighted price over 1 dollar and an average daily number of executed shares over 400,000. The resulting subset includes 1,519 stocks over 8 trading days.

With the premise that the higher the volatility of a stock, the more likely it is for two consecutive prices levels to be treated as the same, we cross-grain market data into buckets that include all prints within a price interval defined by the mean and variance of the spread of each stock.

We excluded from the analysis all odd single prints (n) that were out of line with adjacent prints i.e.

$$|P_n-P_{n-1}|>(\text{spread}+std) \text{ AND } |P_{n+1}-P_{n-1}|<(\text{spread}+std) \quad (1)$$

where spread is the average difference between the prices of two subsequent prints and std is its standard deviation. For first and last prints in the day, the exclusion criteria are, respectively, $|P_n-P_{n+1}|>(\text{spread}+std)$ and $$|P_n-P_{n-1}|>(\text{spread}+std)$$

After filtering, we take the first print of each symbol on each trading day and include in its bucket all subsequent prints n that satisfy the condition:

$$n \in \text{bucket}: |\text{Max}\{P_n\}-\text{Min}\{P_n\}| <= (\text{spread}+std) \quad (2)$$

Every time a print does not satisfy condition (2) a new bucket is started. All buckets are classified according to the price movement of the print that initiated it i.e. a bucket is classified as an uptick (U) when it is started with a price increase, otherwise it is classified as a downtick (D). We then classify each bucket as a type of event according to its tick and that of the subsequent bucket: If the bucket's price is an uptick and the last price change was also an uptick then we classify the event as a double-uptick. Likewise, a downtick that follows a downtick is classified a double-downtick. When price changes direction from an uptick to a downtick it is classified as a resistance level or, in the reverse case, as a support level.

The empirical implementation involves the pooling of all stocks for model fitting, which requires the preliminary step of correcting for the heterogeneity of stocks. For this purpose, instead of looking at the absolute value of number of shares executed, we consider instead the adjusted volume in each bucket by taking its ratio to the average traded volume in each symbol in each trading day. Table 21 displays the frequency of each type of event as well and the number of executed shares at each event in absolute value (quantity), relatively to the average volume of the stock on each specific date (q/qavg) and in logarithms of the relative value to the average (Log(q/qavg)).

In our sample, price movements are more likely to change direction from one bucket to another than to persist. When price movements persist, the number of executed shares is higher on average that at turning points. This finding is consistent with the fact that turning points reflect one-sided liquidity that was not exhausted, whereas double upticks and downticks are persistent price movements driven by a higher than average number of executed shares. Our estimation models explore this evidence more thoroughly by looking at the fluctuations in volume within each type of event and testing its correlation with prior clustering at a similar price.

TABLE 23

Type of Event and Executed Shares

| | Freq | Quantity | Q/Qavg | Log(Q/Qavg) |
|---|---|---|---|---|
| U | 23% | 10,678 | 1.085 | −0.561 |
| D | 23% | 10,698 | 1.065 | −0.583 |
| R | 27% | 9,602 | 0.948 | −0.761 |
| S | 27% | 9,072 | 0.906 | −0.804 |

In the empirical specification, we hypothesize that volume traded in each bucket may be affected by the immediately preceding event and respective volume and events and quantity traded at similar historical price levels. In an analogous process to the construction of bins, we consider two prices to be similar when the absolute difference between the two is smaller than the spread plus its standard deviation. The proposed set of determinants includes the following variables:

Event type of the prior bucket: $E_{t-1}$ (S) where $S \in \{U, D, R, S\}$ is an indicator variable for double uptick, double downtick, resistance and support, respectively. For example, $E_{t-1}(U)$ is equal to 1 if event type was a double uptick and equal to 0 otherwise.

Quantity traded in the preceding bucket interacted with respective event type $QxE_{t-1}(S)$ where $S \in \{U, D, R, S\}$. This term allows quantity traded in immediately prior event to have a different impact on current number of snares traded depending on whether that event was a double uptick, a double downtick, a resistance or a support level.

Event type around latest price similar to current price $E_{price}(S)$, where $S \in \{U, D, R, S\}$. $E_{price}(U)$ is equal to 1 if event was a double uptick and equal to 0 otherwise. In reference case, current price has not been visited in the past 24 hours.

Interaction of the quantity traded in latest bucket around current price with associated event type $QxE_{price}(S)$, where $S \in \{U, D, R, S\}$.

Whether it is the case that there is an extraordinary number of shares traded around current price at any instance within the prior 24 hours (BigQ). We consider volume to be extraordinarily high if quantity is strictly larger than two times the average for that symbol that day. The indicator variable of very high volume around current price is interacted with an indicator variable for event type of latest instance. (BigQxE) $S \in \{U, D, R, S\}$. BigQxE(U) is strickly positive if it is the case that current price has been visited within the prior 24 hours and the latest instance of that type of event was a double tick.

Whether current price is in the neighborhood of the maximum or minimum volume-weighted prices of the prior trading day buckets. Max and Min are indicator variables for each case.

Whether current price is in the neighborhood of the first and last volume-weighted price of the prior trading day buckets. Open and Close are indicator variables for each case.

Whether current price is in the neighborhood of the whole dollar or 50 cents. Dollar and Halves are indicator variables for each respective case.

Table 24 displays either the mean of each proposed variable by type of event, which for indicator variables corresponds to the frequency of the event in question.

TABLE 24

Table of means by type of event

|  | U | D | R | S |
|---|---|---|---|---|
| E t-1(U) | −0.332 | — | 0.438 | — |
| E t-1(D) | — | 0.485 | — | 0.441 |
| E t-1(R) | — | 0.51 | — | 0.55 |
| E t-1(S) | −0.373 | — | 0.553 | — |
| Q*E t-1(U) | −0.332 | — | −0.329 | — |
| Q*E t-1(D) | — | −0.317 | 0.441 | — |
| Q*E t-1(R) | — | −0.376 | −0.428 | 0.55 |
| Q*E t-1(S) | −0.373 | — | — | — |
| E price(U) | 0.143 | 0.187 | 0.135 | 0.168 |
| E price(D) | 0.189 | 0.145 | 0.171 | 0.137 |
| E price(R) | 0.33 | 0.299 | 0.374 | 0.281 |
| E price(S) | 0.297 | 0.324 | 0.281 | 0.374 |
| QxE price (U) | −0.097 | −0.109 | −0.096 | −0.103 |
| QxE price (D) | −0.116 | −0.102 | −0.11 | −0.101 |
| QxE price (R) | −0.262 | −0.221 | −0.321 | 0.225 |
| QxE price (S) | −0.236 | −0.266 | −0.238 | −0.338 |
| BigQ*E (U) | 0.179 | 0.184 | 0.178 | 0.18 |
| BigQ*E (D) | 0.179 | 1.174 | 0.174 | 0.172 |
| BigQ*E (R) | 0.173 | 0.171 | 0.184 | 0.175 |
| BigQ*E (S) | 0.157 | 0.158 | 0.161 | 0.17 |
| Open | 0.023 | 0.023 | 0.024 | 0.024 |
| Close | 0.035 | 0.036 | 0.037 | 0.036 |
| Max | 0.018 | 0.019 | 0.02 | 0.019 |
| Min | 0.035 | 0.035 | 0.035 | 0.035 |
| Dollar | 0.075 | 0.075 | 0.078 | 0.079 |
| Halves | 0.146 | 0.146 | 0.149 | 0.15 |

The proposed set of explanatory variables of volume traded is included in a linear regression, predicting number of shares traded relatively to the average that day for that symbol. For each specific event, only two immediately prior events are possible: a for example double uptick can only be preceded by another double uptick or a support. For this reason, only one indicator variable for lagged event is defined when a constant is included in the model. As for interaction with associated quantity, only two lagged indicator variables can be identified.

In the linear estimation model we calculate the Huber/White "sandwich" estimators of variance, which are robust in the sense that they give accurate assessments of the sample-to-sample variability of the parameter estimates even when the model is mis-specified in several instances, such as when there are minor problems about normality, heteroscedasticity, or some observations that exhibit large residuals.

Results: Table 21 displays results of the least squares estimation. The findings indicate that almost all proposed variables have a statistically significant effect on volume traded. Quantity traded in the previous bucket, as well as quantity traded in the preceding bucket around current price, have a significant positive effect on volume. There is also a significantly higher quantity traded in the cases where there was a prior major clustering of volume around the current price.

Although proximity to resistance or support price levels has a negative impact on quantity traded, when a resistance or support price level is revisited, volume is significantly higher. Furthermore, the larger the prior volume traded at a turning point around a certain price, the bigger the impact on volume in a subsequent event around that price.

The fraction of times the current price has been revisited as a turning point (over the total number of events around that price) has a very different impact on current volume depending on whether the current event is a double tick or a turning point. Volume is lower when price is revisited in a turning point, but is much higher when price is passed on a double tick.

Surprisingly, volume traded around the reference prices of the prior trading day is higher in the cases where there is a change of price direction, but not when current event is a double tick.

TABLE 25

Linear Regression. Explained variable: Log [Q/avg(Q)]

| | (1) U | | (2) U | |
|---|---|---|---|---|
| | Coeff. | SE | Coeff. | SE |
| E t-1 (U) | — | — | — | — |
| E t-1 (D) | — | — | — | — |
| E t-1 (R) | — | — | — | — |
| E t-1 (S) | −0.033 | 0.008 | −0.138 | 0.004 |
| QxE t-1 (U) | −0.156 | 0.018 | 0.201 | 0.002 |
| QxE t-1 (D) | — | — | — | — |

TABLE 25-continued

Linear Regression. Explained variable: Log [Q/avg(Q)]

|  | (1) U Coeff. | SE | (2) U Coeff. | SE |
|---|---|---|---|---|
| QxE t-1 (R) | — | — | — | — |
| QxE t-1 (S) | −0.106 | 0.018 | 0.255 | 0.022 |
| E price (U) | 0.546 | 0.065 | — | — |
| E price (D) | 0.58 | 0.065 | — | — |
| E price (R) | 0.478 | 0.065 | — | — |
| E price (S) | 0.65 | 0.065 | — | — |
| QxE price (U) | 0.314 | 0.018 | — | — |
| QxE price (D) | 0.312 | 0.018 | — | — |
| Qx E price (R) | 0.382 | 0.018 | — | — |
| QxE price (S) | 0.389 | 0.018 | — | — |
| BigQxE (U) | 0.144 | 0.005 | 0.145 | 0.005 |
| BigQxE (D) | 0.157 | 0.005 | 0.153 | 0.005 |
| BigQxE (R) | 0.191 | 0.005 | 0.193 | 0.005 |
| BigQxE (S) | 0.212 | 0.006 | 0.228 | 0.005 |
| Open | −0.035 | 0.012 | −0.035 | 0.012 |
| Close | −0.036 | 0.009 | −0.04 | 0.009 |
| Max | 0.033 | 0.013 | 0.034 | 0.013 |
| Min | −0.056 | 0.01 | −0.058 | 0.01 |
| Dollar | 0.058 | 0.009 | 0.057 | 0.009 |
| Halves | 0.064 | 0.007 | 0.064 | 0.007 |
| Constant | −1.075 | 0.065 | −0.467 | 0.004 |
| R2 | 0.08 | | 0.075 | |
| N | | 460,004 | | |

Note 1:
Coeff. is point estimate and SE is standard error

Note 2:
gray-shaded estimates are not statistically significant at 5% significance level

TABLE 26

Linear Regression. Explained variable: Log [Q/avg(Q)]

|  | (1) D Coeff. | SE | (2) D Coeff. | SE |
|---|---|---|---|---|
| E t-1 (U) | — | | — | |
| E t-1 (D) | — | | — | — |
| E t-1 (R) | −0.143 | 0.004 | −0.073 | 0.008 |
| E t-1 (S) | — | | — | |
| QxE t-1 (U) | — | | — | |
| QxE t-1 (D) | 0.198 | 0.002 | −0.188 | 0.018 |
| QxE t-1 (R) | 0.25 | 0.002 | −0.148 | 0.019 |
| QxE t-1 (S) | −0.106 | 0.018 | — | |
| E price (U) | — | | 0.46 | 0.065 |
| E price (D) | — | | 0.454 | 0.065 |
| E price (R) | — | | 0.54 | 0.065 |
| E price (S) | — | | 0.418 | 0.065 |
| QxE price (U) | — | | 0.341 | 0.018 |
| QxE price (D) | — | | 0.345 | 0.018 |
| QxE price (R) | — | | 0.415 | 0.018 |
| QxE price (S) | — | | 0.423 | 0.018 |
| BigQxE (U) | 0.157 | 0.005 | 0.158 | 0.005 |
| BigQxE (D) | 0.15 | 0.005 | 0.172 | 0.005 |
| BigQxE (R) | 0.226 | 0.005 | 0.433 | 0.015 |
| BigQxE (S) | 0.203 | 0.006 | 0.589 | 0.06 |
| Open | −0.032 | 0.012 | −0.025 | 0.012 |
| Close | −0.055 | 0.009 | −0.047 | 0.009 |
| Max | −0.026 | 0.013 | −0.026 | 0.013 |
| Min | −0.033 | 0.009 | −0.019 | 0.009 |
| Dollar | 0.053 | 0.009 | 0.05 | 0.009 |
| Halves | 0.071 | 0.007 | 0.063 | 0.006 |
| Constant | −0.503 | 0.004 | −0.993 | 0.068 |
| R2 | 0.074 | | 0.078 | |
| N | | 458,883 | | |

Note 1:
Coeff. is point estimate and SE is standard error

Note 2:
gray-shaded estimates are not statistically significant at 5% significance level

TABLE 27

Linear Regression. Explained variable: Log[Q/avg(Q)]

|  | (1) R Coeff. | SE | (2) R Coeff. | SE |
|---|---|---|---|---|
| E t-1 (U) | — | — | — | — |
| E t-1 (D) | — | — | — | — |
| E t-1 (R) | — | — | — | — |
| E t-1 (S) | −0.033 | 0.008 | −0.203 | 0.004 |
| QxE t-1 (U) | −0.156 | 0.018 | 0.216 | 0.002 |
| QxE t-1 (D) | — | | — | |
| QxE t-1 (R) | — | | — | |
| QxE t-1 (S) | −0.106 | 0.018 | 0.275 | 0.002 |
| E price (U) | 0.546 | 0.065 | — | — |
| Eprice (D) | 0.58 | 0.065 | — | — |
| E price (R) | 0.478 | 0.065 | — | — |
| E price (S) | 0.65 | 0.065 | — | — |
| QxE price (U) | 0.314 | 0.018 | — | — |
| QxE price (D) | 0.312 | 0.018 | — | — |
| QxE price (R) | 0.382 | 0.018 | — | — |
| QxE price (S) | 0.389 | 0.018 | — | — |
| BigQxE (U) | 0.144 | 0.005 | 0.156 | 0.005 |
| BigQxE (D) | 0.157 | 0.005 | 0.171 | 0.005 |
| BigQxE (R) | 0.191 | 0.005 | 0.208 | 0.005 |
| BigQxE (S) | 0.212 | 0.006 | 0.247 | 0.005 |
| Open | −0.035 | 0.012 | 0.002 | 0.011 |
| Close | −0.036 | 0.009 | −0.031 | 0.009 |
| Max | 0.033 | 0.013 | 0.011 | 0.012 |
| Min | −0.056 | 0.01 | −0.03 | 0.009 |
| Dollar | 0.058 | 0.009 | 0.045 | 0.008 |
| Halves | 0.064 | 0.007 | 0.069 | 0.006 |
| Constant | −1.156 | 0.06 | −0.614 | 0.004 |
| R2 | 0.092 | | 0.086 | |
| N | | 539,399 | | |

Note 1:
Coeff. is point estimate and SE is standard error

Note 2:
gray-shaded estimates are not statistically significant at 5% significance level

TABLE 28

Linear Regression. Explained variable: Log[Q/avg(Q)]

|  | (1) S Coeff. | SE | (2) S Coeff. | SE |
|---|---|---|---|---|
| E t-1 (U) | — | — | — | — |
| E t-1 (D) | — | — | — | — |
| E t-1 (R) | −0.225 | 0.004 | −0.073 | 0.008 |
| E t-1 (S) | — | — | — | — |
| QxE t-1 (U) | — | — | — | — |
| QxE t-1 (D) | 0.215 | 0.002 | −0.188 | 0.015 |

TABLE 28-continued

Linear Regression. Explained variable: Log[Q/avg(Q)]

|  | (1) S | | (2) S | |
|---|---|---|---|---|
|  | Coeff. | SE | Coeff. | SE |
| QxE t-1 (R) | 0.274 | 0.002 | −0.148 | 0.015 |
| QxE t-1 (S) | — | — | — | — |
| E price (U) | — | — | 0.52 | 0.064 |
| E price (D) | — | — | 0.471 | 0.064 |
| E price (R) | — | — | 0.582 | 0.064 |
| E price (S) | — | — | 0.47 | 0.063 |
| QxE price (U) | — | — | 0.359 | 0.015 |
| QxE price (D) | — | — | 0.365 | 0.015 |
| QxE price (R) | — | — | 0.437 | 0.015 |
| QxE price (S) | — | — | 0.457 | 0.015 |
| BigQxE (U) | 0.17 | 0.005 | 0.173 | 0.005 |
| BigQxE (D) | 0.147 | 0.005 | 0.151 | 0.005 |
| BigQxE (R) | 0.23 | 0.005 | 0.216 | 0.005 |
| BigQxE (S) | 0.204 | 0.005 | 0.195 | 0.005 |
| Open | −0.029 | 0.011 | −0.028 | 0.011 |
| Close | −0.039 | 0.009 | −0.036 | 0.009 |
| Max | −0.003 | 0.012 | −0.002 | 0.012 |
| Min | −0.023 | 0.009 | −0.022 | 0.009 |
| Dollar | 0.048 | 0.009 | 0.048 | 0.008 |
| Halves | 0.082 | 0.006 | 0.082 | 0.006 |
| Constant | −0.641 | 0.004 | −1.182 | 0.064 |
| R2 | 0.089 | | 0.095 | |
| N | | 536,466 | | |

Note 1:
Coeff. is point estimate and SE is standard error

Note 2:
gray-shaded estimates are not statistically significant at 5% significance level

TABLE 29

Linear Regression. Explained variable: Log [Q/avg(Q)]

|  | (1) U/R | | (2) U/R | |
|---|---|---|---|---|
|  | Coeff. | SE | Coeff. | SE |
| E t-1 (U) | — | — | — | — |
| E t-1 (D) | — | — | — | — |
| E t-1 (R) | — | — | — | — |
| E t-1 (S) | 0.008 | 0.007 | −0.062 | 0.004 |
| QxE t-1 (U) | −0.119 | 0.016 | 0.182 | 0.002 |
| QxE t-1 (D) | — | — | — | — |
| QxE t-1 (R) | — | — | — | — |
| QxE t-1 (S) | −0.058 | 0.016 | 0.235 | 0.002 |
| E price (U) | 0.479 | 0.059 | — | — |
| E price (D) | 0.511 | 0.059 | — | — |
| E price (R) | 0.487 | 0.059 | — | — |
| E price (S) | 0.602 | 0.059 | — | — |
| QxE price (U) | 0.314 | 0.016 | — | — |
| QxE price (D) | 0.312 | 0.016 | — | — |
| QxE price (R) | 0.382 | 0.016 | — | — |
| QxE price (S) | 0.389 | 0.016 | — | — |
| BigQxE (U) | 0.166 | 0.005 | 0.164 | 0.005 |
| BigQxE (D) | 0.184 | 0.005 | 0.179 | 0.005 |
| BigQxE (R) | 0.253 | 0.005 | 0.261 | 0.005 |
| BigQxE (S) | 0.26 | 0.005 | 0.279 | 0.005 |
| Open | 0.005 | 0.011 | 0.004 | 0.011 |
| Close | −0.018 | 0.009 | −0.023 | 0.009 |
| Max | 0.07 | 0.012 | 0.07 | 0.013 |
| Min | −0.034 | 0.009 | −0.037 | 0.009 |
| Dollar | 0.081 | 0.009 | 0.081 | 0.009 |
| Halves | 0.063 | 0.006 | 0.064 | 0.006 |
| Constant | −0.303 | 0.059 | 0.252 | 0.004 |
| N | | 999,403 | | |

Note 1:
Coeff. is point estimate and SE is standard error

Note 2:
gray-shaded estimates are not statistically significant at 5% significance level The results from the estimation of the quantile regressions for the 80th percentile are shown in Table 22. The evidence suggests that large accumulation of volume is predicted in a very similar way to average quantity. All point estimates are higher than those obtained from the least squares regression, except for the proportion of turning points around the current price. These findings imply that the 80th quantile of volume is, as expected, higher than the average and more affected by each predictor than the average. Nonetheless, the qualitative findings are virtually the same.

TABLE 30

Linear Regression. Explained variable: Log [Q/avg(Q)]

|  | (1) D/S | | (2) D/S | |
|---|---|---|---|---|
|  | Coeff. | SE | Coeff. | SE |
| E t-1 (U) | — | — | — | — |
| E t-1 (D) | — | — | — | — |
| E t-1 (R) | −0.077 | 0.004 | −0.055 | 0.007 |
| E t-1 (S) | — | — | — | — |
| QxE t-1 (U) | — | — | — | — |
| QxE t-1 (D) | 0.183 | 0.002 | −0.118 | 0.016 |
| QxE t-1 (R) | 0.225 | 0.002 | −0.079 | 0.016 |
| QxE t-1 (S) | −0.058 | 0.016 | — | — |
| E price (U) | — | — | 0.468 | 0.06 |
| E price (D) | — | — | 0.468 | 0.06 |
| E price (R) | — | — | 0.557 | 0.06 |
| E price (S) | — | — | 0.512 | 0.065 |
| QxE price (U) | — | — | 0.264 | 0.016 |
| QxE price (D) | — | — | 0.268 | 0.016 |
| QxE price (R) | — | — | 0.326 | 0.016 |
| QxE price (S) | — | — | 0.323 | 0.016 |
| BigQxE (U) | 0.175 | 0.005 | 0.182 | 0.005 |
| BigQxE (D) | 0.151 | 0.005 | 0.154 | 0.005 |
| BigQxE (R) | 0.265 | 0.005 | 0.248 | 0.005 |
| BigQxE (S) | 0.259 | 0.005 | 0.246 | 0.005 |
| Open | −0.009 | 0.011 | −0.008 | 0.011 |
| Close | −0.044 | 0.009 | −0.041 | 0.009 |
| Max | −0.012 | 0.012 | −0.012 | 0.012 |
| Min | −0.02 | 0.009 | −0.019 | 0.009 |
| Dollar | 0.075 | 0.009 | 0.074 | 0.009 |
| Halves | 0.077 | 0.006 | 0.077 | 0.006 |
| Constant | 0.225 | 0.004 | −0.29 | 0.06 |
| N | | 995,349 | | |

Note 1:
Coeff. is point estimate and SE is standard error

Note 2:
gray-shaded estimates are not statistically significant at 5% significance level

TABLE 31

Logistic Regression Explained: P[Reverse]

|  | (1) U/R | | (2) D/S | |
|---|---|---|---|---|
|  | Coeff. | SE | Coeff. | SE |
| Q t-1 | 1.035 | 0.046 | −1.024 | 0.043 |
| Change | 1.053 | 0.006 | 1.062 | 0.006 |
| E price(U) | 2.596 | 0.188 | 0.811 | 0.057 |
| E price(D) | 0.949 | 0.068 | 2.196 | 0.156 |
| E price(R) | 1.432 | 0.107 | 1.058 | 0.075 |
| E price(S) | 1.252 | 0.09 | 1.287 | 0.095 |
| QxE | 0.995 | 0.045 | 0.94 | 0.039 |
| QxE | 0.924 | 0.041 | 0.987 | 0.042 |
| QxE | 0.937 | 0.043 | 0.929 | 0.039 |
| QxE | 0.926 | 0.041 | 0.957 | 0.041 |
| BigQxE(U) | 1.016 | 0.007 | 1.001 | 0.006 |
| BigQxE (D) | 1.023 | 0.006 | 0.996 | 0.007 |
| BigQxE (R) | 1.102 | 0.007 | 1.081 | 0.007 |
| BigQxE (S) | 1.106 | 0.007 | 1.095 | 0.007 |
| Open | 1.054 | 0.014 | 1.018 | 0.014 |

TABLE 31-continued

Logistic Regression Explained: P[Reverse]

|  | (1) U/R | | (2) D/S | |
|---|---|---|---|---|
|  | Coeff. | SE | Coeff. | SE |
| Close | 1.014 | 0.011 | 1.022 | 0.011 |
| Max | 1.06 | 0.016 | 1.023 | 0.016 |
| Min | 1.009 | 0.011 | 1.004 | 0.011 |
| Dollar | 1.042 | 0.011 | 1.032 | 0.011 |
| Halves | 1.027 | 0.008 | 1.027 | 0.008 |
| N | 996,061 | | 992,719 | |
| R2 | 0.01 | | 0.01 | |

TABLE 32

Logistic Regression Explained: P[Reverse]

|  | (3) ALL | |
|---|---|---|
|  | Coeff. | SE |
| Up | 0.993 | 0.003 |
| Q t-1 | 1.028 | 0.031 |
| Pchange | 1.086 | 0.004 |
| E price(U) | 0.966 | 0.053 |
| E price(D) | 0.958 | 0.052 |
| E price(R) | 0.923 | 0.056 |
| E price(S) | 0.93 | 0.057 |
| QxE price(U) | 0.966 | 0.029 |
| QxE price(D) | 0.957 | 0.029 |
| QxE price(R) | 0.923 | 0.028 |
| QxE price(R) | 0.93 | 0.28 |
| BigQXE(U) | 1.013 | 0.004 |
| BigQxE (D) | 1.015 | 0.005 |
| BigQxE (R) | 1.104 | 0.005 |
| BigQxE (S) | 1.112 | 0.005 |
| Open | 1.032 | 0.01 |
| Close | 1.006 | 0.008 |
| Max | 1.04 | 0.011 |
| Min | 1 | 0.008 |
| Dollar | 1.04 | 0.008 |
| Halves | 1.028 | 0.008 |
| N | 1,997,208 | |
| R2 | 0.002 | |

Our findings suggest that a change in direction around a price level is a significant predictor of subsequent volume traded at that same price. Specifically, a resistance (support) price might be an indicator of a significant amount of liquidity on the supply (demand) side. If the subsequent event also results in a change of direction, we can infer that the opposite side of the market did not exhaust the liquidity available. Our estimates are certainly consistent with this hypothesis since the volume traded at this point is either the same or lower than that observed in events occurring at prices that were not identified either as resistance or support. In the case that the subsequent event results in price changes in the same direction, we can infer that the liquidity available on the supply (demand) side was exhausted, which implies that the volume traded was unusually large. Both our specifications support this finding.

While certain specific embodiments of the invention have been described herein for illustrative purposes, the invention is not limited to the specific details, representative devices, and illustrative examples shown and described herein. Various modifications may be made without departing from the spirit or scope of the invention defined by the appended claims and their equivalents.

We claim:
1. A method comprising:
(a) receiving electronic data describing a trading order;
(b) receiving data describing a selection of one or more first trading algorithms from a plurality of available stored algorithms for execution of said trading order;
(c) commencing with a processor unit execution of said trading order via said one or more first trading algorithms;
(d) evaluating with said processor unit quality of execution, during said execution, of said trading order via said one or more first trading algorithms;
(e) comparing with said processor unit said evaluated quality of execution to a prediction of future performance of execution of said trading order by said one or more first trading algorithms; and
(f) if said evaluated quality of execution compares unfavorably to said prediction of future performance, switching with said processor unit said execution of said trading order to one or more second trading algorithms, wherein said processor unit comprises one or more processors.
2. A method as in claim 1, wherein said one or more first trading algorithms selected from a plurality of available stored algorithms for execution of said trading order consists are associated with one or more target brokers.
3. A method as in claim 2, said association with said one or more target brokers is the result of a default configuration.
4. A method as in claim 2, wherein said association with said one or more target brokers is the result of an active selection from a list of one or more target brokers.
5. A method as in claim 1, wherein said selecting an algorithm is based on one or more filters applied to said trading order.
6. A method as in claim 1, wherein said selecting an algorithm is based on classification parameters applied by said processing system.
7. A method as in claim 2, wherein said step of selecting an algorithm is based on classification parameters applied by said processing system.
8. A method as in claim 6, wherein if there is no algorithm associated with one or more of said one or more brokers that also meets said classification parameters applied by said processing system, said processing system selects one or more trading algorithms from a plurality of available stored algorithms that is not associated with one or more of said one or more target brokers.
9. A method as in claim 2, wherein said selecting an algorithm associated with one or more of said one or more of said target brokers is based on targets specified by a market participant for directing order flow to one or more of said target brokers.
10. An apparatus comprising a non-transitory computer readable medium storing software that performs a method comprising the method of claim 1.
11. An apparatus comprising a non-transitory computer readable medium storing software that performs a method comprising the method of claim 2.
12. A computer system comprising one or more processor components communicating via a computer network, said system comprising:
(a) a communication component that receives electronic data describing a trading order;
(b) a communication component that receives data describing a selection of one or more first trading algorithms from a plurality of available stored algorithms for execution of said trading order;

(c) an execution component that commences execution of said trading order via said one or more first trading algorithms;
(d) an evaluation component that evaluates quality of execution, during said execution, of said trading order via said one or more first trading algorithms;
(e) a comparison component that compares said evaluated quality of execution to a prediction of future performance of execution of said trading order by said one or more first trading algorithms; and
(f) a switching component that, if said evaluated quality of execution compares unfavorably to said prediction of future performance, switches execution of said trading order to one or more second trading algorithms.

13. A computer system as in claim 12, wherein said one or more first trading algorithms selected from a plurality of available stored algorithms for execution of said trading order consists are associated with one or more target brokers.

14. A computer system as in claim 13, said association with said one or more target brokers is the result of a default configuration.

15. A computer system as in claim 13, wherein said association with said one or more target brokers is the result of an active selection from a list of one or more target brokers.

16. A computer system as in claim 12, wherein said selecting an algorithm is based on one or more filters applied to said trading order.

17. A computer system as in claim 12, wherein said selecting an algorithm is based on classification parameters applied by said processing system.

18. A computer system as in claim 13, wherein said step of selecting an algorithm is based on classification parameters applied by said processing system.

19. A computer system as in claim 17, wherein if there is no algorithm associated with one or more of said one or more brokers that also meets said classification parameters applied by said processing system, said processing system selects one or more trading algorithms from a plurality of available stored algorithms that is not associated with one or more of said one or more target brokers.

20. A computer system as in claim 13, wherein said selecting an algorithm associated with one or more of said one or more of said target brokers is based on targets specified by a market participant for directing order flow to one or more of said target brokers.

* * * * *